United States Patent [19]
Kai et al.

[11] Patent Number: 6,009,279
[45] Date of Patent: Dec. 28, 1999

[54] PHOTOGRAPHING APPARATUS HAVING ANTI-VIBRATION FUNCTION

[75] Inventors: Tadao Kai, Kawasaki; Nobuhiko Terui, Ichikawa, both of Japan

[73] Assignee: Nikon Corporation, Tokyo, Japan

[21] Appl. No.: 08/908,697

[22] Filed: Aug. 8, 1997

Related U.S. Application Data

[63] Continuation of application No. 08/352,128, Dec. 1, 1994, abandoned.

[30] Foreign Application Priority Data

| Dec. 3, 1993 | [JP] | Japan | 5-339332 |
| Jan. 24, 1994 | [JP] | Japan | 6-021887 |
| Jun. 24, 1994 | [JP] | Japan | 6-143261 |
| Aug. 16, 1994 | [JP] | Japan | 6-192460 |

[51] Int. Cl.[6] .................................. G03B 5/00
[52] U.S. Cl. ......................................... 396/55
[58] Field of Search ......................... 348/208; 396/52–55

[56] References Cited

U.S. PATENT DOCUMENTS

| 4,345,825 | 8/1982 | Matteson et al. ............ 354/23 |
| 5,041,852 | 8/1991 | Misawa et al. . |
| 5,107,293 | 4/1992 | Sekine et al. ................ 354/430 |
| 5,153,633 | 10/1992 | Otani ............................ 354/430 |
| 5,210,563 | 5/1993 | Hamada et al. .............. 354/400 |
| 5,282,044 | 1/1994 | Misawa et al. ............... 358/222 |
| 5,420,661 | 5/1995 | Hamada et al. .............. 396/52 |
| 5,448,332 | 9/1995 | Sakakibara et al. .......... 355/53 |
| 5,572,252 | 11/1996 | Naka et al. ................... 348/208 |
| 5,634,142 | 5/1997 | Imafuji et al. ................ 396/52 |

FOREIGN PATENT DOCUMENTS

| 3-237411 | 10/1991 | Japan . |
| 4-211230 | 8/1992 | Japan . |
| 5-142615 | 6/1993 | Japan . |

Primary Examiner—Safet Metjahic
Assistant Examiner—Michael Dalakis

[57] ABSTRACT

A photographing apparatus having an anti-vibration function includes a vibration detecting unit for detecting a vibration of the photographing apparatus, a reference value calculating unit for calculating a reference value of an output of the vibration detecting unit, and a focusing unit for adjusting a focal position of a photographing image. The apparatus also includes a focusing operation stopping unit for stopping an operation of the focusing unit and a reference value calculation stopping unit for stopping the calculation of the reference value by the reference value calculating unit by detecting the operation of the focusing operation stopping unit.

29 Claims, 26 Drawing Sheets

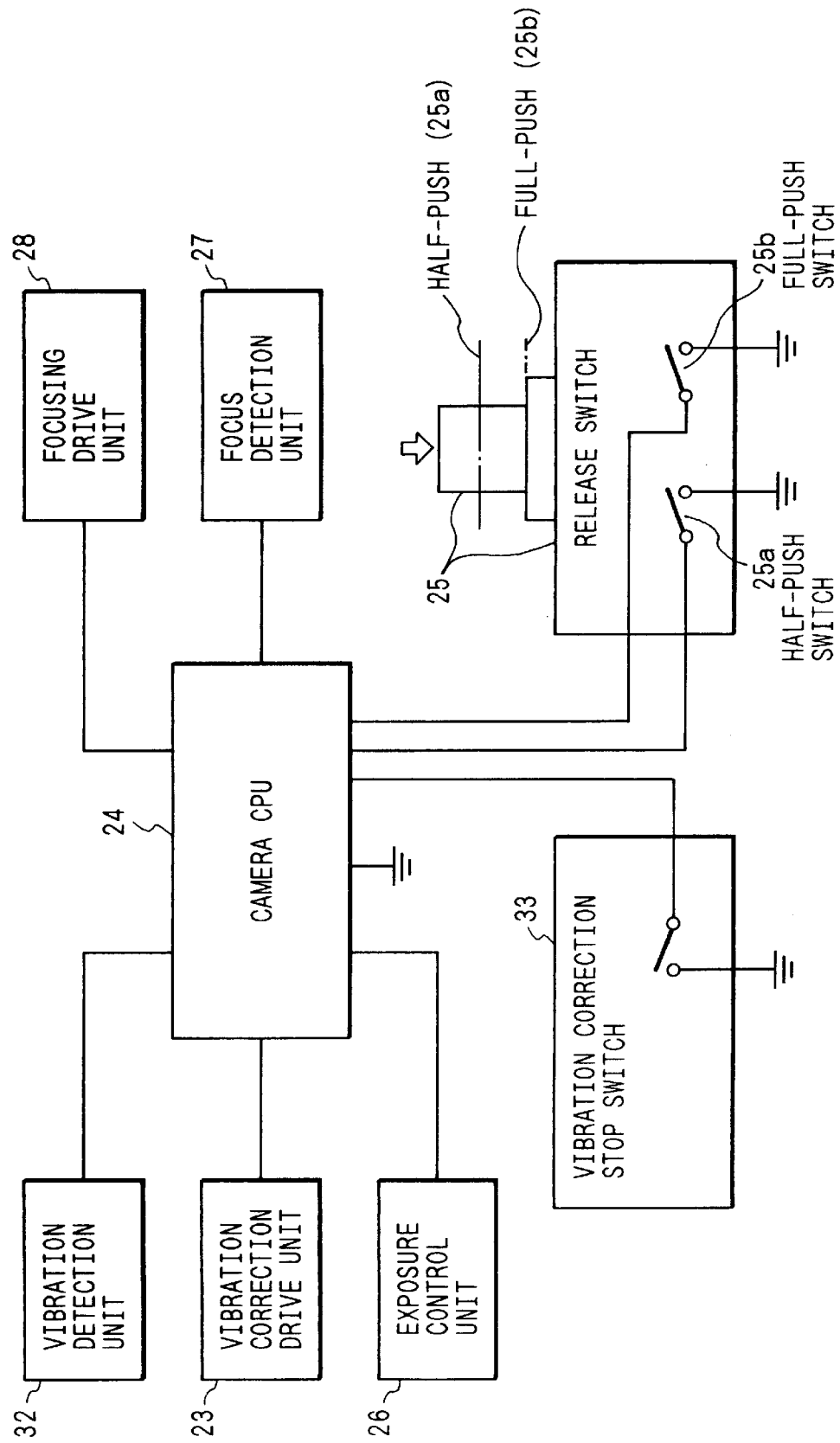

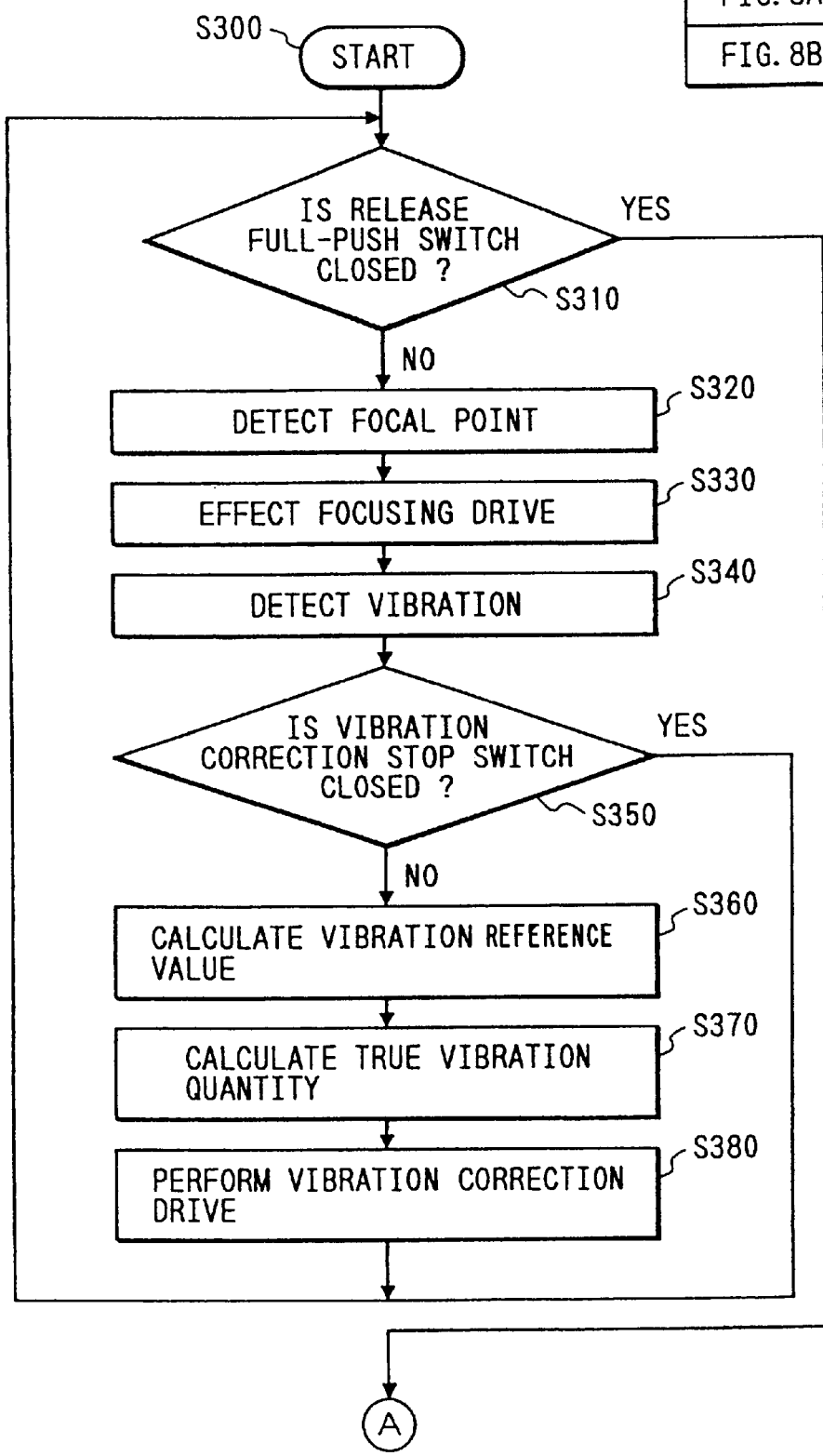

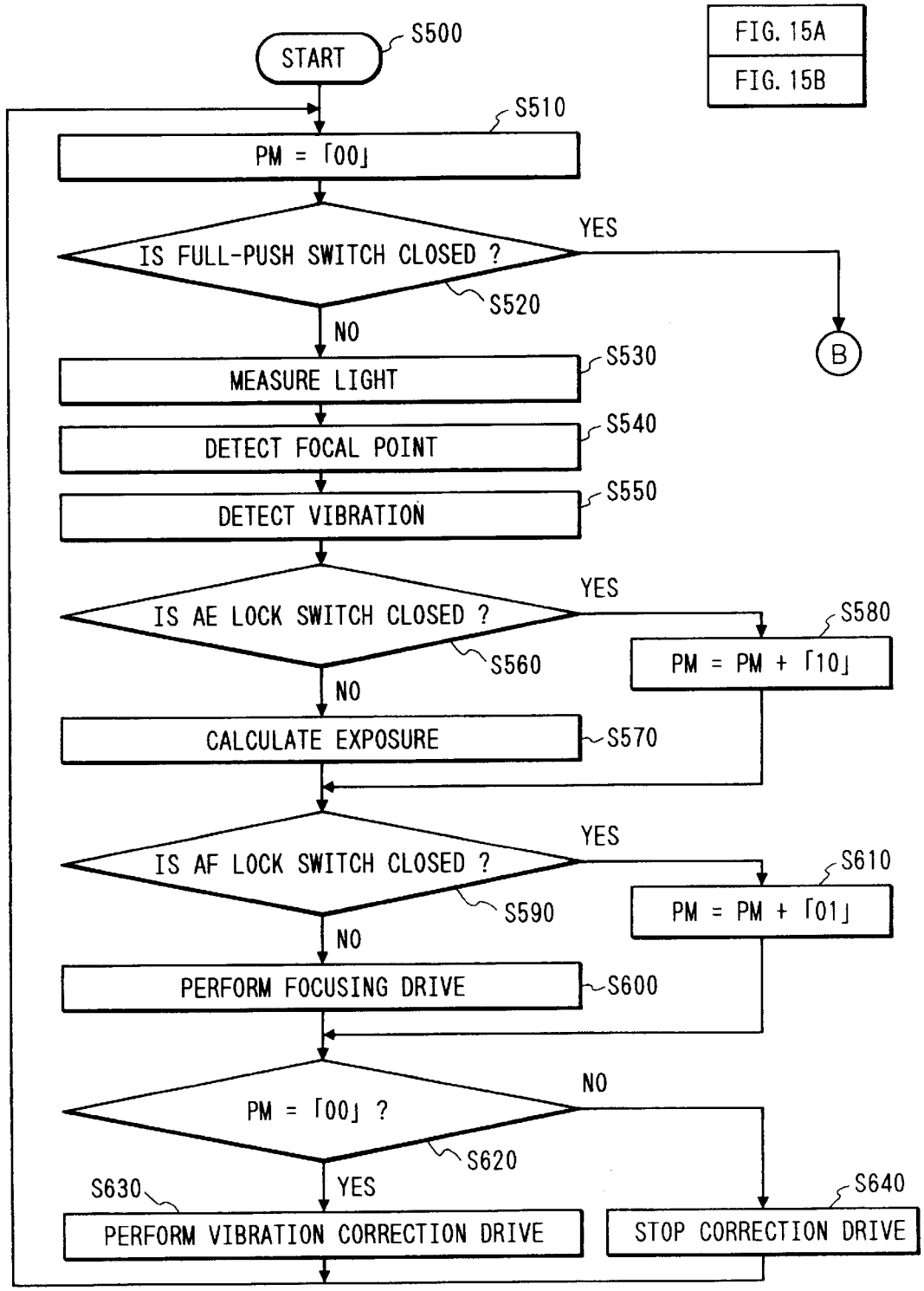

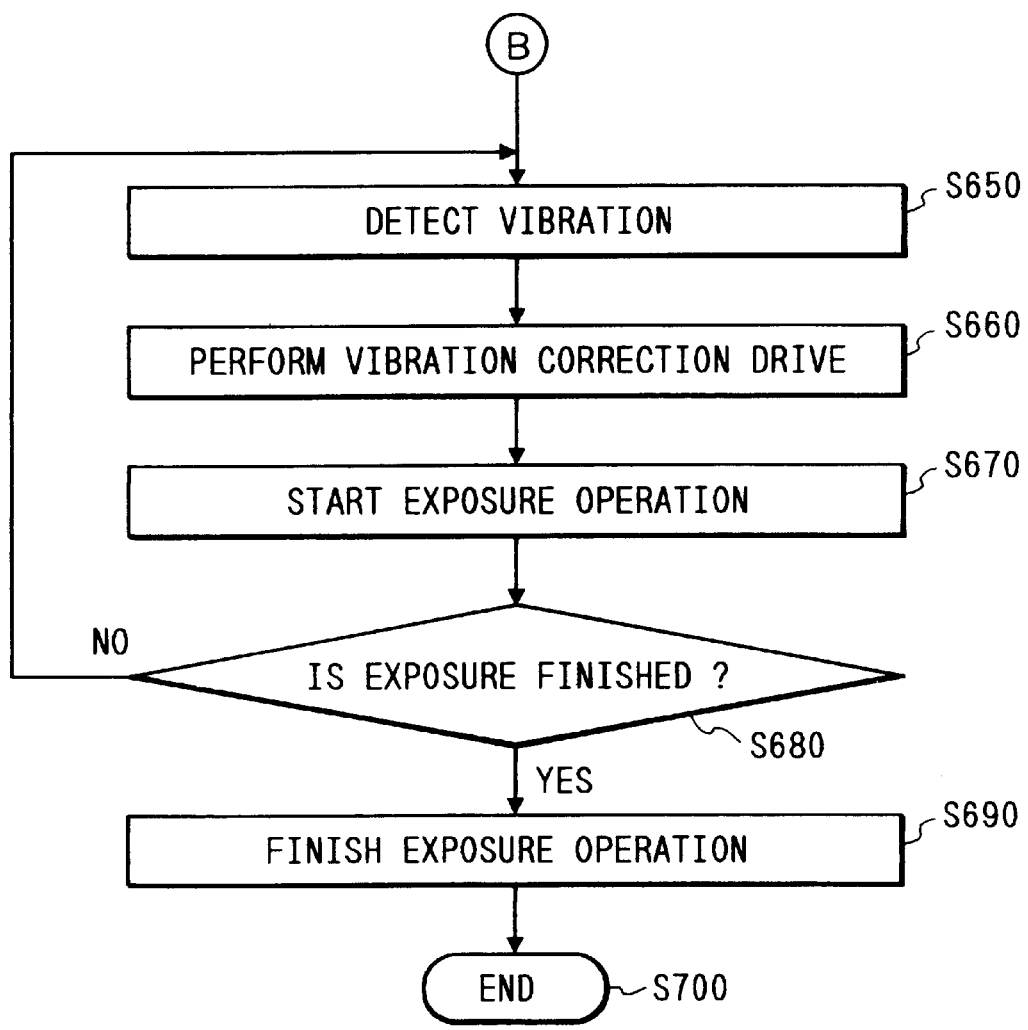

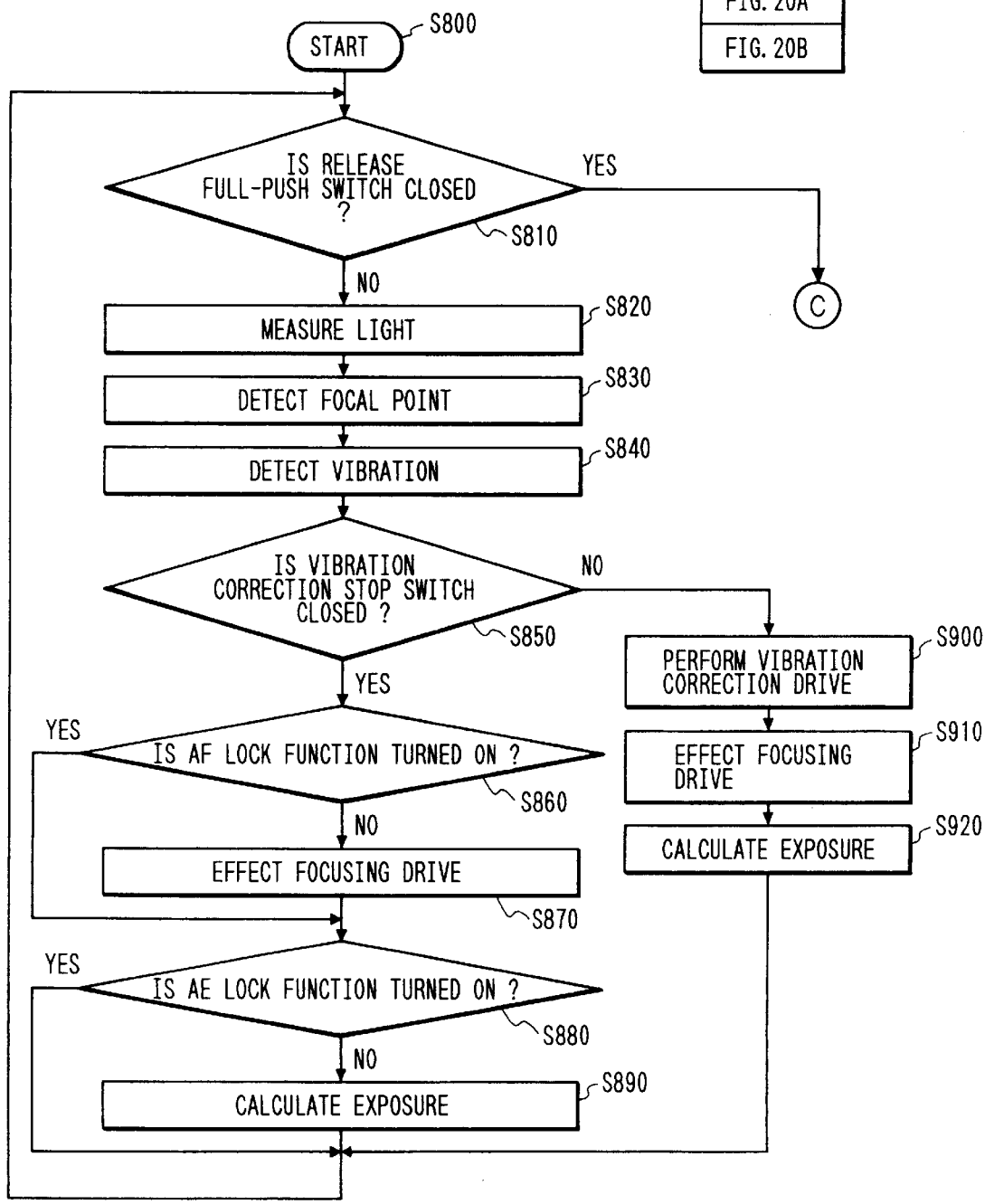

PHOTOGRAPHING APPARATUS HAVING ANTI-VIBRATION FUNCTION

This application is a continuation of application Ser. No. 08/352,128, filed Dec. 1, 1994, now abandoned.

BACKGROUND OF THE INVENTION

1. Field of the Invention

The present invention relates generally to a photographing apparatus having an anti-vibration function, which incorporates a function to correct a vibration derived from a camera shake or the like of a photographer and, more particularly, to a photographing apparatus having an anti-vibration function, the apparatus being capable of exhibiting the anti-vibration function in a predetermined state even when the photographer intentionally performs a framing operation in which the photographing is effected by changing a photographing angle after being focused.

2. Related Background Art

In a recent photographing apparatus, e.g., a camera with an auto exposure (AE) mechanism, the autofocus (AF) mechanism and other respective elements are automated at a high level. A highly-functionalized element is a function to correct image blur derived from a camera shake, etc. which is caused when photography is conducted while holding the camera with hands. A variety of proposals are made.

That is, in this type of camera, there have hitherto been proposed a variety of vibration preventing devices each having a vibration correctable construction such that, for the purpose of correcting the image blur produced by camera shake, especially by tilting the camera, each speed sensor serving as a vibration detecting device detects the camera shake and the vibration, and a photographing lens system or a part of this photographing lens system serving as a principal optical system is shift-driven in a direction orthogonal to the optical axis in accordance with a result of the detection thereof.

Then, in the camera having such an anti-vibration function, the photographing lens system or some lens elements thereof are movably controlled as a vibration correction optical system, thereby obviating the image blur. Even when exposed at a shutter speed slower than that of ordinary photographing, it is possible to take a photo in a state where no image blur is caused.

In addition, this type of camera, a focus lock is used during preparation for photographing. And it may happen that the exposure operation is often performed after the shaking of the camera for changing the photographing angle. The detected vibration signal is influenced by the movement for changing the visual angle, resulting in a problem such that an anti-vibration accuracy can not be secured when performing the photographing exposure.

For obviating this problem, for example, Japanese Patent Application Laid-Open No. 5-142615 discloses a construction in which there is determined whether or not it is the time when photography is being conducted in relation to the visual angle changing operation. If this is determined as the visual angle changing operation, the vibration is corrected by applying a compensation to vibration detection signal.

According to the prior art disclosed in Japanese Patent Application Laid-Open No. 5-142615, however, it is difficult to determine whether it is the visual angle changing operation or not. Further, in the case of determining that it is the visual angle changing operation, complicated control has to be done. A burden is imposed on a CPU mounted in the camera, and, for effecting the processing at a high speed, a high-performance CPU has to be employed. There arises the problem in which this leads to an increase in costs for the camera as a whole.

Also, an angular speed sensor is the dominant vibration detecting sensor used for the anti-vibration function in the above-mentioned camera, etc. In the case of using such an angular speed sensor, however, a sensor output when the vibration reference value is normalized (i.e., where the vibration is considered to be zero or where the angular speed is zero) becomes unstable due to a drift or the like. There is produced such an inconvenience that this directly worsens the vibration correcting accuracy.

As a countermeasure against this, for instance, Japanese Patent Application Laid-Open No. 4-211230 discloses a construction in which an average value (shift average value) of the sensor outputs for a predetermined time is obtained and employed as the output representing the zero vibration reference value to correct the sensor output.

In the apparatus disclosed in Japanese Patent Application Laid-Open No. 4-211230, however, when the average value of the sensor outputs for the predetermined time is set as a zero vibration reference value of the sensor output, the the following problems arise.

That is, with respect to a still camera, a great majority of photographers often intentionally take a photograph such that a framing operation is carried out after being set in an in-focus state by performing the focusing operation irrespective of the autofocusing and manual focusing, and thereafter the exposure is carried out.

Then, in such a case, it follows that a biasing vibration, due to the framing before the exposure, is mixed as a bias component in the vibration detection output for the predetermined time in the apparatus disclosed in Japanese Patent Application Laid-Open No. 4-211230. If the shift average value of the vibration detection outputs is employed as the output representing the zero vibration reference value, the problem is that the vibration detection output can not be accurately corrected.

For this reason, in this type of vibration correctable camera, it is desired that the bias component be prevented from being mixed in the vibration detection output during the framing operation described above and the vibration correcting accuracy be increased during the exposure.

For responding to such demands, the present applicant examined, in detail, the states of the vibration detection output and the camera operation that is performed by the photographer during the framing operation and found out the following points.

That is, Japanese Patent Application Laid-Open No. 3-237411 gives a statement that it is better to work the vibration correcting function during the vibrating operation and discloses a method of temporarily inhibiting the work of the vibration correcting function by the manipulation of the photographer. This intends to avoid the situation such that the framing becomes hard to perform due to the restraint on the manipulation, such as panning by the photographer, by the vibration correcting operation.

Then, Japanese Patent Application Laid-Open No. 3-237411 states that when performing the framing operation after being focalized by the focusing, there may be operated a switch for temporarily inhibiting the work of the vibration correcting function.

According to the Publication described above, however, there is no statement about the measures for improving the accuracy of the vibration correcting function at the time of the exposure, and therefore some measures capable of satisfying such a point are required.

Further, Japanese Patent Application Laid-Open No. 3-237411 states that a switch is provided in a lens barrel unit, and the work of the vibration correcting function is temporarily stopped by the photographer's manipulation of this switch.

In the camera disclosed in the above Publication, however, when trying to temporarily stop the work of the vibration correcting function, a vibration correcting operation stop switch has to be operated each time. This results in a problem of being troublesome and causes a lack of the operability.

In addition, in the conventional camera having the anti-vibration function as disclosed in Japanese Patent Application Laid-Open No. 3-237411, it is known that an AF lock function and an AE lock function are functions frequently employed when performing the framing operation.

Then, according to the conventional camera, these AF and AE lock functions are made to work by manipulating respective dedicated lock operation switches or by a changeover operating switch incorporating both of these functions.

According to the conventional camera having the anti-vibration function described above, however, the photographer temporarily stops the work of the image framing correcting function to work the AF or AE lock function. For this purpose, the photographer has to simultaneously manipulate the lens-side vibration correction stop switch and the above-mentioned body-side lock function operating switch. Accordingly, the problem inherent in such a conventional camera is that the operability is diminished, and the usability is poor.

SUMMARY OF THE INVENTION

It is a primary object of the present invention to provide a photographing apparatus having an anti-vibration function that secures a vibration preventing accuracy at the time of an exposure even in the case where the visual angle during preparation for photographing is changed.

It is another object of the present invention to provide a photographing apparatus having an anti-vibration function that eliminates a bias component that was mixed in a vibration detection output during a vibration and thus increasing the vibration correcting accuracy at the time of the exposure.

It is still another object of the present invention to provide a photographing apparatus having an anti-vibration function that improves operability by efficiently working a vibration correcting function.

It is a further object of the present invention to provide a photographing apparatus having an anti-vibration function that exhibits a good usability and, obtains well-photographed picture wherein vibration is corrected while keeping effective an AF or AE lock function through an arrangement wherein the photographer may perform a single operation when working and stopping a vibration correcting function during the framing operation at a photographing preparatory stage and selectively working the AF and AE lock functions.

To accomplish the above objects, according to a first aspect of the present invention, there is provided a photographing apparatus having an anti-vibration function, comprising: a vibration detecting device for detecting a vibration of the photographing apparatus; a reference value calculating device for calculating a reference value of an output of the vibration detecting device; a focusing device for adjusting a focal position of a photographing image; a focusing operation stopping device for stopping an operation of the focusing device; and a reference value calculation stopping device for stopping the calculation of the reference value by the reference value calculating device by detecting the operation of the focusing operation stopping device.

In this aspect, preferably the reference value calculating device calculates the reference value from an average value of the vibration detection outputs. Further, the reference value calculating device is preferably capable of resuming the calculation of the reference value after the reference value calculation stopping device has stopped the calculation of the reference value. In this case, the reference value calculation stopping device preferably permits the reference value calculating device to resume the calculation of the reference value by detecting a non-operation of the focusing operation stopping device. Moreover, the focusing operation stopping device is preferably a focus lock device.

According to a second aspect of the present invention, there is provided an apparatus having an anti-vibration function, comprising: a vibration detecting device for detecting a vibration of the photographing apparatus; a reference value calculating device for calculating a reference value of an output of the vibration detecting device; a focusing device for adjusting a focal position of a photographing image; a focusing operation stopping device for stopping an operation of the focusing device; a reference value calculation stopping device for stopping the calculation of the reference value by the reference value calculating device by detecting the operation of the focusing operation stopping device; a release device for starting an exposure operation; and a vibration correction control device for controlling a drive of the vibration correcting device by use of an output of the vibration detecting device and the reference value calculated by the reference value calculating device after the release device has started the exposure operation.

In this aspect, the vibration correction control device preferably controls the drive of the vibration correcting device on the basis of an output obtained by subtracting the reference value calculated by the reference value calculating device from the output of the vibration detecting device.

According to a third aspect of the present invention, there is provided a photographing apparatus having an anti-vibration function, comprising: a vibration detecting device for detecting a vibration of the photographing apparatus; a focusing device for adjusting a focal position of a photographing image; a focusing operation stopping device for stopping an operation of the focusing device; a vibration correcting device for correcting a vibration of the photographing image; a vibration correction control device for controlling a drive of the vibration correcting device; a release device for starting an exposure operation; and a correction drive stopping device for stopping a drive of the vibration correcting device by the vibration correction control device when detecting an operation of the focusing operation stopping device before operating the release device.

In this aspect, the correction drive stopping device preferably cancels the stop of the drive of the vibration correcting device by the correction drive stopping device with the operation of the release device.

According to the above aspects of the present invention, when performing the focusing stop operation, e.g., a focus lock during the preparation for the photographing, there is calculated the reference value serving as a standard for the output of the framing detecting device based on the detection output for the vibration applied to the photographing apparatus up to the time just before working the focus lock.

The state just before working the focus lock may be assumed to be a state where the photographer is performing the focusing operation while aiming at an object. Hence, the vibration applied to the photographing apparatus at that state is merely the type of vibration which image blur produces through camera shake unrestrainable in a static state. Under this condition, the detection output to be detected exhibits a distribution with the zero vibration point (where the vibration is considered to be zero) being centered. Therefore, the average value of the detection outputs for a predetermined time is usable as a zero vibration reference value.

Hence, this value serves as a reference value for vibration detection, and the drive of the vibration correcting device is controlled by use of a value obtained by subtracting this reference value from the vibration detection output. The bias component mixed in the vibration detection output can thereby be easily eliminated. In this manner, it is also possible to eliminate a decrease in the vibration detecting accuracy and prevent an occurrence of a drive error of the vibration correction drive.

According to a fourth aspect of the present invention, there is provided a photographing apparatus having an anti-vibration function, comprising: a vibration detecting device for detecting a vibration applied to the photographing apparatus; a standard generating device for generating a reference value of an output from the vibration detecting device; a vibration correcting device for correcting a vibration of a photographing image; a vibration correction stopping device for stopping an operation of the vibration correcting device; and a standard control device for controlling an operation of the standard generating device by detecting a state of the vibration correction stopping device.

In this aspect, the standard control device preferably detects operating/non-operating states of the vibration correction stopping device. Then, the standard generating device preferably generates a shift average output from the output from the vibration detecting device. In addition, the standard control device preferably performs the control to stop updating the reference value generated by the standard generating device or the control to initialize the reference value generated by the standard generating device. Further, the standard control device preferably has a timer function and controls the operation of the standard generating device by detecting a state of the vibration correction stopping device and a state of the timer device.

In the fourth aspect of the present invention, the vibration detection output detected during the framing operation is not used for calculating the reference value. That is, the state just before operating the vibration correction stopping device implies that the photographer is performing the focusing operation while aiming at the object. Accordingly, the vibration detection output exhibits the distribution with the zero vibration point (where the vibration is considered to be zero) being centered. Hence, the shift average value of the vibration detection outputs is usable as a zero vibration reference value.

Further, according to the fourth aspect of the present invention, the vibrating action comes to an end, and, when the vibration correction stopping device is set in the non-operating state before the photographing, the photographer again holds, for instance, the camera in the static state.

Therefore, the vibration detection output also exhibits the distribution with the zero vibration point (where the vibration is considered to be zero) being centered, and it follows that the shift average value of the vibration detection outputs is usable as a zero vibration reference value.

From the above-mentioned, according to the fourth aspect of the present invention, the standard control device is constructed to control the operation of the standard generating device by detecting the state of the vibration correction stopping device. With this construction, if the vibration detection output during the framing operation is not employed for calculating the reference value, the shift average value of the vibration detection outputs becomes an accurate value as the zero vibration reference value.

Then, the thus obtained shift average value of the vibration detection outputs is set as the reference value for the vibration detection, and the drive of the vibration correcting device is controlled by use of the value obtained by subtracting this reference value from the vibration detection output. With this arrangement, it is possible to eliminate the bias component mixed in the vibration detection output and, at the same time, prevent the occurrence of the drive error of the vibration correction drive by preventing the reduction in the vibration detection accuracy.

According to a fifth aspect of the present invention, there is provided a photographing apparatus having an anti-vibration function capable of correcting an image blur of a photographing image due to a vibration, the apparatus comprising: a lock device, operated by a manipulation of a photographer, for temporarily stopping a predetermined function of the photographing apparatus; and a vibration correction control device for controlling a vibration correcting operation of the photographing apparatus on the basis of the operation of the lock device.

Preferably, the photographing apparatus further comprises a timer device for counting an operating time of the lock device and a control canceling device for canceling the control of the vibration correcting operation by the vibration correction control device on the basis of the count by the timer device. Alternatively, the photographing apparatus preferably further comprises a release device for starting an exposure operation of the photographing apparatus and a control canceling device for canceling the control of the vibration correcting operation by the vibration correction control device on the basis of the operation of the release device.

The vibration correction control device preferably includes a lens-side control device, mounted in a lens barrel of the photographing apparatus, for controlling the vibration correcting operation of the photographing apparatus. The vibration correction control device also includes a main control device for controlling a series of photographing operations of the photographing apparatus and, at the same time, transmitting a signal for controlling the vibration correcting operation of the photographing apparatus to the lens-side control device in accordance with the operation of the lock device. In this case, the photographing apparatus preferably further comprises a timer device for counting an operating time of the lock device, and the main control device transmits a signal for canceling the control of the vibration correcting operation of the photographing apparatus to the lens-side control device on the basis of the count by the timer device. In addition, the photographing apparatus further comprises a release device for starting an exposure operation of the photographing apparatus, and the main control device transmits a signal for canceling the control of the vibration correcting operation of the photographing apparatus to the lens-side control device on the basis of the operation of the release device.

Alternatively, the vibration correction control device preferably includes a main control device for controlling a series of photographing operations of the photographing apparatus and, at the same time, outputting a signal corresponding to a state of the lock device. The vibration correction control device also includes a lens-side control device, mounted in a lens barrel of the photographing apparatus, for controlling the vibration correcting operation on the basis of the signal from the main control device. In this case, the photographing apparatus preferably further comprises a timer device for counting an operating time of the lock device. The main control device transmits a signal corresponding to the count of the timer device to the lens-side control device, and the lens-side control device cancels the control of the vibration correcting operation on the basis of the signal from the main control device. In addition, the photographing apparatus preferably further comprises a release device for starting an exposure operation of the photographing apparatus. The main control device transmits a signal corresponding to a state of the release device to the lens-side control device, and the lens-side control device cancels the control of the vibration correcting operation on the basis of the signal from the control device.

Moreover, preferably, the photographing apparatus further comprises a focusing device for adjusting an imaging state of a photographing lens, and the lock device stops an operation of the focusing device. Alternatively, the photographing apparatus further comprises an auto exposure device for setting an exposure condition when effecting a photographing exposure, and the lock device stops an operation of the auto exposure device. Alternatively, the photographing apparatus further comprises a focusing device for adjusting an imaging state of a photographing lens and an auto exposure device for setting an exposure condition when effecting a photographing exposure. The lock device simultaneously stops the operations of the focusing device and of the auto exposure device.

Also, preferably, the photographing apparatus further comprises an informing device for informing the photographer of the effect that the lock device operates.

In the fifth aspect of the present invention, when the lock device used at the photographing preparatory stage (e.g., right before the photographer re-frames the image after the desired focus was achieved) is operated by a manipulation of the photographer, the vibration correction control device controls (e.g., stops) the vibration correcting operation. Accordingly, when the predetermined function of the camera is locked, i.e., when it is preferable to control the vibration correcting operation at the photographing preparatory stage, the vibration correcting operation is controlled without a special manipulation effected by the photographer. Hence, the usability of the camera is enhanced.

Further, according to the fifth aspect of the present invention, the lock device stops the operations of the auto-focus (AF) device and an auto exposure (AE) device, thereby controlling the vibration correcting operation. Accordingly, the operability of the panning or the like is improved. Furthermore, the vibration correcting operation is respectively shared with and thus controlled by the main control device and the lens-side control device. Accordingly, the vibration correction control according to the present invention can be performed in a lens-interchangeable camera, too.

Additionally, according to the fifth aspect of the present invention, when the release device is operated, or after the predetermined time has elapsed since the lock device is operated based on the timer device, the vibration correction control is automatically canceled. It is therefore feasible to carry out the vibration-corrected photographing while keeping the lock function effective. Besides, when viewing the object once again after the framing operation and so on, the usability of the camera is improved. Moreover, the informing device informs the photographer of the fact that the lock device is on the operation, and, therefore, the usability of the camera is more improved than before.

According to a sixth aspect of the present invention, there is provided a photographing apparatus having an anti-vibration function, comprising: a vibration correcting device for correcting a vibration of a photographing image; a vibration correction changing device for changing a vibration correction drive of the vibration correcting device; a lock device for changing an operation of a predetermined function of the photographing apparatus; and a control device for operating the lock device in accordance with an operation of the vibration correction changing device.

Preferably, the photographing apparatus further comprises a focusing device for adjusting an imaging state of a photographing lens and the lock device stops an operation of the focusing device. The lock device simultaneously stops the operations of the focusing device and of the auto exposure device.

According to a seventh aspect of the present invention, there is provided a photographing apparatus having an anti-vibration function, comprising: a vibration correcting device for correcting a vibration of a photographing image; a vibration correction changing device for changing a vibration correction drive of the vibration correcting device; a timer device for counting an operating time of the vibration correction changing device; and a vibration correction change canceling device for canceling the drive change of the vibration correcting device by the vibration correction changing device in accordance with the count by the timer device.

According to an eighth aspect of the present invention, there is provided a photographing apparatus having an anti-vibration, comprising: a vibration correcting device for correcting a vibration of a photographing image; a vibration correction changing device for changing a vibration correction drive of the vibration correcting device; a release device for starting an exposure operation of the photographing apparatus; and a vibration correction change canceling device for canceling a drive change of the vibration correcting device by the vibration correction changing device in accordance with an operation of the release device.

In the seventh and eighth aspects of the present invention, the construction is such that the control device operates the lock device in accordance with the operation of the vibration correction changing device. Hence, it is possible for the photographer to perform a single operation when automatically working the AF or AE lock function by the lock device in accordance with the operation of the switch for changing the work of the vibration correcting function that serves as the vibration correction changing device when effecting the framing operation at the photographing preparatory stage. Consequently, it is feasible to obtain the photographing apparatus having the anti-vibration function, which exhibits good usability.

Additionally, according to the seventh and eighth aspects of the present invention, the timer device for counting the elapsed time of the operation of the vibration correcting operation changeover switch, after the predetermined time has elapsed since the photographer has manipulated the operation changeover switch, automatically cancels the changeover of the operation of the vibration correcting device. Accordingly, there is improved the usability when viewing the object once again during the framing operation and so on. Moreover, the vibration correction change canceling device automatically cancels the changeover of the operation of the vibration correcting device in accordance with the start of the exposure operation of the camera. It is therefore feasible to correct the vibration while keeping effective the AF or AE lock function of the lock device, with the result that a well-photographed picture can be obtained.

The above and other objects, features and advantages of the present invention are explained hereinafter and may be better understood by reference to the drawings and the descriptive matter which follows.

BRIEF DESCRIPTION OF THE DRAWINGS

FIG. 7 is a block diagram illustrating the control system in a third embodiment according to the present invention;

FIG. 15 is comprised of FIGS. 15A and 15B showing flowcharts showing the operation of the camera CPU in the fifth embodiment of the present invention;

DETAILED DESCRIPTION OF THE PREFERRED EMBODIMENTS

Figure 1:
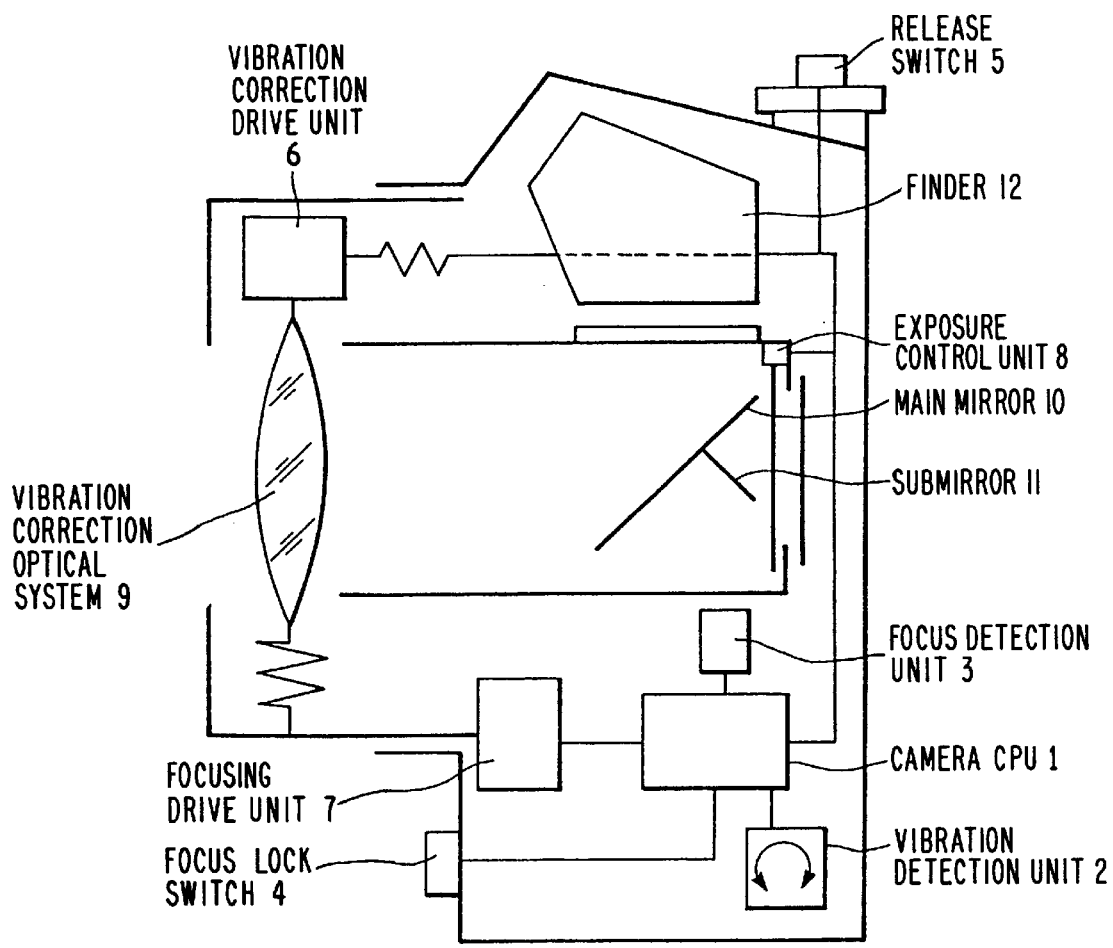
FIG. 1 is a schematic view illustrating a configuration of a still camera a first preferred embodiment of a photographing apparatus having an anti-vibration function according to the present invention.
Figure 2:
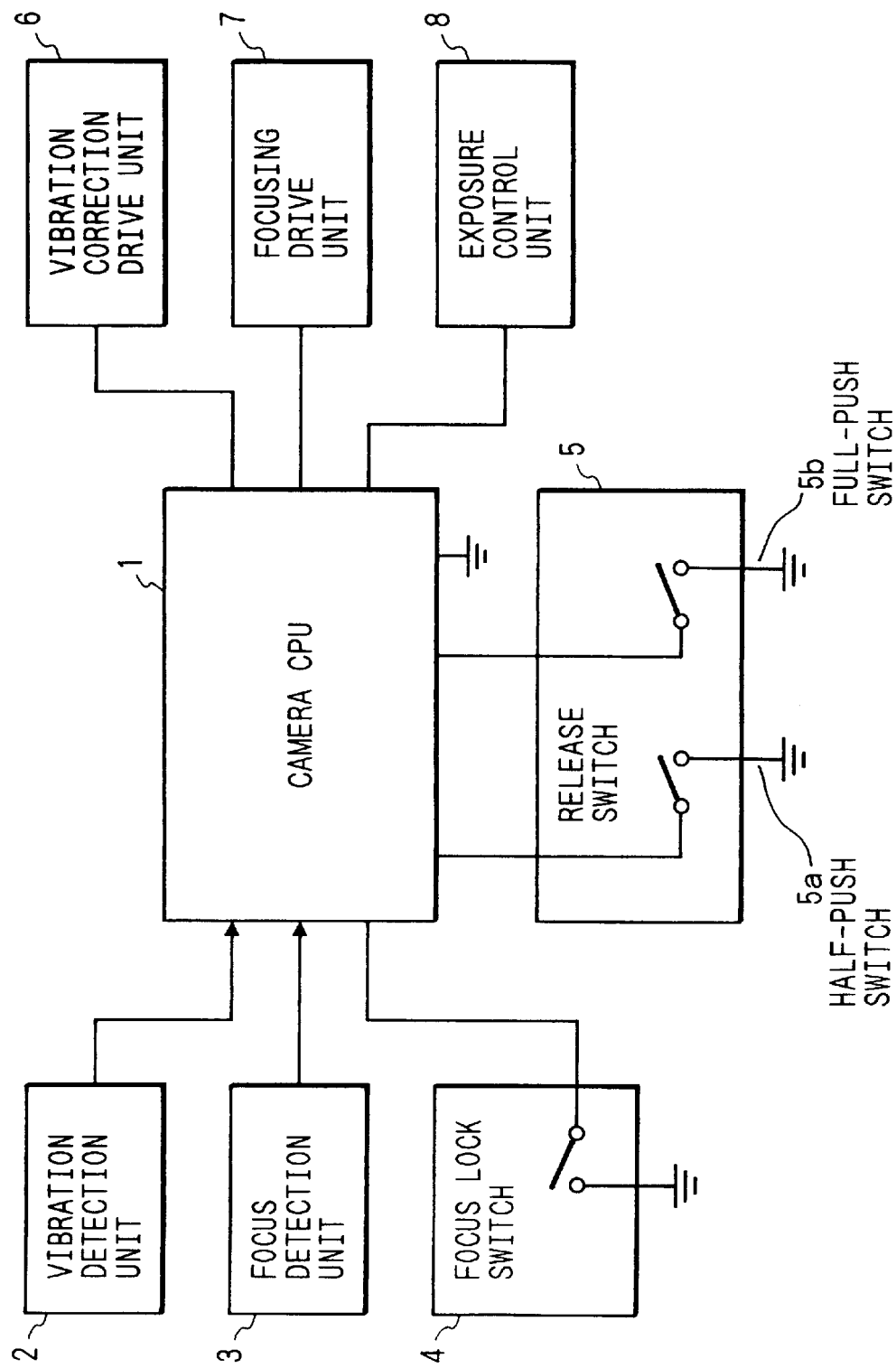
FIG. 2 is a block diagram illustrating a control system in the first embodiment of the present invention.
Figure 3:
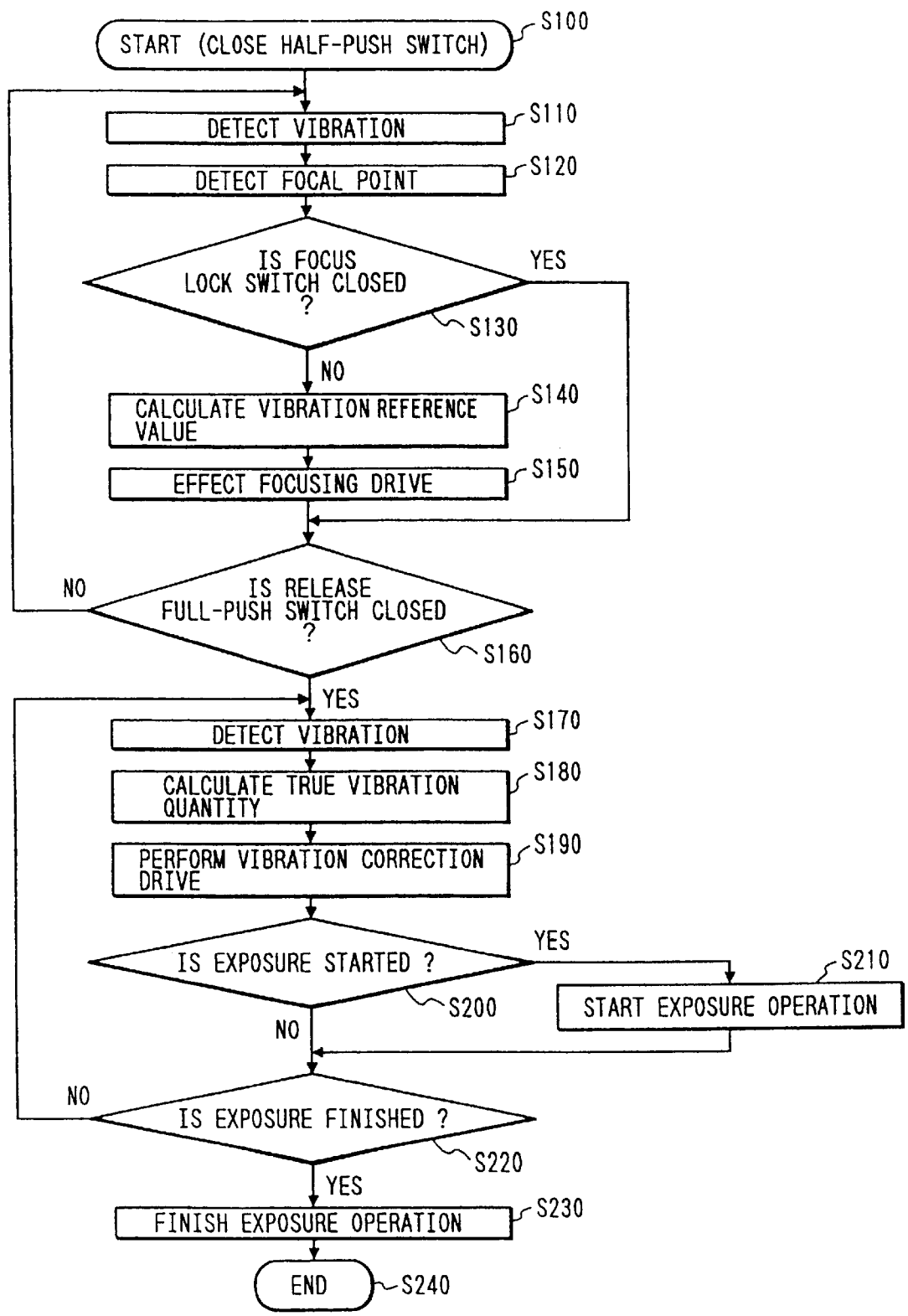
FIG. 3 is a flowchart showing the operation of a camera CPU in the first embodiment of the present invention.

FIGS. 1 to 3 are views each illustrating a still camera of a first preferred embodiment of a photographing apparatus having an anti-vibration function according to the present invention. FIG. 1 is a view illustrating a construction, wherein the illustration is centered on an optical system. FIG. 2 is a block diagram mainly showing a control system. FIG. 3 is a flowchart showing the operation of a camera CPU.

A camera CPU 1 is a central processing unit incorporating a memory function, an arithmetic function and a state determining function. Connected to the camera CPU 1 are detection outputs of a vibration detection unit 2 and of a focus detection unit 3 and state detection outputs from a focus lock switch 4 and from a release switch 5. The camera CPU 1 performs control to drive or stop a correction drive unit 6, a focusing drive unit 7 and an exposure control unit 8 on the basis of the processing shown in a flowchart of FIG. 3 which will be explained later.

The vibration detection unit 2 detects a vibration applied to the camera and involves the use of a known angular speed sensor in this embodiment.

The focus detection unit 3 detects an imaging state in the camera.

The focus lock switch 4, when closed, effects a focus lock operation but, when opened, disables this operation.

A release switch 5 is constructed of a half-push switch 5a and a full-push switch 5b (see FIG. 2). A series of operations of this camera are started by closing the half-push switch 5a, while an exposure operation is started by closing the full-push switch 5b.

A vibration correction drive unit 6 shifts a vibration correction optical system, which will be mentioned later, in order to correct a vibration.

The focusing drive unit 7 adjusts an imaging state by shifting the focusing optical system of a photographing optical system in the optical-axis direction.

The exposure control unit 8 performs an exposing operation of the camera and is, in this embodiment, a shutter.

A vibration correction optical system 9 shifts a part or the whole of the photographing optical system in directions perpendicular to the optical axis, thereby correcting the vibration. This embodiment presents an example where the vibration correction optical system 9 shift-drives the whole photographing optical system to correct the vibration. However, a part of the photographing optical system may be shift-driven, or a beam of light may be deflected by a variable apex-angle prism.

A main mirror 10 guides a beam of photographing light to a finder 12 and is constructed of a half-mirror. Further, a submirror 11 guides the light beam penetrating the main mirror 10 to the focus detection unit 3.

Next, referring to FIG. 3, the detection of the camera shake and the correction of the vibration of the camera in the first embodiment will be explained.

The camera CPU 1, upon detecting that the release half-push switch 5a is in a closed state, performs the following operations starting with step S100.

In step S110, the camera CPU 1 inputs a signal of an angular speed detected and outputted by the vibration detection unit 2 in response to vibration applied to the camera.

In step S120, the camera CPU 1 inputs a signal of an imaging state of the focusing optical system, which is detected and outputted by the focus detection unit 3.

In step S130, the camera CPU 1 detects a state of the focus lock switch 4, and, when the focus lock switch 4 is in the opened state, the processing proceeds to step S140. When the focus lock switch 4 is in the closed state, the processing, because of entering into a focus lock operation, jumps to step S160.

In step S140, the camera CPU 1 calculates a vibration reference value for accurately converting the output signal of the vibration detection unit 2 into an angular speed. This vibration reference value is calculated as an average value (shift average value) of a closest predetermined number of detection signals from the vibration detection unit 2 for a predetermined amount of time that are obtained in step S110.

Note that if an item of predetermined-number-of-vibration output data is not obtained immediately after starting the operation of the camera, an average value of the vibration output data obtained is employed. Further, after a sufficient time has elapsed since the camera has been operated, the vibration output data obtained earliest is deleted, and a predetermined number of pieces of vibration output data including the latest vibration output data are used.

The vibration output data obtained in step S110 is, when jumping over step S140, not employed for the arithmetic operation.

When the focus lock switch 4 is closed, and if repeatedly processed from step S130 but between steps S160, S110 and S120, the vibration output data employed for the calculation of the above reference value is not updated during this period. Accordingly, in a get-ready-for-photographing status, the photographer at first performs the focusing operation and next operates the focus lock switch 4 to change a visual angle of the photographing. In this case, the calculation of the vibration reference value is stopped just when the focus lock switch 4 is operated. The vibration reference value calculated immediately before operating the focus lock switch 4 remains stored in the camera CPU 1.

When jumping over step S140 on the basis of a determination made in step S130, it follows that the calculation of the vibration reference value is stopped.

In step S150, the camera CPU 1 calculates an imaging-state adjustment quantity from the imaging state of the camera that is obtained in previous step S120 and outputs a drive control signal to the focusing drive unit 7. Note that if the focus adjustment is not needed (when already focused), the driving may not be carried out.

In step S160, the camera CPU 1 detects a state of the release full-push switch 5b, and, the processing returns, when the release full-push switch 5b is opened, to step S110 but proceeds, when closed, to step S170.

In step S170, the camera CPU 1 inputs an output of the angular speed detected and outputted by the vibration detection unit 2 in response to vibration applied to the camera.

In step S180, the camera CPU 1 subtracts the vibration reference value already obtained in step S140 from the vibration output obtained in step S170, thus calculating a true camera shake quantity. This operation functions so as to eliminate a drift component intrinsic to the angular speed sensor of the vibration detection unit, which drift component was mixed in the vibration detection output.

In step S190, the camera CPU 1 outputs, to the vibration correction drive unit 2, a proper drive control signal for correcting a vibration quantity caused by the true camera shake arithmetically obtained in step S180.

In step S200, the camera CPU 1 determines whether or not it is time for starting the exposure operation. This exposure start time is determined based on factors such as the passage of time for mirror-up completion for the main mirror 10 and so on. If it is the start-of-exposure time, the processing proceeds to step S210. Whereas if not, the processing jumps to step S220. When the exposure has already been started, the processing also jumps to step 220.

In step S210, the camera CPU 1 outputs an operation control signal to the exposure control unit 8, thereby starting the exposure operation.

In step S220, the camera CPU 1 determines whether or not it is time for finishing the exposure operation. If it is not the end-of-exposure time, the processing goes back to step S170; but proceeds, if it is the end-of-exposure time, to step S230.

In step S230, the camera CPU 1 outputs the operation control signal to the exposure control unit 8, thereby finishing the exposure operation (also finishing the vibration correction drive). Then, the processing goes to step S240, wherein a series of operations come to an end.

In accordance with the first embodiment, a repetitive execution of a routine ranging from step S170 to step S220 for a short period of time is a considerable burden in terms of the processing capability of the camera CPU 1. Hence, carrying out the same calculation of the vibration reference value as that in step S140 in this routine may require an enhanced performance from the camera CPU 1 and may increase the costs. Using the before-exposure vibration reference value for the vibration correction drive control during the exposure without being updated is an effective measure in restricting the increase in the costs for the camera.

Further, according to the normal use of the focus lock switch 4, the switch 4 is operated after the camera is focused but is not released till the exposure operation is completed. When the switch 4 is released before the exposure, this is a case where a series of photographing operations by the photographer are re-performed, and, hence, there is no inconvenience in terms of a repetitive execution of steps inclusive of step S140.

Figure 4:
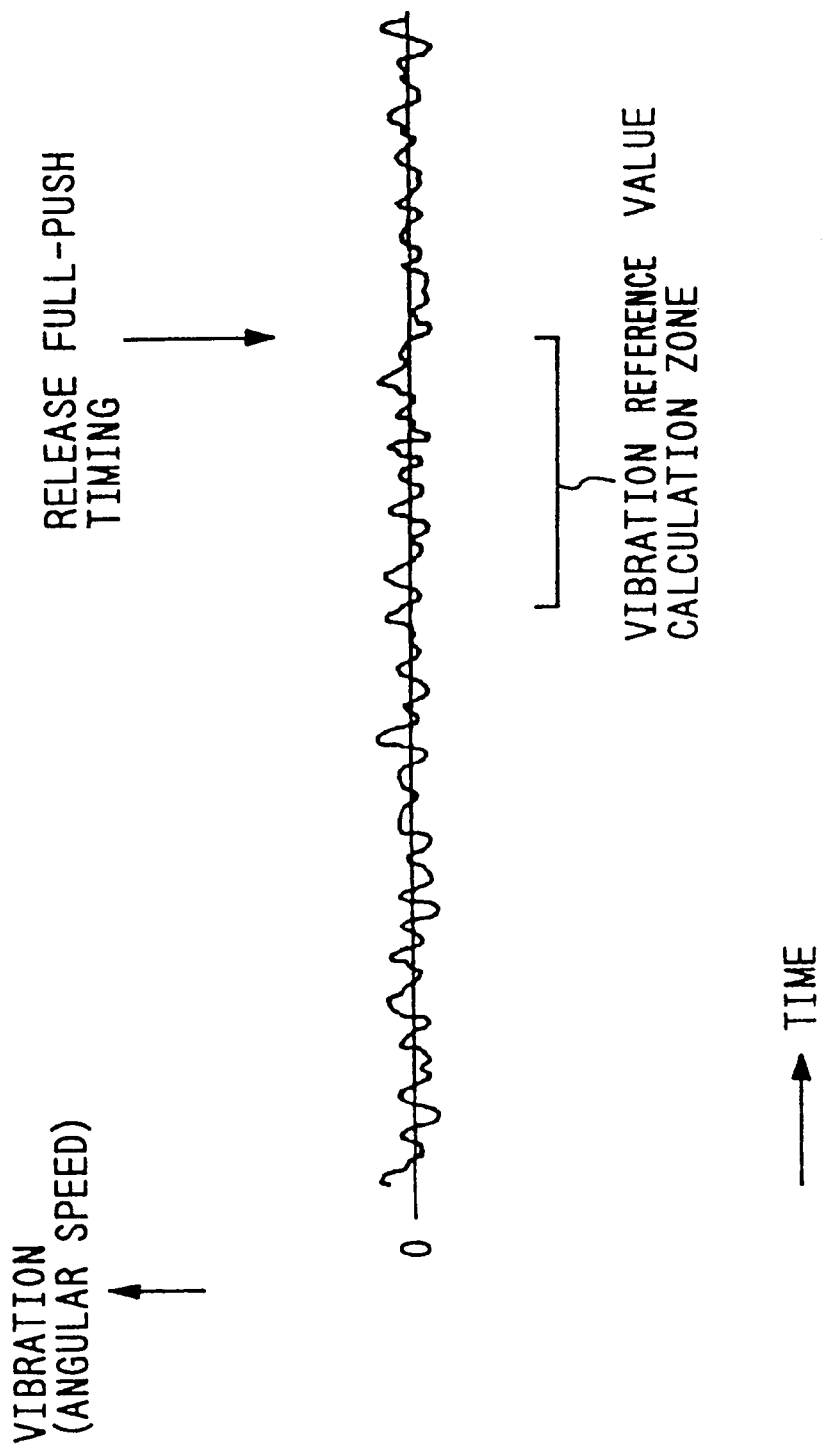
FIG. 4 is a diagram showing one example of a vibration detection output when photographing is conducted as it is without changing a photographing visual angle after a focusing operation, i.e., when a framing operation is not carried out.

FIG. 4 is a diagram showing a typical example of the vibration detection output when the photographing is done without varying the visual angle after the focusing operation has been conducted.

During the focusing operation while aiming at the object, the photographer concentrates so as not to change the visual angle of the photographing with respect to the object, and, therefore, the vibration detection output exhibits a distribution with the zero vibration point (where vibration equals zero or where the angular speed equals zero) being centered. With reference to FIG. 4, the photographer performs the exposure operation as it is, and, hence, the average value of the vibration detection outputs up to the time just before starting the exposure is usable as a zero vibration reference value.

Figure 5:
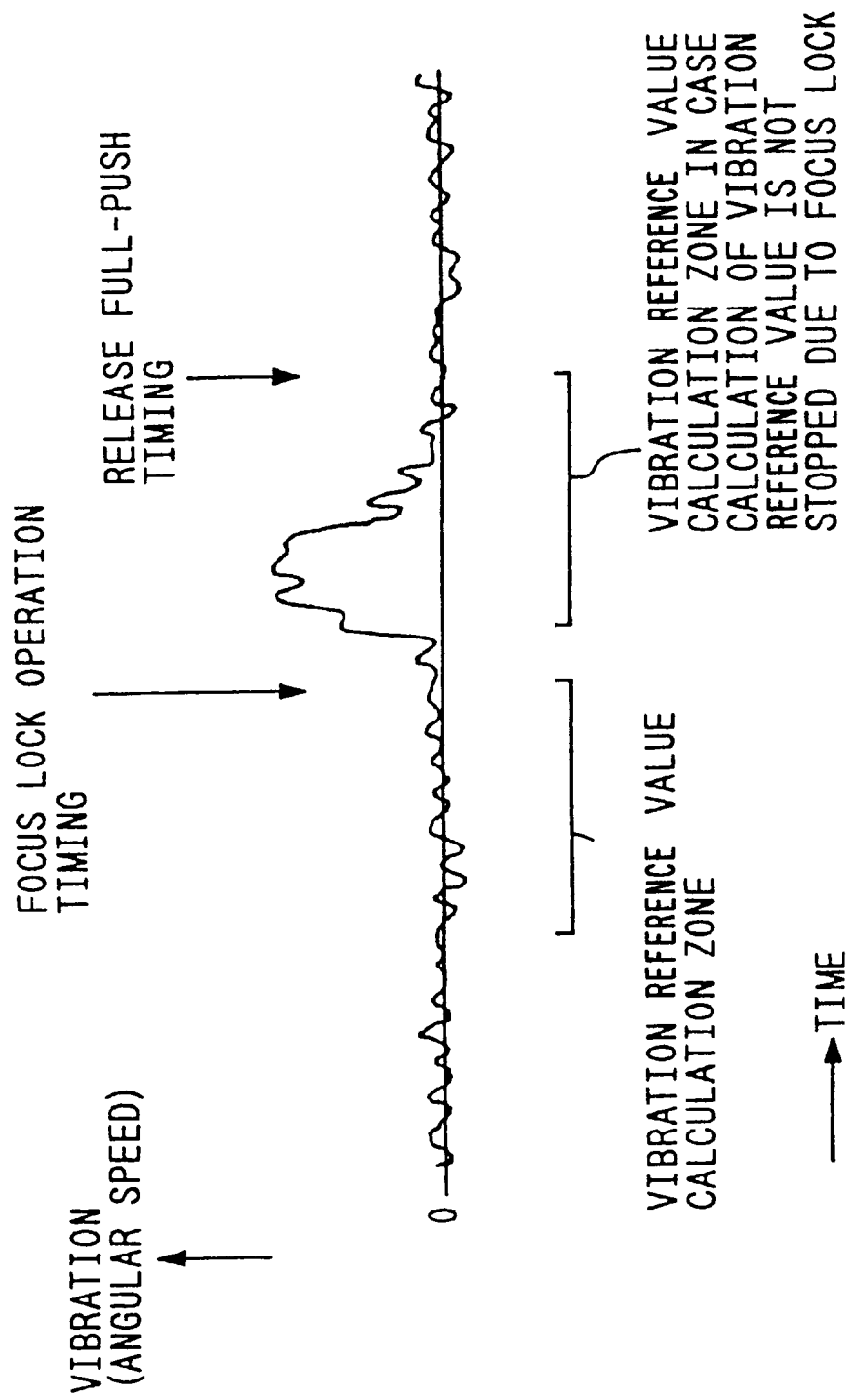
FIG. 5 is a diagram showing one example of the vibration detection output when the photographer changes the photographing visual angle to achieve an artistic effect of a photographed picture after the focusing operation and then taking a photo after confirming the visual angle, viz., when effecting a framing operation.

FIG. 5 is a diagram illustrating a typical example of the vibration detection output when the photographer changes the visual angle of the photographing to achieve an artistic effect for a photographed picture after performing the focusing operation and completes the photographing after confirming the visual angle.

During the focusing operation while aiming at the object, the photographer concentrates so as not to change the visual angle of the photographing with respect to the object, and, therefore, the vibration detection output exhibits the distribution with the zero vibration point (where vibration equals zero or where angular speed equals zero) being centered. However, the vibration detection output (angular speed output) with a bias to one side is thereafter produced due to the photographer's changing of the visual angle of the photographing; but then reverts to the prechange steadiness afterwards. When confirming the visual angle afterwards, the vibration detection output again exhibits the distribution with the zero vibration point being centered, and, meanwhile, the action enters the exposure operation.

In such an example, if the above-explained calculation of the vibration reference value continues up to the time just before the exposure, the vibration reference value turns out an average value of the vibration detection outputs for a predetermined time up to the start of the exposure operation, resulting in a large difference from the zero vibration point. Under this condition, if the photographer fails to operate the focus lock switch when changing the visual angle, the in-focus state falls apart; and, therefore, the operation of the focus lock switch is indispensable.

Then, with respect to the vibration reference value, the average of the vibration detection outputs for the predetermined time up to the time just before the operation of the focus lock switch is stored as the zero vibration of the reference value. This makes the vibration correction drive possible at a higher accuracy.

Figure 6:
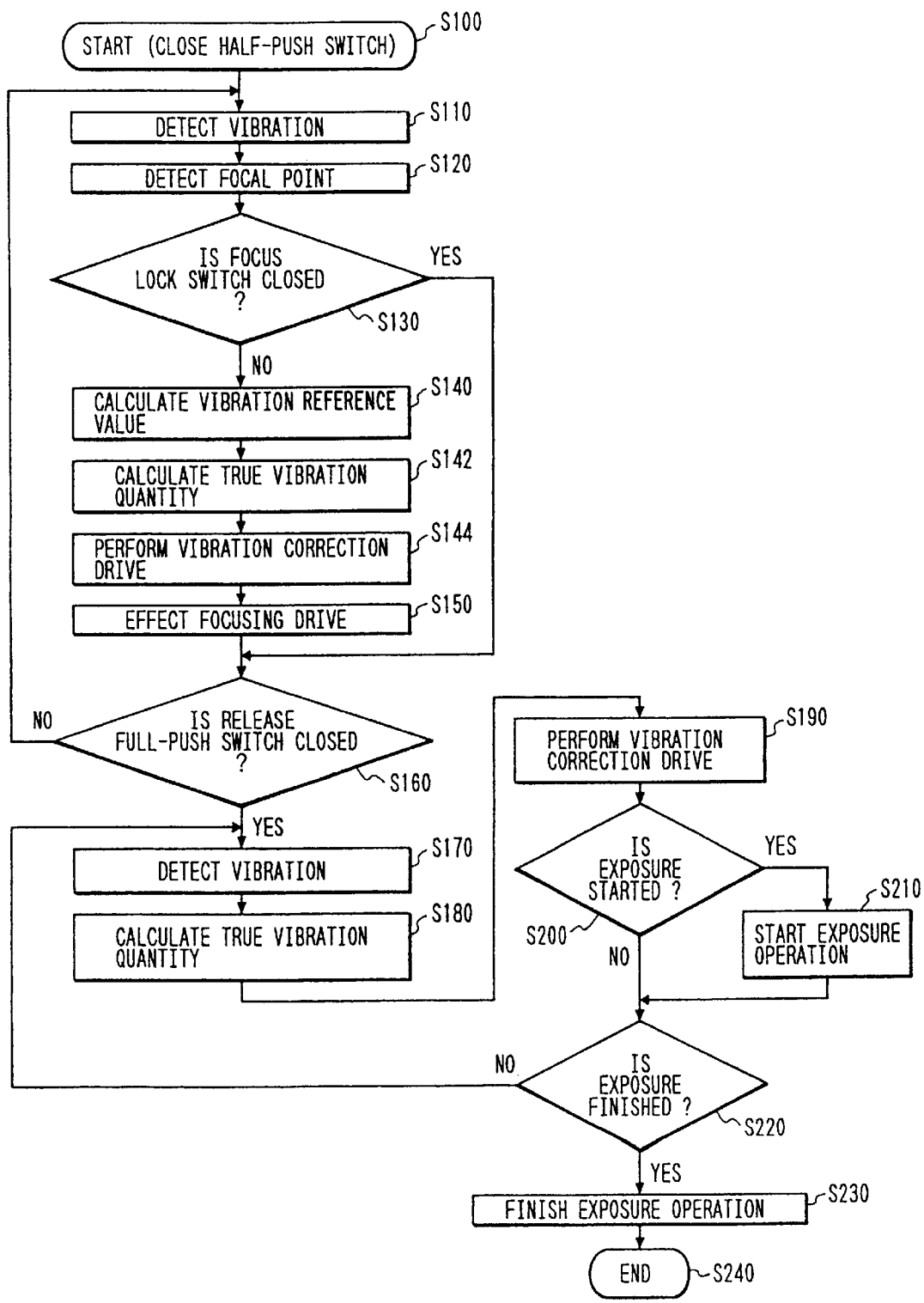
FIG. 6 is a flowchart showing the operation of the camera CPU in a second embodiment of the present invention.

FIG. 6 is a flowchart showing the operations (vibration detection and vibration correction) of the camera CPU in accordance with a second embodiment of the present invention.

Incidentally, the configuration of the hardware is the same as those shown in FIGS. 1 and 2 in the first embodiment, and the illustration thereof will be omitted. At the same time, the steps performing the same functions as those in the flow-chart of FIG. 3 are marked with like numerals, and their repetitive explanations will also be omitted.

The second embodiment gives an example where the invention is applied to a photographing apparatus for performing the vibration correction drive even during preparation for photography.

In step S142, the camera CPU 1 subtracts the vibration reference value calculated in step S140 from the vibration output obtained in step S110, thus obtaining a true camera shake quantity. This operation exhibits an effect of eliminating the drift component mixed in the vibration detection output.

In step S144, the camera CPU 1 outputs, to the vibration correction drive unit 2, the proper drive control signal for correcting the vibration quantity induced by the true camera shake arithmetically obtained in step S142.

Based on the determination in step S130, when the above step is jumped over, it follows that the vibration correction drive is stopped.

Further, when passing through step S190 for the first time after step S144 has been jumped over, it follows that the stop of the vibration correction drive is canceled.

In the second embodiment, during the operation of the focus lock switch 4, the updating of the vibration reference value is stopped, and, in addition, the vibration correction drive is also stopped. Immediately after the operation of the focus lock switch 4, however, there is a high probability that the visual angle is changed. Therefore, performing the vibration correction drive during the change of the visual angle is an action contrary to the intention of the photographer (even when the camera is shaken if a vibration quantity induced by the camera shake is within a vibrations correction range), the visual angle does not change. In this sense also, stopping the vibration correction drive in response to the operation of the switch 4 is effective. Besides, there is omitted the labor preparing a complicated program automatically discriminating the panning within the camera CPU 1, and that is also effective in decreasing the costs.

As a matter of course, during the exposure operation, the accurate vibration correction drive is conducted, and therefore the photographed result becomes satisfactory.

FIGS. 7 through 11 illustrate a third embodiment of the photographing apparatus having the anti-vibration function according to the present invention. In this embodiment, there will be described a case where the present invention is applied to an AF still camera incorporating the anti-vibration function shown in FIG. 11.

Figure 11:
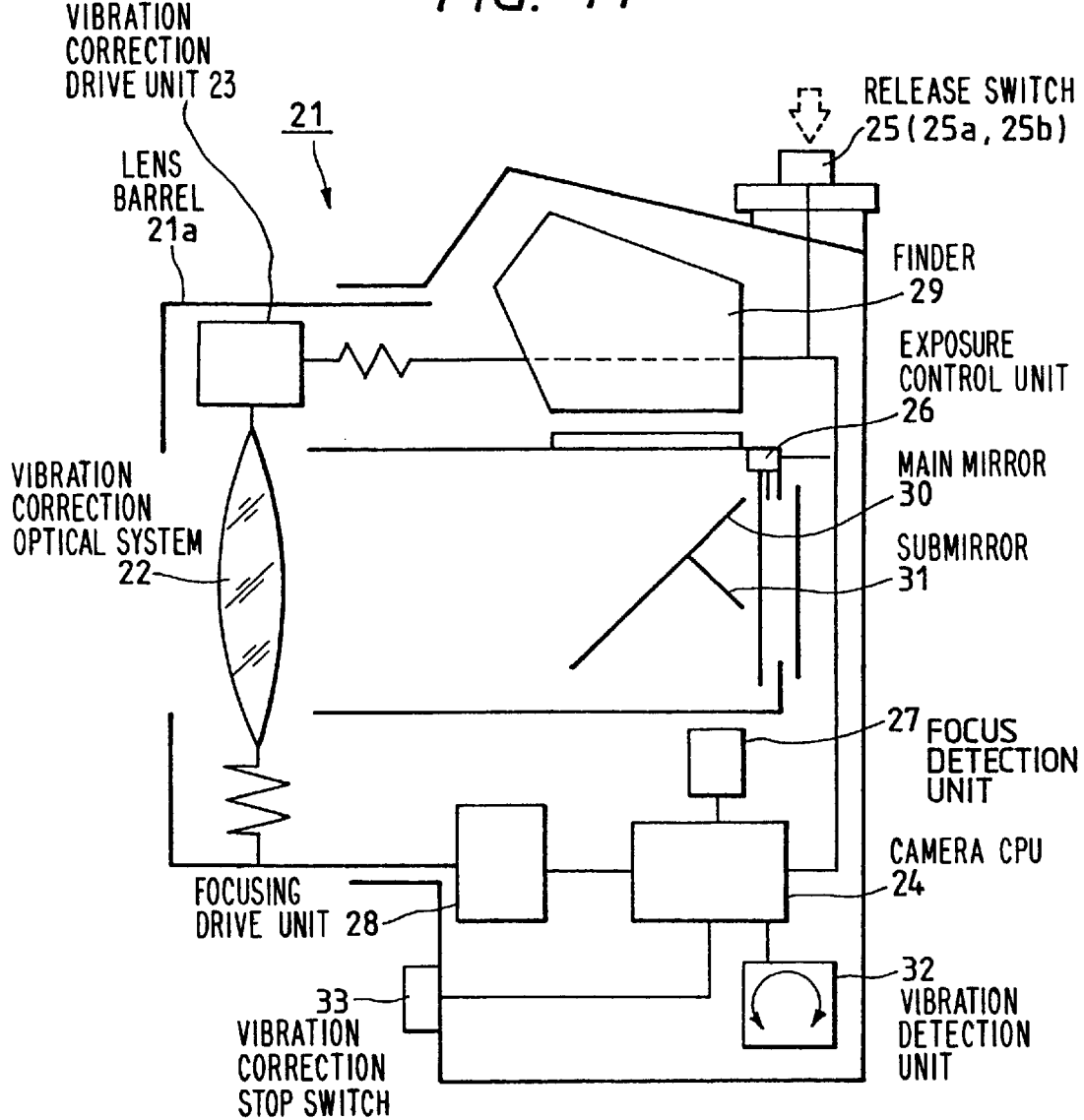
FIG. 11 is a schematic view illustrating a configuration of an AF still camera of the third embodiment according to the present invention.

Herein, an outline of a construction of this AF still camera 21 will be briefly explained with reference to FIG. 11. Referring to FIG. 11, a vibration correction optical system 22 is so disposed as to be shiftable within the plane orthogonal to the optical axis in a lens barrel 21a mounted on the front surface of the body of this camera 21 and, in this embodiment, has a structure serving as a photographing optical system.

Note that image blur on an imaging surface for an object is corrected by shifting the whole photographing optical system in this example. The construction is not, however, confined to this but may be such that a part of the photographing optical system is shift-driven, and a beam of light is deflected by variable apex-angle prism.

Vibration correction drive unit 23 corrects a vibration by shift-driving this vibration correction optical system 22. This vibration correction drive unit 23 is drive-controlled by a control signal transmitted from a camera CPU 24 incorporated into the camera body.

Herein, a release switch 25 of a camera is protrusively provided on the upper portion of the camera body. This release switch 25 is constructed, as a 2-step push switch, of a half-push switch 25a and a full-push switch 25b (see FIG. 7).

Note that when turning ON the half-push switch 25a (the switch is closed), there start a series of operations for photographic preparation in the respective units of the camera. The exposure operation is started by turning ON the full-push switch 25b.

Further, an exposure control unit 26 performs the exposure operation of the camera 21 and serves as a shutter mechanism in this example.

Moreover, a focus detection unit 27 detects an imaging state of the camera. A focusing drive unit 28 adjusts the imaging state of the camera. Note that the focusing operation of the camera 21 in this embodiment is based on an already-known one-shot AF drive method by which the exposure is conducted after being once focused, or the focusing drive is not again performed till the half-pushed state of the release switch 25 is released.

Connected, as a matter of course, to the camera CPU 24 are the above release switch 25 (25a, 25b), the exposure control unit 26, the focus detection unit 27 and the focusing drive unit 28, whereby the state discriminations are carried out by detecting, storing and calculating the detection outputs thereof or drive- and stop-controlling the respective units.

Further, the numeral 29 designates a finder, and a main mirror 30 is constructed of a half-mirror for guiding the photographing light to the finder 29. A submirror 31 guides the light beam penetrating the main mirror 30 to the focus detection unit 27.

Also, a vibration detection unit 32 detects a vibration caused by a camera shake applied to this camera 21 and is constructed of, for instance, a known angular speed sensor. Then, this vibration detection unit 32 is also connected to the camera CPU 24. The vibration correction drive unit 23 is drive-controlled in accordance with an output from this vibration detection unit 32.

A vibration correction stop switch 33 is protrusively provided in a lower position on the front surface of the camera body. When this switch 33 is manipulated and turned ON (the switch is closed), the vibration correction drive by the vibration correction mechanism unit 23 is stopped. When turning OFF the switch 33 (the switch is opened), a vibration correction drive stopped state is canceled.

Then, according to the vibration-correctable AF still camera 21 based on such a construction, as obvious from FIG. 7, the individual units are connected to the camera CPU 24. Detection outputs of the vibration detection unit 32 and of the focus detection unit 27 and also states of the respective switches 25, 33 are detected, stored and calculated, thus performing the state discriminations thereof. Then, the vibration correction drive unit 23, the exposure control unit 26 and the focusing drive unit 28 are thereby drive- and stop-controlled, and, thus, a predetermined AF operation and the vibration correction operation are carried out.

Given below is an explanation of the operation of the camera CPU with respect to the vibration detection and the vibration correction in the thus constructed camera 21 with reference to flowcharts of FIGS. 8A and 8B.

That is, the camera CPU 24, upon detecting that the release half-push switch 25a is in the closed state, performs the following the operation starting from step S300.

To begin with, in step S310, the camera CPU 24 detects a state of the release full-push switch 25b. When the switch is opened, the answer is NO in this step S310, and the processing proceeds to step S320 onwards.

Further, when the switch is closed, the answer is YES, and the processing goes onwards to step S390 in order to enter the exposure operation.

In step S320, the focus detection unit 27 detects an imaging state of the camera, and an output thereof is inputted to the camera CPU 24.

From the imaging state of the camera 21 that is obtained in this step S320, the camera CPU 24 calculates an adjustment quantity of the imaging state and outputs a drive control signal to the focusing drive unit 28. Then, the focusing drive shown in step S330 takes place. At this time, if the adjustment is not required (when already focused), no focusing drive may be effected.

Further, after being once focussed, exposure is performed; or alternatively, the focusing drive is not performed till the half-push switch 25a is brought into the opened state after the half-push state of the released switch 25 had been released.

Moreover, in step S340, the vibration detection unit 32 constructed of the angular speed sensor detects an angular speed of the vibration applied to the camera 21 and outputs this angular speed to the camera CPU 24.

Then, in step S350, the camera CPU 24 detects a state of the vibration correction stop switch 33. When the switch 33 is opened, the processing proceeds to next step S360.

When switch 33 is closed, the vibration correction drive is stopped, and therefore the processing returns to step S310.

The camera CPU 24, when proceeding to step S360 from step S340, calculates a vibration reference value for accurately converting the output of the vibration detection unit 32 into an angular speed.

More specifically, the vibration reference value is calculated as an average value (shift average value) of a closest predetermined number of outputs of the vibration detection unit 32 for a predetermined amount of time that are obtained in step S340. In this case, the average value of the predetermined number of outputs is sequentially stored in a memory unit within a control circuit such as RAM provided in the camera CPU 24 and then accessed when effecting the calculation.

Note that the if the predetermined number of vibration outputs are not obtained immediately after starting the operation of the camera 21, and, an average value of the vibration output data obtained is employed.

Further, after a sufficient time has elapsed after operating the camera, the vibration output data obtained earliest is always deleted from the memory unit of the camera CPU 24. A predetermined number of pieces of vibration output data may be used including the latest vibration output data.

The vibration output data obtained in step S340 are, if the processing jumps over step S360, not used for calculating the above vibration reference value.

Furthermore, when the vibration correction stop switch 33 is in the closed state, and, during a repetition of the returning action to step S310 from step S350, the vibration output data employed for calculating the above reference value are not updated.

Accordingly, the photographer at first performs the focusing operation in the get-ready-for-photographing status and next operates the vibration correction stop switch 33, thereby effecting a framing operation. In this case, the calculation of the vibration reference value is stopped just during the operation of the vibration correction stop switch 33. The vibration reference value calculated just before operations of the vibration correction stop switch 33 continues to be stored in the memory unit of the camera CPU 24.

When jumping over step S360 on the basis of the determination in step S350, it follows that the calculation of the vibration reference value is to be stopped.

In step S370, the vibration reference value already obtained in step S360 is subtracted from the vibration output obtained in step S340, whereby the camera CPU 24 obtains a true camera shake quantity.

This operation exhibits an effect of eliminating the drift component mixed in the vibration detection output.

Further, in step S380, the camera CPU 24 outputs, to the vibration correction drive unit 23, a proper drive control signal for correcting a vibration quantity caused by true camera shake arithmetically obtained in step S370. Then, the vibration correction optical system 22 is shifted to a predetermined state, thus correcting the vibration.

After finishing this step, the processing goes back to step S310, wherein the start of the exposure operation is determined.

When proceeding to step S390 on the basis of the determination in step S310, the camera CPU 24 detects a state of the vibration correction stop switch 33 in the same way as with step S350. Then, if the switch is opened, the processing goes to next step S400.

Whereas if the switch is closed, the vibration correction drive is also stopped during the exposure, and, hence, the processing jumps to step S430.

Note that the routing including this step S390 is executed a predetermined number of times for the duration of the exposure, but, after detecting that the switch is closed in the first routine, the processing may jump to step S430 even when the state changes to the switch-OFF for the exposure time. Further, the arrangement that the vibration correction stop can not be canceled for the duration of the exposure provides a more enhanced operability for a longer period of exposure.

On the other hand, in step S400, the camera CPU 24 inputs an output of the angular speed detected and outputted by the vibration detection unit 32 in response to vibration applied to the camera.

Subsequently, in step S410, the camera CPU 24 subtracts the vibration reference value already obtained in step S360 from the vibration output obtained in step S400, thus calculating a true camera shake quantity.

This operation exhibits the effect of eliminating the drift component mixed in the vibration detection output.

Further, in step S420, the camera CPU 24 outputs, to the vibration correction drive unit 23, the proper drive control signal for correcting the vibration quantity caused by the true camera shake quantity arithmetically obtained in step S410, thus shifting the vibration correction optical system 22.

Moreover, in step S430, the camera CPU 24 determines whether or not it is the time for starting the exposure operation. A factor for this determination may be the passage of a mirror-up completion time for the main mirror 30 and so on.

Then, if it is the start-of-exposure time, the processing proceeds to step S440. Whereas if not, the processing jumps to step S450. When the exposure has already been started, the processing also jumps to step 450.

Also, in step S440, the camera CPU 24 outputs an operation control signal to the exposure control unit 26, thereby starting the exposure operation.

Further, in step S450, the camera CPU 24 determines whether or not it is the time for finishing the exposure operation. Then, if not the end-of-exposure timing, the processing goes back to step S390. Whereas if it is the end-of-exposure time the processing proceeds to, to step S460.

In step S460, the camera CPU 24 outputs the operation control signal to the exposure control unit 26, thereby finishing the exposure operation. At this time, the vibration correction drive is also simultaneously finished.

Next, the processing proceeds to step S470, whereby a series of step operations come to an end.

In the above-mentioned step operations, from the start of the exposure onward, a repetitive execution of a routine ranging from step S390 to step S420 for a short period of time is a considerable burden in terms of the processing capability of the camera CPU 24. Carrying out the same calculation of the vibration reference value as that in step S360 in this routine might be a cause for increasing the costs since this entails an enhanced performance) of the camera CPU 24.

Then, using the before-exposure vibration reference value for the vibration correction drive control during the exposure, without being updated, is an effective measure in restricting the increase in the costs for the camera 21.

Note that if the performance of the camera CPU 24 can be enhanced depending on the conditions in terms of the performance and costs for the camera 21 as a whole, the same calculation of the vibration reference value as that in step S360 may be executed between step S400 and step S410.

Further, the camera may be constructed such that, with respect to the focusing operation also, not the focus detection but the measurement of a distance to the object is effected, and the imaging state of the photographing optical system is adjusted.

Moreover, when operated in a manual focus mode of a manual focus camera equipped with no autofocusing device or of an AF camera, the routine merely takes a form with an omission of steps S320 and S330, and, hence, it is evident that the above-discussed construction is applicable.

In other words, even when in the manual focusing operation, and if there is prepared a finder including especially a split prism and a microprism, the framing operation is carried out after being focused at the central portion of the finder in some cases. It can be therefore easily understood that the present invention becomes effective.

Figure 9:
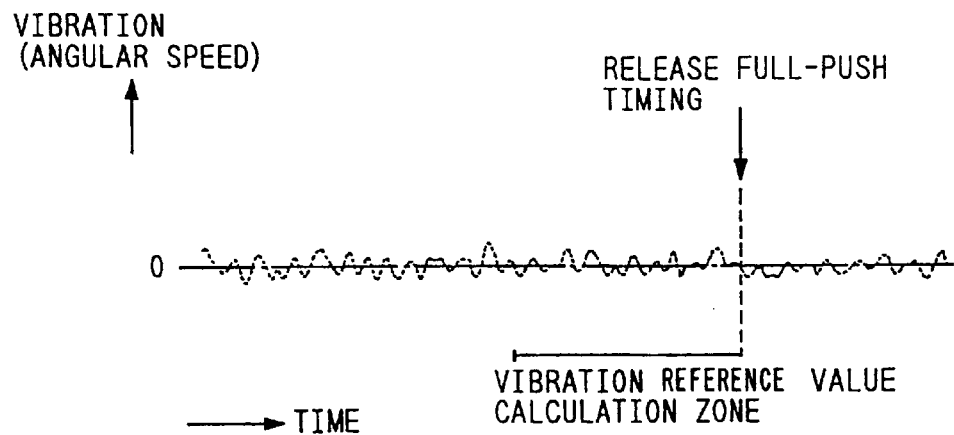
FIG. 9 is a diagram showing one example of the vibration detection output when the framing operation is not carried out.
Figure 10:
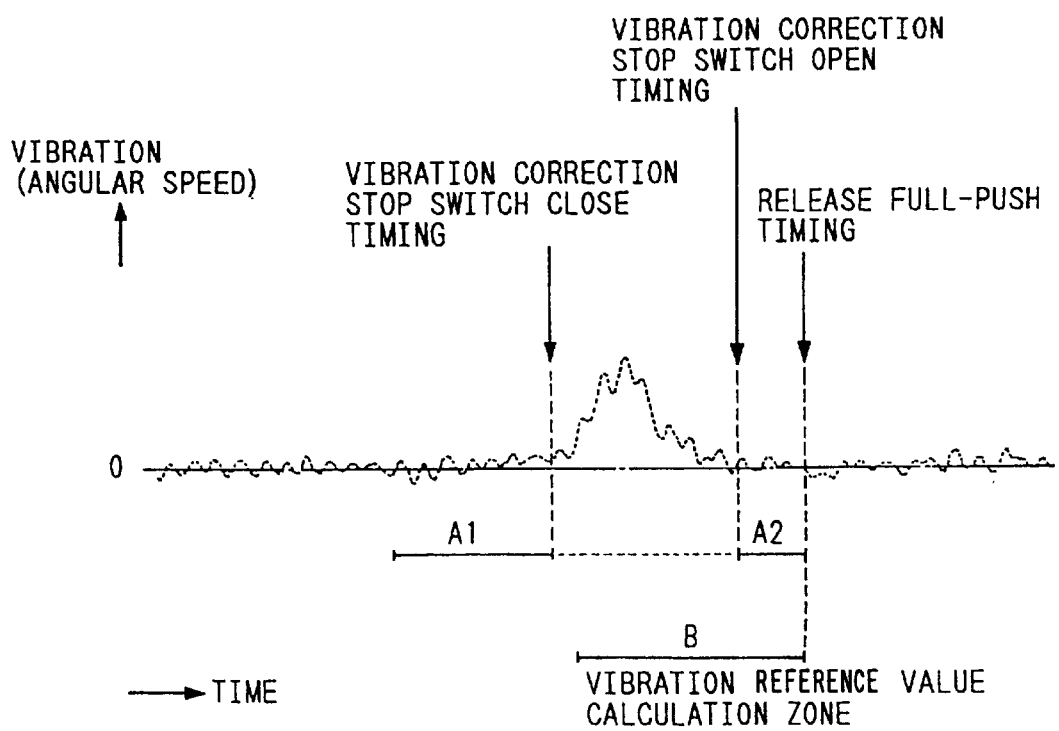
FIG. 10 is a diagram showing one example of the vibration detection output when performing the framing operation.

FIGS. 9 and 10 are characteristic diagrams showing a relationship of the vibration (angular speed) versus the time in a case where the framing operation is not performed (FIG. 9) and a case where the framing operation is performed (FIG. 10).

More specifically, FIG. 9 illustrates a typical example of the vibration detection output in a case where the photographing is, conducted as it is without changing the photographing visual angle after effecting the focusing operation, i.e., without performing the framing operation by making no manipulation of the vibration correction stop switch 33 also.

In other words, during the focusing operation while aiming at the object, the photographer concentrates so as not to change the photographing visual angle with respect to the object, and, therefore, the vibration detection output exhibits a distribution with the zero vibration point (where vibration equals zero or where angular speed equals zero) being centered.

Accordingly, in a situation described in this Figure, the photographer performs the exposure operation as it is, and, hence, the average value of the vibration detection outputs up to the time just before starting the exposure is usable as a zero vibration reference value.

Note that the vibration reference value calculation zone in this FIG. 9 is defined as a fixed area continuous to the full-push time at which the release full-push switch 25b is manipulated.

Herein, the average value of the vibration detections by the above vibration detection unit 32 is, as disclosed in, e.g., Japanese Patent Application Laid-Open No. 4-211230, obtained by an average value detection element for obtaining an average value of an output of an angular speed sensor making use of the Corioli's force and of an output of angular speed sensor within a predetermined time shorter than a period of the drift component contained in the output of the former angular speed sensor but longer than a period of the angular speed of the camera shake that is to be detected.

Figure 18:
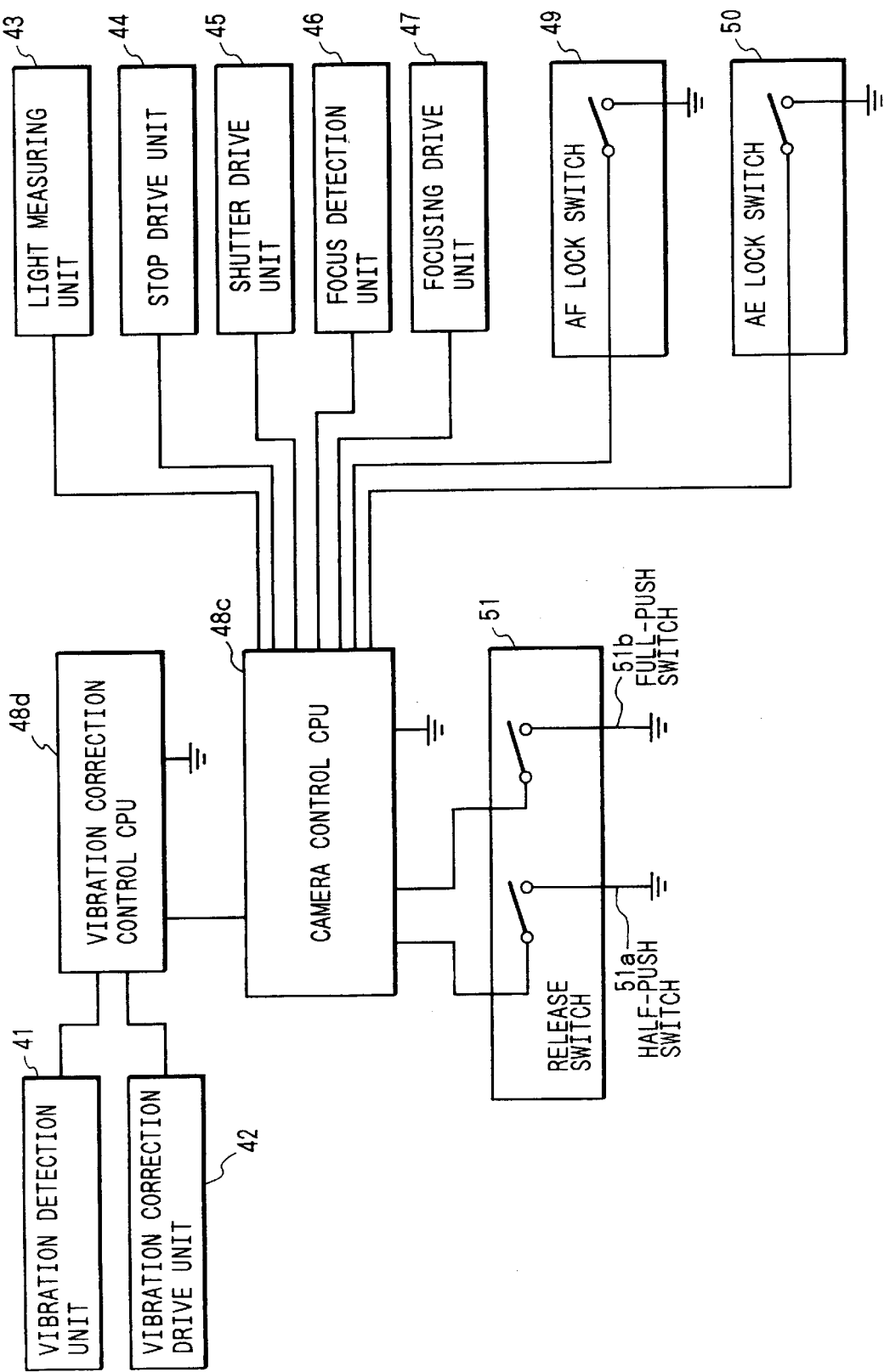
FIG. 18 is a flowchart showing the operation of the camera CPU in an eighth embodiment of the present invention.

Note that in the above prior art publication, as obvious from FIG. 18 and its explanation, the reference value is calculated by averaging a plurality of samples of A/D converted values at an interval of a fixed time. The calculation method is not limited to this, but there can be considered a variety of modified examples in which, for instance, an average value is taken at an interval of a predetermined time, and a reference value is obtained by calculating an average thereof.

The selection may also be properly made in accordance with the memory capacity of the memory unit of the control circuit of the camera CPU 24 or the like.

On the other hand, FIG. 10 illustrates a typical example of the vibration detection output in a case where the photographer changes the photographing visual angle (framing operation) to enhance the artistic effect of the photographed image after performing the focusing operation and then takes a photo after confirming the visual angle.

In such a case, during the focusing operation while aiming at the object, the photographer concentrates so as not to change the visual angle of the photographing with respect to the object, and, therefore, the vibration detection output exhibits a distribution with the zero vibration point (where vibration equal zero or where angular speed equals zero) being centered.

If, there is effected the framing operation for changing the photographing visual angle thereafter, however, the vibration detection output (angular speed output) with a bias to one side is thereafter produced but then reverts to the pre-change steadiness afterwards. When confirming the visual angle afterwards, the vibration detection output again exhibits the distribution with the zero vibration point being centered, and, meanwhile, the action enters the exposure operation.

Then, if the calculation of the vibration reference value continues to the time just before the exposure, it follows that the vibration reference value turns out an average value of the vibration detection outputs for a predetermined time up to the start of the exposure operation. During this period, however, a large bias component is contained in the vibration detection output due to the framing operation. Hence, this average value is largely different from the zero vibration point.

Accordingly, under such a condition, the photographer is able to perform the operation of changing the visual angle more smoothly by temporarily stopping the vibration correction drive when changing the visual angle (when performing the framing operation). If the vibration correction drive is not stopped, it follows that the vibration correction drive is carried out as if there was not change to the visual angle.

Then, the calculation and the updating of the vibration reference value during the framing operation are temporarily stopped by operating the vibration correction stop switch 33 (vibration correction stop SW closing time; corresponding to a return from S350 to S310 in FIG. 8A). When the vibration correction stop switch 33 is released in the confirmation of the visual angle before the photographing (vibration correction stop SW opening time; corresponding to progression to S360 from S350 in FIG. 8A), and if the calculation and-the updating of the vibration reference value resumes, the reference value can be calculated and updated only in such a condition as to exhibit the distribution with the zero vibration point being centered.

Then, the vibration correction drive can be performed at a higher accuracy during the exposure by using the thus obtained reference value as an output representing the value where vibration or angular speed can be considered to be zero. Note that the release full-push switch 25*b* is manipulated, and consequently the processing jumps from step S310 in the flowchart of FIG. 8A.

Herein, FIG. 10 is a diagram showing a status starting with a step of turning ON the half-push switch 25*a* and ending with a step of turning ON the release full-push switch 35*b* after turning ON the vibration correction stop switch 33 when effecting the framing operation subsequent to the focusing and turning OFF the switch 33 when finishing the framing operation. In this example, areas indicated by A1 and A2 in this diagram are defined as vibration reference value calculation zones. In this instance, however, the reference value may be calculated by employing only the zone A2 without using the zone A1 in the diagram.

Note that the symbol B in the diagram represents a vibration reference value calculation zone when the vibration correction stop switch 33 is not manipulated, and a difference from the calculated value given by A1+A2 will be apparent.

In other words, according to the present invention, the vibration detection output detected during the framing operation is not employed for calculating the reference value.

That is, the state just before operating the vibration correction stop switch 33 represents the time when the photographer performs the focusing operation of aiming at the object. Then, the vibration detection output exhibits the distribution with the zero vibration point being centered. It therefore follows that the shift average value of the vibration detection outputs is usable as an output of a zero vibration reference value.

Further, after finishing the framing operation, and when the vibration correction stop switch 33 is set in a non-operation state before being photographed, the photographer again holds the camera in a static and still state, and, the vibration detection output exhibits the distribution with the zero vibration point being centered. Then, it follows that the shift average value of the vibration detection outputs is usable as an output of a zero vibration reference value.

From the above-mentioned, the standard control element within the camera CPU 24 detects the state of the vibration correction stop switch 33 and likewise controls the operation of the standard generating element within the camera CPU 24. With this operation, if the vibration detection output during the framing operation is not used for calculating the reference value, the shift average value of the vibration detection outputs becomes a value representing the point where vibration is considered to be zero.

Accordingly, the thus obtained shift average value of the vibration detection outputs is set as a reference value of the vibration detection, and the drive of the vibration-correction drive unit 23 is controlled by use of a value obtained by subtracting this reference value from the vibration detection output. The bias component mixed in the vibration detection output can be thereby eliminated, and, at the same time, it is possible to prevent an occurrence of a drive error in the vibration correction drive unit 23 when effecting the exposure while preventing a decline in terms of the vibration detecting accuracy. This makes it feasible to correct the vibration by shift-driving the vibration correction optical system 22 in a predetermined state.

Figure 8B:
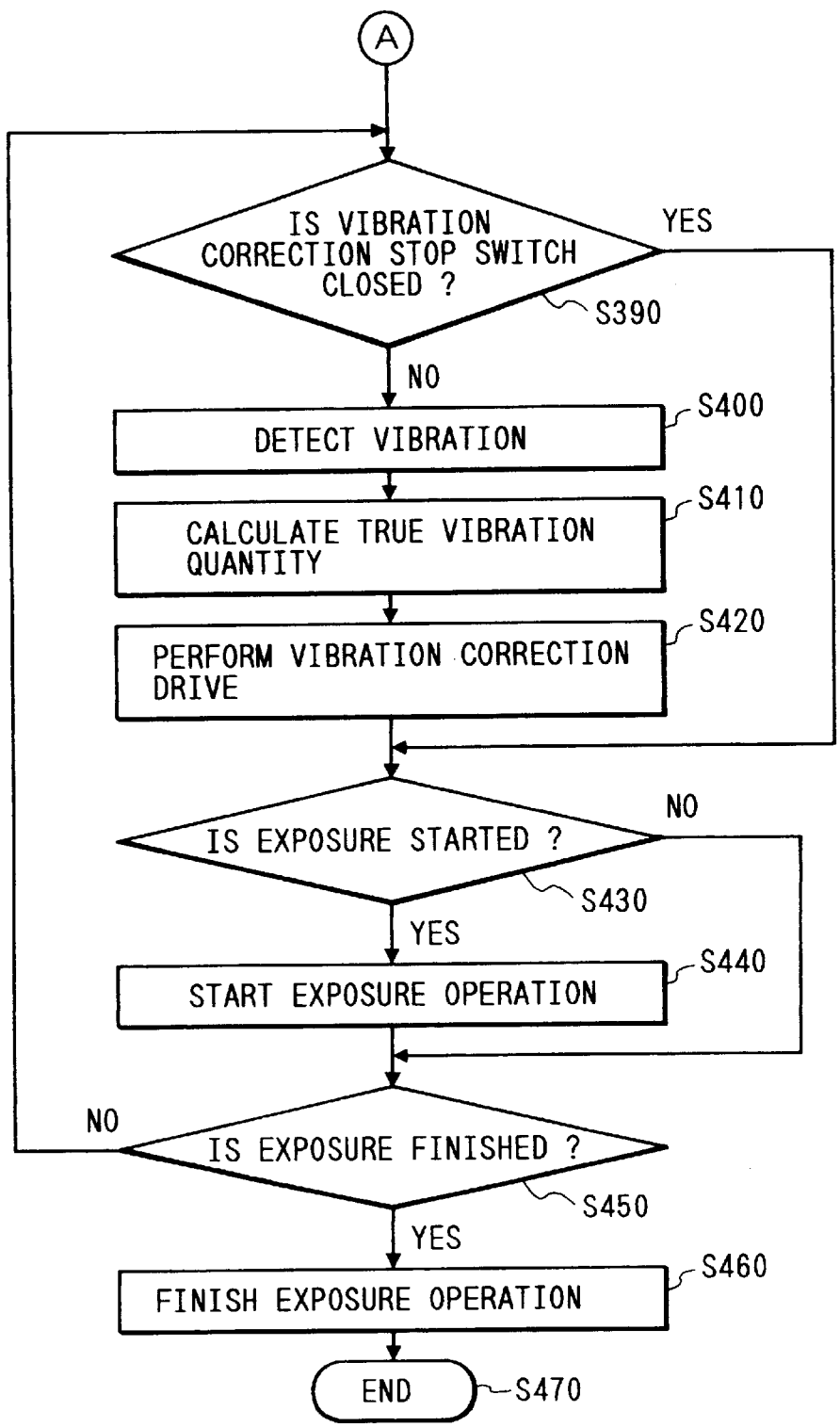
FIG. 8 is comprised of FIGS. 8A and 8B showing flowcharts depicting the operation of the camera CPU in the third embodiment of the present invention.
Figure 12:
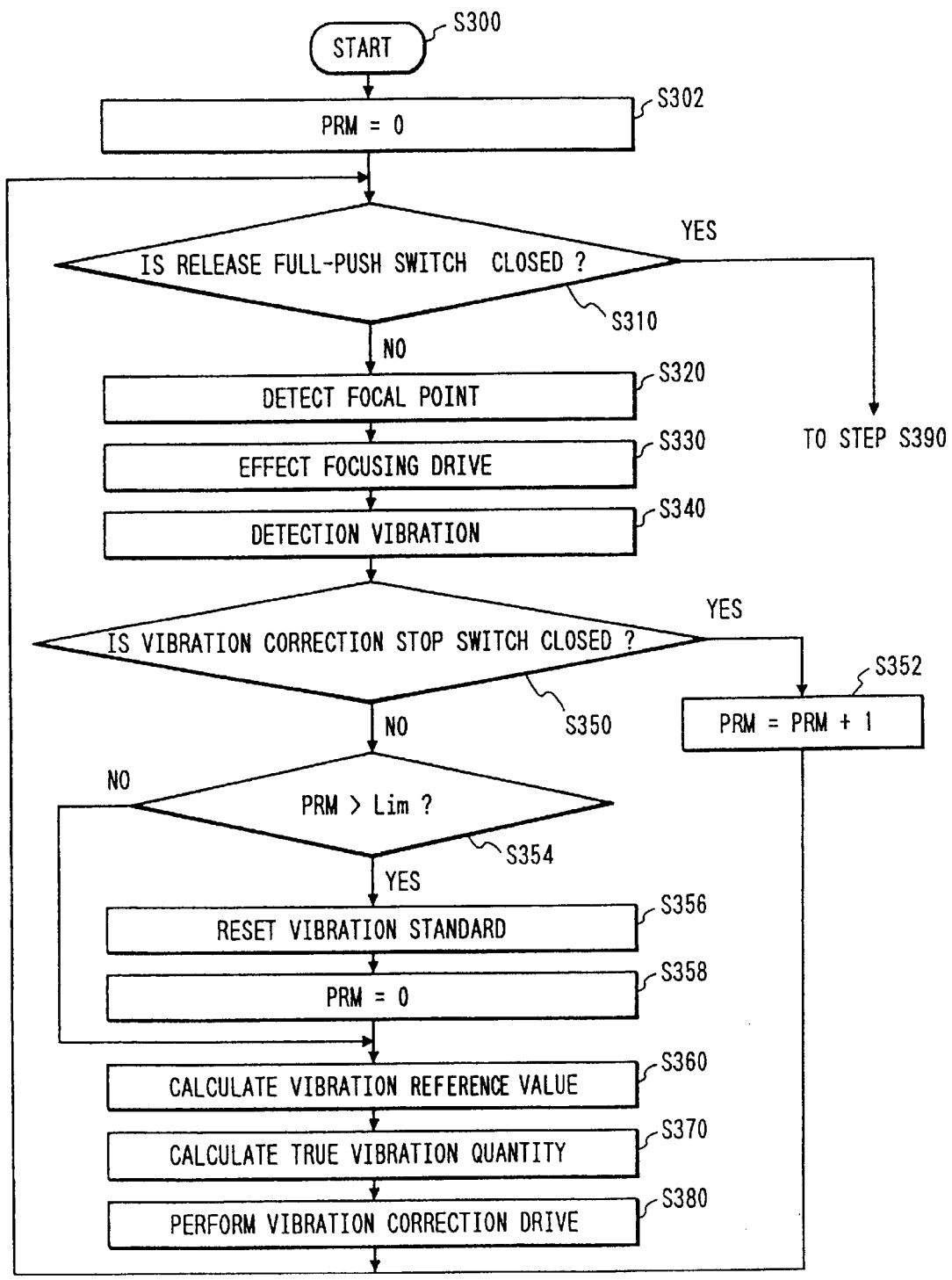
FIG. 12 is a flowchart showing the operation of the camera CPU in a fourth embodiment of the present invention.

FIG. 12 shows the operation of the camera CPU in a fourth embodiment of the present invention, i.e., a modified example of the operation of the camera CPU with respect to the detection and the camera shake and the vibration correction that have been explained referring to FIGS. 8A and 8B. The same steps as those in FIGS. 8A and 8B are marked with the like numerals, and their detailed explanations will be omitted.

In accordance with this fourth embodiment, in a flow of the basic operations of the focusing, the stop of the vibration correction, the framing, the stop or the cancellation of the vibration correction and the exposure, when stopping and canceling the vibration correction, a vibration reference value and its calculating operation conducted in step S340 are temporarily initialized.

More specifically, the calculation of the reference value which is conducted in step S340 involves calculating a shift average value of the vibration detection outputs. The stability, however, becomes higher with a considerably larger number of detection outputs employed for calculating the shift average value.

Hence, as illustrated in FIG. 10, when starting the exposure at an early stage after stopping or canceling the vibration correction, it follows that there is calculated a reference value having a larger ratio of the outputs detected before stopping the framing vibration correction.

Herein, if the operations up to the stop of the vibration correction, the framing, the stop or the cancellation of the vibration correction are elongated enough so as not to be ignorable in terms of a ratio to a drift period of an angular speed sensor serving as a vibration detection unit 32, there can not be exhibited an effect of eliminating the drift component mixed in the vibration detection output.

Under such circumstances, in accordance with this embodiment, the standard control element in the camera CPU 24 is made to incorporate a timer function, thereby performing a timer count operation in the camera CPU 24 from a start of the closed state of the vibration correction stop switch 33. After a limit timer (e.g., approximately one-half of the drift period of the sensor) or longer has elapsed, the vibration correction stop switch-33 is brought into the opened state. In this case, the reference value and the calculating operation thereof are temporarily initialized at that time, and, the calculation of the reference value resumes from that point of time.

The respective steps will be briefly explained. To start with, in step S302 immediately after step S300, the camera CPU 24 substitutes 0 into a parameter PRM for a status count of the vibration correction stop switch 33, thus making the initialization.

Further, in step S352 to which the processing jumps from step S350, the camera CPU 24 performs a count-up of the parameter PRM. That is, in step S352, there is effected the count-up in the closed state of the vibration correction stop switch 33.

On the other hand, in the opened state of the vibration correction stop switch 33, the processing proceeds from step S350 to step S354, wherein the camera CPU 24 makes a determination as to whether the parameter PRM is greater than Lim, a predetermined limit value.

Namely, in step S354, when the vibration correction stop switch 33 is opened from the closed state, there is determined a period for which the switch remains in the closed state. Note that the symbol Lim is a value corresponding to the limit time explained above.

When the parameter PRM is greater than Lim, this implies that the closed state of the switch exceeds the limit time, and, hence, the calculation of the reference value that is performed in step S360 has to be initialized.

Then, if the parameter PRM is greater than Lim is established, the processing proceeds to step S356. Whereas if the condition is not established, as in the same way with the processing explained in the flowchart of FIGS. 8A and 8B, the processing goes onwards to step S360.

In step S356, the camera CPU 24 resets the operation of calculating the reference value that is performed in step S360.

That is, there is initialized the number of the detection outputs for obtaining the shift average already stored in the memory unit or the like within the camera CPU 24, thus setting it in a state immediately after starting the operation of the camera. Given hereinbelow is a description of how the operation in step S360 based on the above operation is performed.

In step S358, the camera CPU 24 initializes the parameter PRM. This is intended to permit only one passage of step S356 on the basis of the determination made in step S354.

Then, the processing proceeds to step S360.

On the other hand, the calculation of the reference value in step S360, after passing through step S356, becomes identical with the operation performed in step S360 immediately after the operation of the camera, and it follows that only the vibration output data obtained in step S340 in this routine is employed.

Further, the switch is brought into the opened state, and, thereafter, in the routine of repeating a series of steps from S310 to S380, the processing does not pass through step S356. Hence, after a sufficient time has elapsed, as explained in FIGS. 8A and 8B, there is a calculating operation in step S360, which involves deleting the vibration output data obtained earliest at all times and using an average of the predetermined number of pieces of vibration output data including the latest vibration output data.

In this embodiment, the limit value Lim used in step S354 may be set to a proper value on the basis of the drift period of the sensor and the vibration period due to a camera shake by the photographer. Furthermore, the drift period of the sensor may be, because of the condition being different according to each camera, individually set and stored in a ROM (generally, an EEPROM is used) within the camera CPU 24 when manufacturing the camera.

Note that the above limit value adjusting element may be added to the camera in this embodiment so that the limit value is adjustable depending on the intention of the photographer, or alternatively, there may be added a switch capable of switching over the non-timer-function status explained in FIGS. 8A and 8B and the timer-function status explained in FIG. 12.

If the above-mentioned timer function is omitted, and, when the vibration correction stop switch 33 is opened from the closed state, the calculating operation of the reference value that is effected in step S360 is reset unconditionally. Even in such a case, there is a lower possibility in which the release operation is carried out immediately after performing the above switch manipulation, and, hence, there is no problem in terms of practicality.

Particularly, as discussed by way of the modified example of FIGS. 8A and 8B, in the case of such a camera that the same vibration reference value calculation step as step S360 is executed also in a series of exposure operations, the calculation and the updating of the reference value are carried out at the exposure preparatory stage, and this is therefore preferable for the application.

Figure 13:
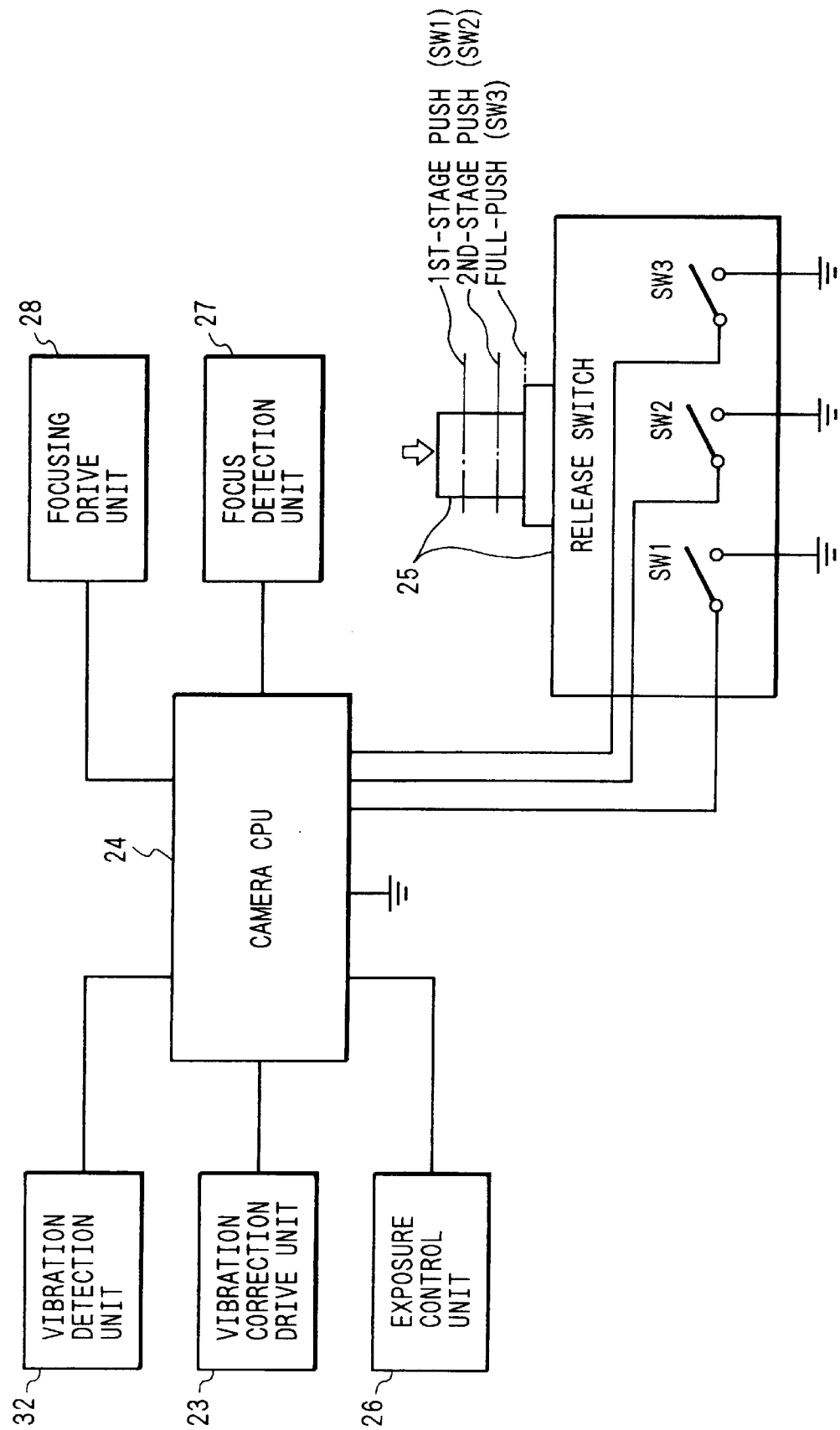
FIG. 13 is a block diagram illustrating a modified example of the control system shown in FIG. 7.

FIG. 13 illustrates a modified example of the control system shown in FIG. 7. In the embodiment illustrated in FIG. 7, the vibration correction stop switch 33 defined as a vibration correction stop element is so protrusively mounted on the lower portion of the front surface of the camera body as to be manually operable. The vibration correction stop switch 33 is so constructed as to be intentionally operable by the photographer. In the modified example shown in FIG. 13, however, the release switch 25 is based on a three-step push structure and is therefore constructed of a 1st-step push switch SW1, a 2nd-step push switch SW2 and a 3rd-step full-push switch SW3 so that these switches are operable by one switch operating unit.

In the three-step push release switch 25, the 1st-step push switch SW1 is constructed as a switch substituting for the above-described vibration correction stop switch 33. This switch SW1 switches ON the AF operation but switches OFF an anti-vibration function. The 2nd-step push switch SW2 keeps the AF in the ON-state but switches ON the anti-vibration function. At the same time, the 3rd-step full-push switch SW3 is preferably constructed as a switch performing the same function as that of the full-push switch 25b shown in FIG. 7.

The construction is not, however, confined to this. The 1st-step push switch SW1 operates only the AF as in the same way with the half-push switch 25a of FIG. 7 but keeps the anti-vibration function in the ON-state. The 2nd-step push switch SW2 is constructed as a switch substituting for the vibration correction stop switch 33. At the same time, the 3rd-step full-push switch SW3 may be constructed as a switch performing the same function as that of the full-push switch 25b of FIG. 7 and, simultaneously, letting the anti-vibration function OFF. Further, the above-described two switch specifications may be so arranged as to be selectably changed over depending on the intention of the photographer.

Figure 14:
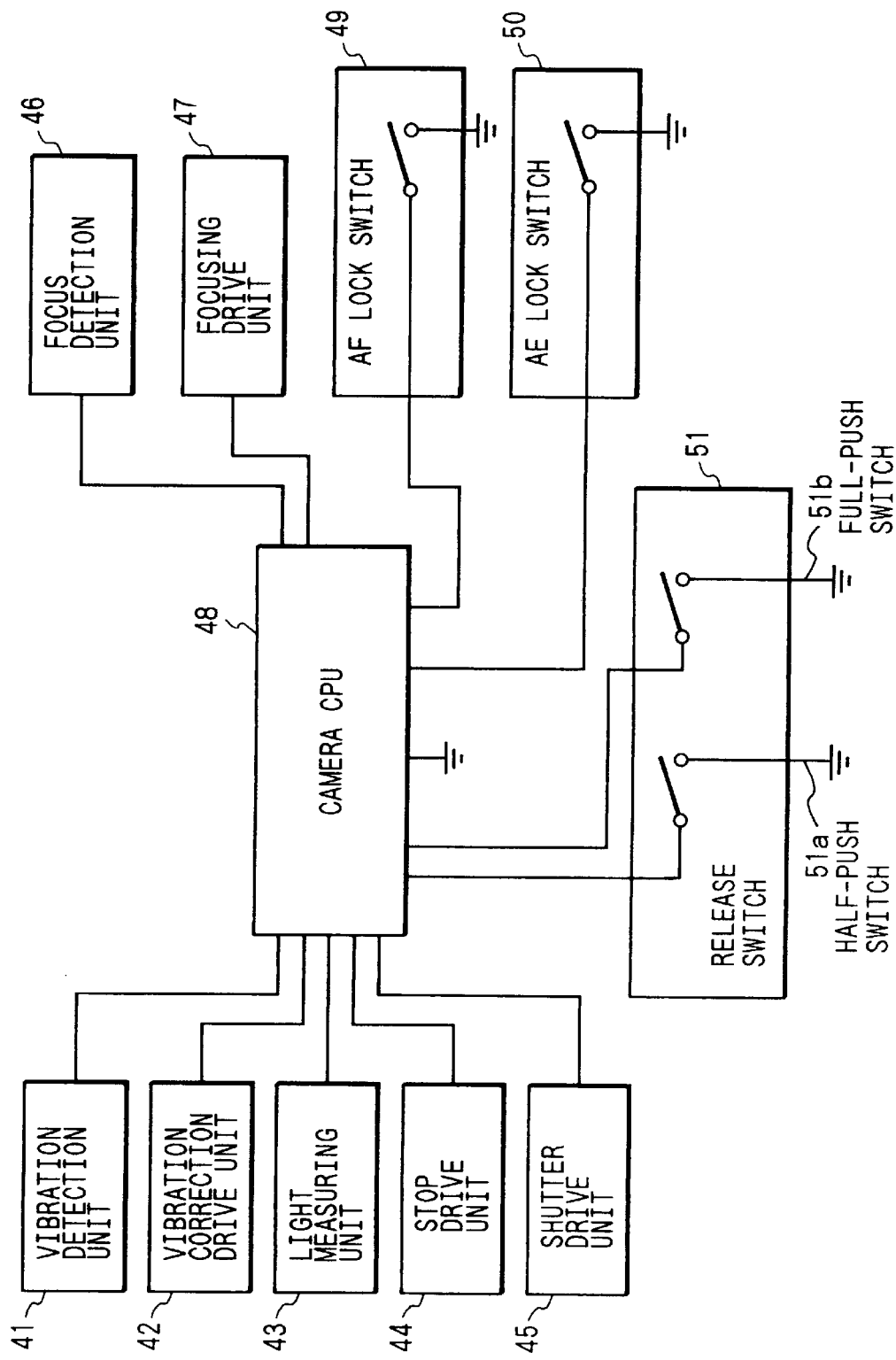
FIG. 14 is a block diagram illustrating the control system in fifth and sixth embodiments of the present invention.

FIG. 14 is a block diagram illustrating a control system in fifth and sixth embodiments of the present invention.

A vibration detection unit 41 detects the vibration caused by the camera shake acting on the camera. The vibration detection unit 41 is, for instance, a conventionally known angular speed detection sensor. A preferable sensor is of a type known as a vibration gyroscope mounted on a small-sized apparatus such as a camera or the like.

A vibration correction drive unit 42 drives a vibration correction optical system (unillustrated) in a direction substantially perpendicular to the optical-axis direction in order to correct the vibration. The vibration correction drive unit 42 is of a conventionally known type, preferably, for instance, a type (1) to shift the vibration correction optical system with rotations of a motor-driven feed screw or a type (2) to shift the vibration correction optical system with a rectilinear motion of a coil called a voice coil or with an electromagnetic force acting on a winding coil.

A light measuring unit 43 measures a luminance of the object or an illuminance of the object light penetrating the photographing lens according to a TTL light measuring method in order to determine an exposure when taking a photo.

A stop drive unit 44 drives a stop for regulating the illuminance on the film surface when performing the exposure operation of the camera.

A shutter drive unit 45 drives a shutter for controlling a film exposure time when effecting the exposure operation of the camera.

A focus detection unit 46 detects an imaging state of the photographing lens.

A focusing drive unit 47 controls the imaging state of the photographing lens.

A camera CPU 48 is electrically connected to the above units ranging from the vibration detection unit 41 to the focusing drive unit 47 and also respective switches 49 to 51 which will be mentioned later. The camera CPU 48 detects states of the respective detection units and of the switches and further controls a start and a stop of the driving by each drive unit. Moreover, the camera CPU 48 in the embodiments incorporates a variety of functions such as a memory function, an arithmetic function, a state determining function and a timer function.

An AF lock switch 49 is a switch for stopping the driving by the focusing drive unit 47. The camera CPU 48, when detecting the closed state of the AF lock switch 49, effects the control to stop the driving by the focusing drive unit 47.

An AE lock switch 50 is a switch for stopping the updating of an exposure arithmetic value. The camera CPU 48, when detecting the closed state of the AE lock switch 50, stops the updating of the exposure arithmetic value, which is executed within the camera CPU 48. Accordingly, when starting the exposure operation of the camera in the closed state of the AE lock switch 50, the drive control of the stop drive unit 44 and of the shutter drive unit 45 is conducted with the exposure arithmetic value calculated based on an item of detection data of the light measuring unit 43 just before the AE lock switch 50 is closed.

A release switch 51 includes a half-push switch 51a and a full-push switch 51b.

The half-push switch 51a is a switch for starting a series of operation of the camera. The camera CPU 48, when detecting the closed state of the half-push switch 51a, starts the series of operations of the camera.

The full-push switch 51b is a switch for starting the exposure operation of the camera. The camera CPU 48, when detecting the closed state of the full-push switch 51b, starts the exposure operation of the camera.

FIGS. 15A and 15B are flowcharts showing the operation of the camera CPU in the fifth embodiment of the present invention. When the camera CPU 48 detects the closed state of the half-push switch 51a, the operations shown in FIGS. 15A and 15B start with step S500.

At the onset, in step S510, the camera CPU 48 sets (or resets), to 00, a parameter PM for determining states of the AF lock switch 49 and of the AE lock switch 50.

The parameter PM is preferably stored in a RAM unit within the camera CPU 48 but may be stored in a memory device such as a RAM or the like provided otherwise or in a magnetic or magneto-optic storage medium.

Next, the processing proceeds to step S520, the camera CPU 48 detects a state of the full-push switch 51b. The processing goes, when the full-push switch 51b is in the opened state, to step S530 but diverges, when in the closed state, to step S650, wherein the exposure operation is to be carried out.

In step S530, the camera CPU 48 inputs an item of data about the object luminance detected by the light measuring unit 43. Subsequently, in step S540, the camera CPU 48 inputs data about the camera imaging state detected by the focus detection unit 46. Further, in step S550, the camera CPU 48 input data about a vibration (e.g., an angular speed) acting on the camera, which is detected by the vibration detection unit 41.

Next, in step S560, the camera CPU 48 detects a state of the AE lock switch 50. When the AE lock switch 50 is in the opened state, the processing proceeds to step S570 but goes, when in the closed state (when the photographer turns ON the AE lock switch 50), to step S580 without performing the exposure arithmetic operation in step S570.

In step S570, the camera CPU 48 calculates control values of the stop drive unit 44 and of the shutter drive unit 45 in order to perform a proper exposure on the basis of the detection data of the light measuring unit 43 that are obtained in step S530, and these control values are stored therein. Employed at this time on the occasion of the above arithmetic operation are items of data about AE mode settings of a stop priority AE, a shutter priority AE and a program AE, a stop value set in the case of the stop priority AE and a shutter speed set in the case of the shutter priority AE or exposure data of a film sensitivity used for the photographing and an exposure correction.

On the other hand, in step S580, the camera CPU 48 adds "10" to the parameter set in step S510 to store the fact that the AE lock switch 50 is in the closed state, and the processing proceeds to step S590.

In step S590, the camera CPU 48 detects a state of the AF lock switch 49. The processing goes, when the AF lock switch 49 is in the opened state, to step S600 but diverges, when in the closed state (when the photographer turns ON the AF lock switch 49), to step S610 without effecting the focusing operation in step S600.

In step S600, the camera CPU 48 calculates an adjusting quantity of the imaging state on the basis of the detection data of the focus detection unit that is obtained in step S540. The camera CPU 48 then outputs a drive control signal to the focusing drive unit 47, and the processing proceeds to step S620. At step S620, there is no necessity for adjustment (when already focuses), i.e. no driving is effected.

On the other hand, in step S610, the camera CPU 48 adds 01 to the parameter PM set in step S510 or S580 to store the fact that the AF lock switch 49 is in the closed state, and the processing moves to step S620.

In step S620, the camera CPU 48 determines whether or not the value of the parameter PM is 00. If the parameter PM is 00, i.e., when the AE lock switch 50 and the AF lock switch 49 are not brought into the closed state, the processing proceeds to step S630. Whereas if the parameter PM is not 00, viz., when at least one of the AE lock switch 50 and the AF lock switch 49 is brought into the closed state, the processing moves to step S640.

In step S630, the camera CPU 48 calculates a vibration quantity of the camera on the basis of the detection data of the vibration detection unit that is obtained in step S550 and outputs the drive control signal to the vibration correction drive unit 42 in order to correct the vibration. When passing through this step for the first time (including the case of passing through this step for the first time after a passage through step S640), the drive of the vibration correction drive unit 42 is started. The vibration correction drive is continuously conducted from the first time onwards. Thereafter, the processing returns to step S510.

Note that there will be omitted a detailed explanation of the method of controlling the vibration correction drive in this embodiment. However, the following way may be taken. Some latest items of vibration data obtained in step S550 are stored in the camera CPU 48 or in a memory device such as RAM, etc. Then, the camera CPU 48 separately calculates statistical and analytical data about re-averaged values obtained after eliminating an average value, a rate of variation, an integral value, a differential value and a second-order differential value or an abnormal value of time-series data thereof. Based both on the detection data of the vibration detection unit 41 that is obtained in step S550 and on the above arithmetic values, the camera CPU 48 outputs an optimum drive control signal to the vibration correction drive unit 42 to correct the vibration.

On the other hand, in step S640, the camera CPU 48 outputs a drive stop signal to the vibration correction drive unit 42, thereby stopping the drive of the vibration correction drive unit 42. When consecutively passing through this step, the stop of the drive of the vibration correction drive unit 42 is made to continue. Thereafter, the processing goes back to step S510.

In step S520, when the full-push switch 51b is in the closed state, the processing proceeds to step S650.

In step S650, the camera CPU 48 inputs an item of data about the vibration (e.g., the angular speed) acting on the camera, which is detected by the vibration detection unit 41. This is the same processing as step S550.

Next, in step S660, the camera CPU 48 calculates the vibration quantity of the camera on the basis of the detection data of the vibration detection unit 41 that is obtained in step S650 and outputs the drive control signal to the vibration correction drive unit 42 to correct the vibration. This is the same processing as step S630. Note that this step is passed even when the AE lock switch 50 of the AF lock switch 49 is in the closed state. When in the exposure state of the camera, and even if both the switch 49 and the switch 50 are in the closed state, it follows that the stopped state of the vibration correction drive is canceled. Then, the vibration correction drive is to be effected at the exposure time irrespective of the states of the above two switches 49, 50.

Next, in step S670, the camera starts the exposure operation. The camera CPU 48 outputs the drive control signals to the stop drive unit 44, the shutter drive unit 45 and other elements required in the drive when starting the exposure. The camera CPU 48 then controls the respective units so that the proper exposure can be done. Note that this step is effective only when passed for the first time, and, because of having already entered the exposure operation from the second time onwards, a series of exposure operations continue as they are.

In step S680, the camera CPU 48 determines whether or not it is the time for finishing the exposure operation. If not at the end-of-exposure time, the processing returns to step S650. Whereas if it is the end-of-exposure time, the processing proceeds to step S690.

In step S690, the camera CPU 48 outputs the drive control signals to the stop drive unit 44, the shutter drive unit 45, etc., thus finishing the exposure operation. At this time, a drive stop signal is also outputted to the vibration correction drive unit 42, thus finishing the vibration correction drive. Then, the processing goes to step S700, wherein the series of operations come to an end.

With the series of operations discussed above, in the vibration correction oriented camera according to the present invention, when performing the framing operation at a photographing preparatory stage, the photographer turns ON at least one of the AF lock switch 49 or the AE lock switch 50. At this time, the vibration correcting operation is stopped. Accordingly, there is eliminated the necessity for the operation of stopping the vibration correcting operation by the photographer, with the result that the operability of the camera is enhanced.

Note that the vibration correcting operation is automatically started simultaneously when starting the exposure operation, and, hence, there is no possibility in which the exposure operation is conducted while the vibration correcting operation remains stopped.

Further, the camera is equipped with a switch serving as both of the AE lock switch 50 and the AF lock switch 49 by way of an applied example of this embodiment. The vibration correcting operation may be stopped depending on a state of this switch. For example, the camera may be provided with a changeover switch serving as an AE lock function when operating the AF lock switch 49. In contrast with this, the AE lock switch 50 may serve as an AF lock function switch.

Alternatively, with respect to a setting of such a switch function, for instance, a command signal is supplied from outside to the camera CPU 48, whereby the function of each switch may be changed.

In the above-described case, the AE lock switch 50 and the AF lock switch 49 may be formed into a single piece of switch. In this case, steps S590 to S610 are unnecessary.

Also, the setting of the value of the parameter PM is not limited to the above described embodiment. For example, the parameter PM may be set to 0 in step S510, and 1 may be added in steps S580, S610. In step S620, there may be made a determination as to whether PM equaled "0". If the camera CPU 48 is capable of discriminating the states of the two switches, other determination forms may be taken.

Still further, the vibration correcting operation may interlock with only one of the AF lock switch 49 or the AE lock switch 50. In addition, there may be added a switch that is switchable to interlock with one or both of them.

Figure 16:
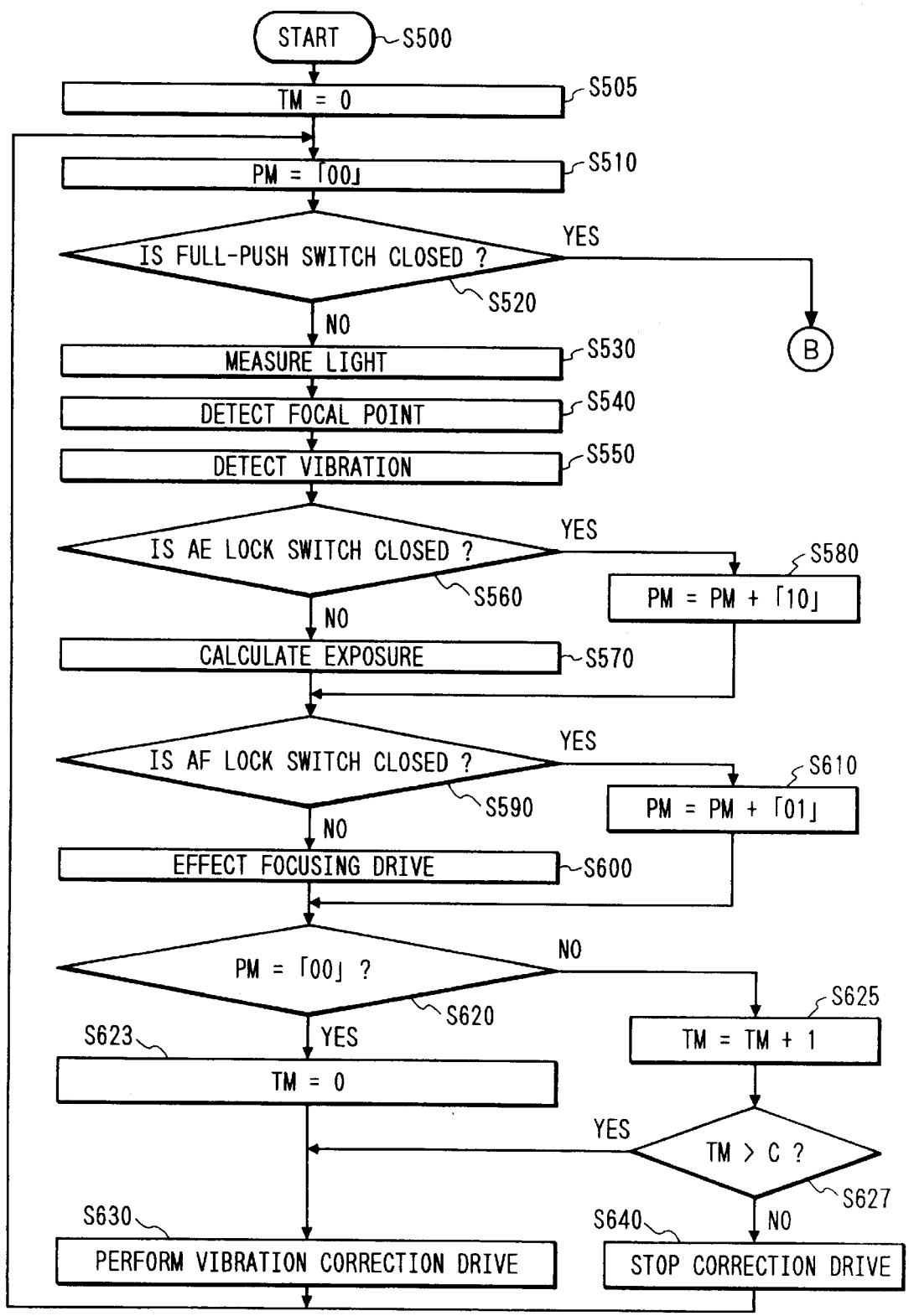
FIG. 16 is a flowchart showing the operation of the camera CPU in the sixth embodiment of the present invention.

FIG. 16 is a flowchart showing the operation of the camera CPU in the sixth embodiment of the present invention. In accordance with the present invention, the camera CPU 48 incorporates a timer function for counting a duration of the closed state of the AF lock switch 49 or the AE lock switch 50. Then, after a predetermined time has elapsed since the photographer had set the AF lock switch 49 or the AE lock switch 50 in the closed state, the stopped state of the vibration correction drive is automatically canceled.

Based on such a construction, in a case such as viewing the object once again after the framing operation before the photographing, the vibration correction drive automatically resumes, and the usability in the form of vibration correction oriented camera is further improved.

Referring to FIG. 16, when the camera CPU 48 detects that the half-push switch 51a is in the closed state, the processing starts with step S500. Note that the same steps as those explained in FIGS. 15A and 15B are marked with the like numerals, and their repetitive explanations will be omitted.

First, in step S505, the camera CPU 48 resets, to 0, a parameter TM for counting a duration of the closed state of the AF lock switch 49 or the AE lock switch 50. This parameter TM is preferably, as in the same way with the parameter PM of FIGS. 15A and 15B, stored in RAM within the camera CPU 48 or in other data storage mediums. Next, the processing proceeds to step S510, the same processing as that in FIGS. 15A and 15B is carried out up to step S620.

In step S620, the processing proceeds, when the parameter PM is 00, to step S623 but diverges, when the parameter PM is not 00, to step S625.

In step S623, since the AE lock switch 50 and the AF lock switch 49 are not in the closed state, the camera CPU 48 resets the parameter TM to 00, and the processing goes to step S630.

On the other hand, in step S625, since at least one of the AE lock switch 50 and the AF lock switch 49 is in the closed state, the camera CPU 48 adds 1 to the parameter TM, and the processing proceeds to step S627.

In step S627, the camera CPU 48 determines whether or not the parameter TM is larger than a predetermined value C. If the parameter TM is the predetermined value C or smaller, i.e., if the duration of the closed state of the AF lock switch 49 of the AE lock switch 50 does not reach the predetermined time, the processing moves to step S640 (a state where the vibration correction function is stopped). On the other hand, in step S627, if the parameter TM is larger than the predetermined value C, that is, when the duration of the closed state of the AF lock switch 49 or the AE lock switch 50 reaches the predetermined time, the processing proceeds to step S630 where the vibration correction function works.

In steps S630 and S640, the same processing as that in FIGS. 15A and 15B is performed.

With the operations described above, the duration of the closed state of the AF lock switch 49 or the AE lock switch 50 is counted, and, when the duration reaches the predetermined time, the stopped state of the vibration correction drive is canceled.

Note that when the predetermined time elapses while the AF lock switch 49 or the AE lock switch 50 remains closed, the processing diverges to step S627 wherein the parameter TM continues to be counted up even after automatically canceling the stopped state of the vibration correction drive. When both of the switches 49 and 50 are brought into the opened state, the parameter is reset in step S623.

Further, the setting of the value of the parameter TM is not limited to the above described embodiment. For instance, the parameter in steps S505 and S623 may be set, for instance, to the predetermined value C. The calculation in step S625 may be effected as a subtraction, like this: where the parameter is decremented by "1". The determination in step S620 may also be made to determine whether the parameter is less than zero. If the camera CPU 48 is capable of detecting the durations of the closed states of the two switches 49, 50, other determination forms may be adopted.

Further, the timer function may interlock with just one of the AF lock switch 49 and the AE lock switch 50. Moreover, there may be added a changeover switch selectable by the photographer so as to interlock with one or both of them.

Figure 17:
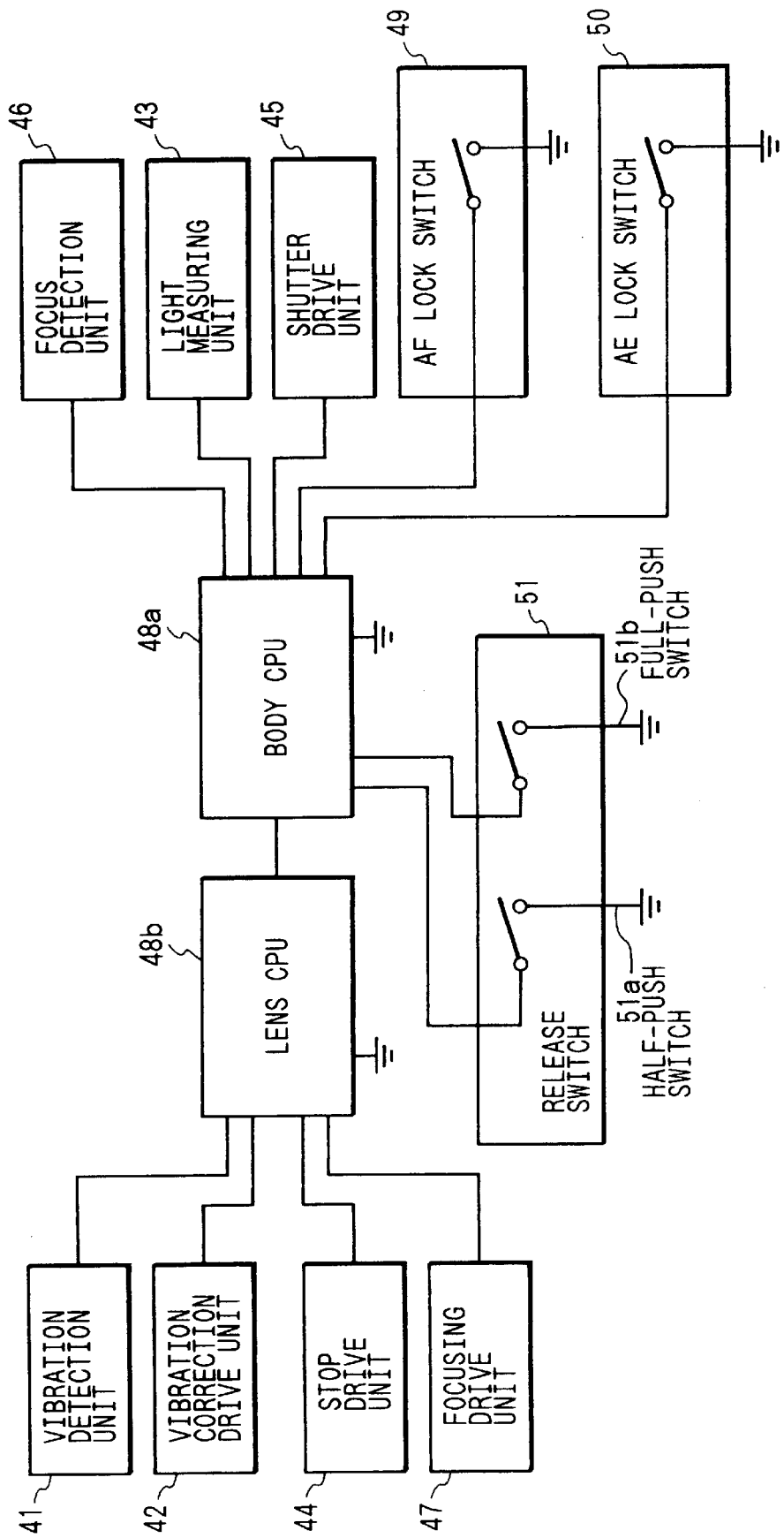
FIG. 17 is a block diagram showing the control system in a seventh embodiment of the present invention.

FIG. 17 is a block diagram illustrating a control system in a seventh embodiment of the present invention. The camera with this anti-vibration function is conceived as a lens interchangeable camera. Hereinafter, the same constructive elements as those in FIG. 14 are marked with the like numerals, and their repetitive explanations will be omitted. This camera comprises a body CPU 48a mounted on the side of the camera body and a lens CPU 48b mounted on the side of the interchangeable lens (on the side of the lens barrel). The body CPU 48a and the lens CPU 48b are, when a lens unit is mounted on the camera body, electrically connected to each other.

Provided on the side of the lens unit are the vibration detection unit 41, the vibration correction drive unit 42, the stop drive unit 44 and the focusing drive unit 47. The lens CPU 48b performs signal processing and control processing with respect to these elements.

On the other hand, the focus detection unit 46, the light measuring unit 43, the shutter drive unit 45 and the respective switches 49, 50, 51 are provided on the side of the camera body. The body CPU 48a performs the signal processing and the control processing with respect to these elements.

The lens CPU 48b controls the steps S550, S600, S630, S640 in FIG. 16 and steps S650, S660 in FIG. 15B. The body CPU 48a controls the steps other than the above-mentioned.

In this embodiment, steps S550, S650 may be effected in advance of steps S630, S640, S660, and the sequence of the steps is not necessarily based on the relation shown in FIG. 16.

Further, in step S600, the body CPU 48a calculates an adjustment quantity of the imaging state and transmits, to the lens CPU 48b, a signal pertaining to the drive quantity with which the focusing drive should be done. The lens CPU 48b may output a drive control signal to the focusing drive unit 47 on the basis of this signal.

Furthermore, the body CPU 48a, when the processing proceeds to step S630 from step S627, transmits a vibration correction drive start signal or an operation continuance signal to the lens CPU 48b in step S630. The body CPU 48a, when going to step S640, transmits a vibration correction drive stop signal or a stop continuance signal to the lens CPU 48b in step S640. The lens CPU 48b may conform with those indications of the body CPU 48a.

Otherwise, the body CPU 48a may send, to the lens CPU 48b, indications relative to the start of the vibration correction drive in step S660, the start of the exposure in step S670 and the exposure operation end time in step S690.

Alternatively, according to another sharing method, the lens CPU 48b may perform the parameter PM/TM setting, the calculations and the determining operations in steps S505, S510, S550, S580, S610, S620, S623, S625, S627, S630, S640.

In this case, the body CPU 48a detects the states of the respective switches in steps S560, S590, and the data signals relative to the states of the switches may be transmitted to the lens CPU 48b.

FIG. 18 is a block diagram illustrating a control system in an eighth embodiment of the present invention. The eighth embodiment presents a modified example of the seventh embodiment, wherein the camera body incorporates the stop drive function and the focusing drive function.

A camera control CPU 48c is mounted on the side of the camera body and performs the signal processing and the control processing with respect to the elements such as the light measuring unit 43, the stop drive unit 44, the shutter drive unit 45, the focus detection unit 46, the focusing drive unit 47, the AF lock switch 49, the AE lock switch 50 and the release switch 51.

Further, a vibration correction control CPU 48d is mounted on the side of the lens unit and effects the signal processing and the control processing with respect to the vibration detection unit 41 and the vibration correction drive unit 42.

The vibration correction control CPU 48d controls steps S550, S630, S640 in FIG. 16 and step S650, S660 in FIG. 15B, but the steps exclusive of the above-mentioned are controlled by the camera control CPU 48c.

In this embodiment, steps S550, S650 may be effected in advance of step S630 or S640 and step S660, and the sequence of the steps is not necessarily based on the relation shown in FIG. 16.

Further, the camera control CPU 48c, when the processing proceeds to step S630 from step S627, transmits the vibration correction drive start signal or the operation continuance signal to the vibration correction control CPU 48d in step S630. The camera control CPU 48c, when going to step S640, transmits the vibration correction drive stop signal or the stop continuance signal to the vibration correction control CPU 48d in step S640. The vibration correction control CPU 48d may conform with those indications of the camera control CPU 48c.

Otherwise, the camera control CPU 48c may send the indication relative to the timings in step S660, S690 to the vibration correction control CPU 48d.

Alternatively, according to still another sharing method, the vibration correction control CPU 48d may perform the parameter PM/TM setting, the calculations and the determining operations in steps S505, S510, S550, S580, S610, S620, S623, S625, S627, S630, S640.

In this case, the camera control CPU 48c detects the states of the individual switches in steps S560, S590, and the data signals pertaining to the states of the switches may be transmitted to the vibration correction control CPU 48d.

Further, in step S640 in FIGS. 15A and 16, the drive of the vibration correction drive unit 42 is not completely stopped, but an operation different from the operation in step S630 may be conducted.

Converted, also, into a drive control signal is a vibration quantity obtained by multiplying the vibration quantity calculated in step S630 by a multiplying factor of 1 or smaller (on the order of $\frac{1}{4}$ to $\frac{1}{20}$, or preferably on the order of $\frac{1}{8}$ to $\frac{1}{12}$). This drive control signal may be outputted to the vibration correction drive unit 2. Accordingly, the drive quantity for the vibration correction apparently decreases. The operation such as a panning operation based on the intention of the photographer is thereby restricted by the vibration correcting operation, and there can be avoided such a situation that the framing is hard to perform.

Alternatively, if the vibration correction drive unit 2 is driven within only some (e.g., approximately $\frac{1}{4}$ to $\frac{1}{20}$ of the driving range, or preferably $\frac{1}{8}$ to $\frac{1}{12}$ thereof) of the central area of a drivable range of the vibration correction drive unit 2, the driving range of the vibration correction is narrowed, thereby obtaining the same effect as the above-mentioned.

Outputted, furthermore, to the vibration correction drive unit 2 is a drive control signal equal to a signal in which there is enhanced a strength (approximately 4 to 20 times, or, preferably, 8 to 12 times) of a known centering bias (a drive control quantity for always moving the correcting element toward the center of a correctable range separately from the drive control quantity corresponding to the vibration quantity to be corrected; i.e., a centripetal force) of the vibration correction drive. The driving range of the vibration correction is, as a matter of fact, thereby narrowed, and the drive quantity apparently becomes small. The same effect as the above-mentioned is thus obtained.

Moreover, if the elements described above are combined for use according to what is necessary, the framing is further facilitated.

Further, when controlling the operation of the vibration correction drive in interlock with the lock function of the camera, the photographer is informed of the ON/OFF states of the AE lock, the AF lock and the correcting operation. For this purpose, this effect is displayed by use of a display element such as, e.g., in-finder LED and LCD or an EC (electrochromatic) element, or a sound is emitted continuously or intermittently through a piezoelectric buzzer. With this arrangement, a camera exhibiting a higher usability can be offered. Especially, as shown in the flowchart of FIG. 16, that is effective in a case where the vibration correcting operation is switched over by use of the timer.

Figure 19:
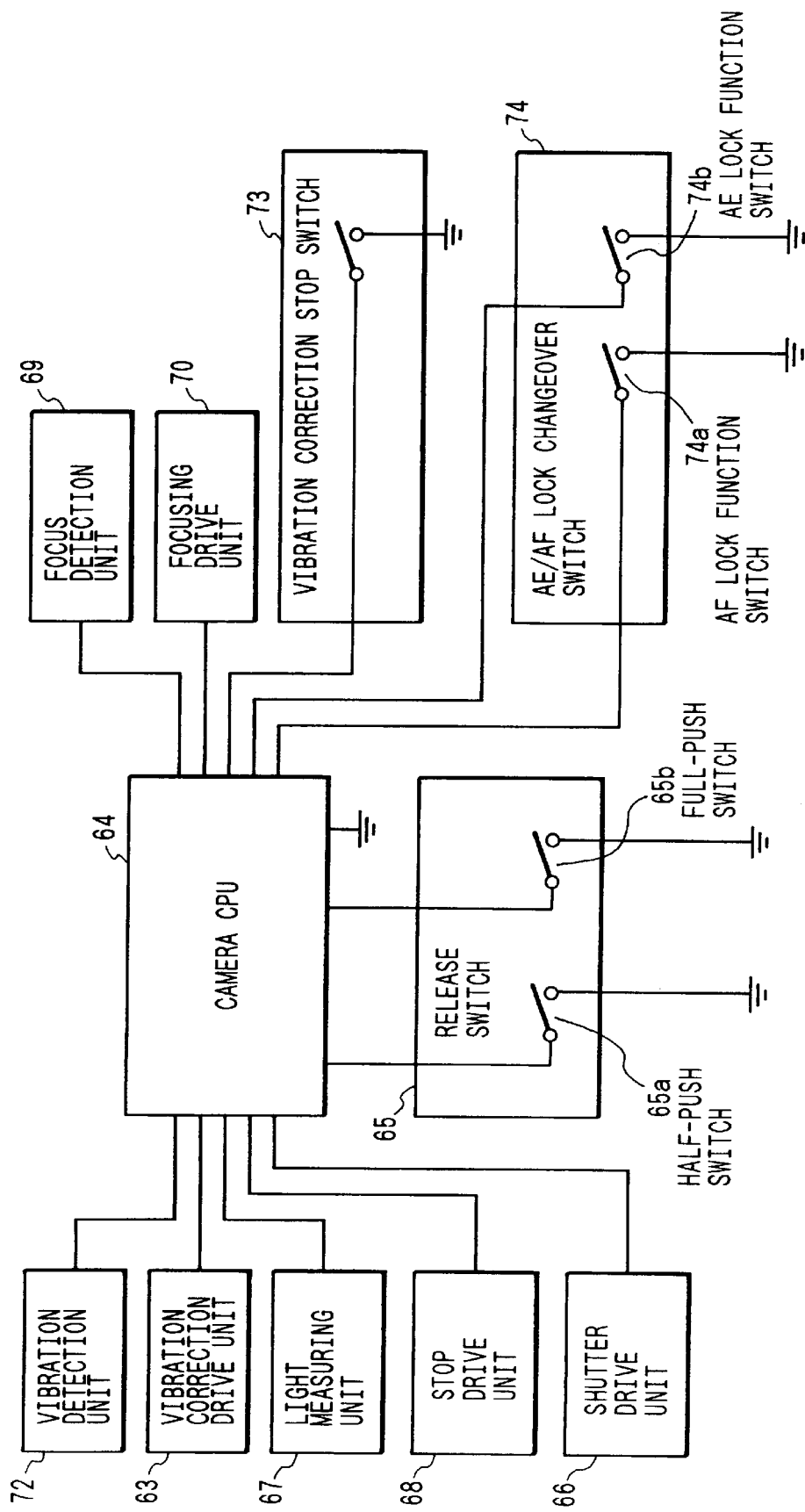
FIG. 19 is a block diagram illustrating the control system in a ninth embodiment of the present invention.
Figure 20B:
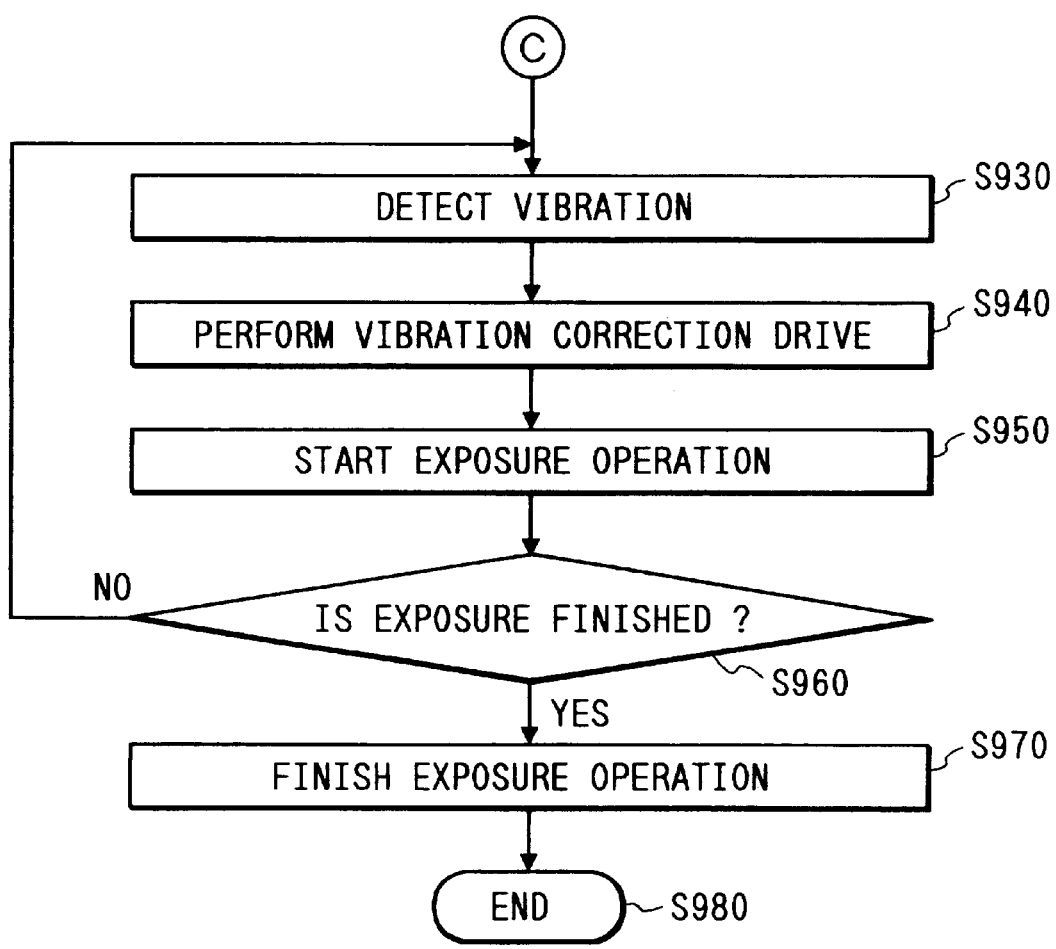
FIG. 20 is comprised of FIGS. 20A and 20B showing flowcharts depicting the operation of the camera CPU in the eighth embodiment of the present invention.
Figure 21:
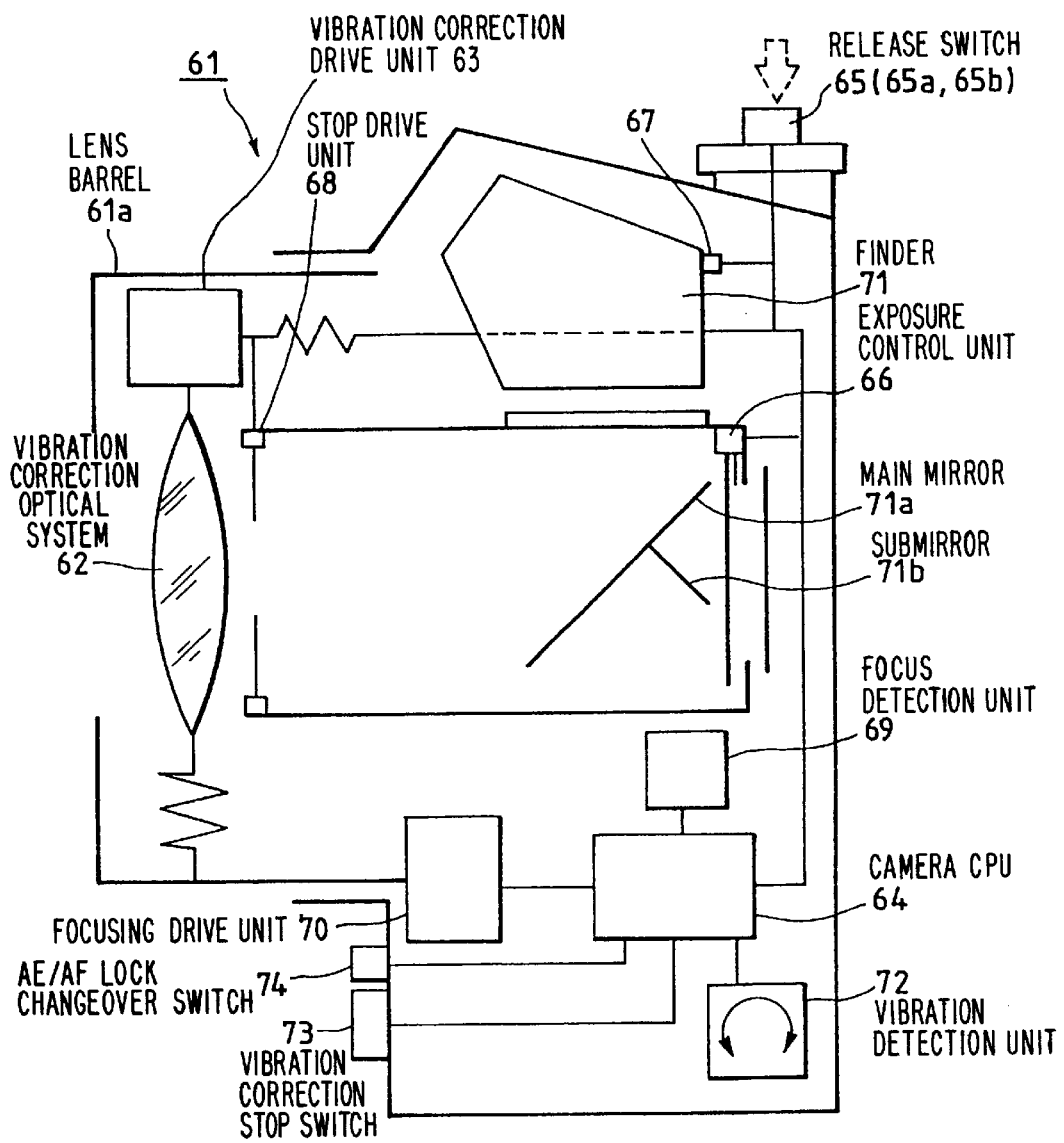
FIG. 21 is a schematic view illustrating a configuration of the AF still camera of a ninth embodiment according to the present invention.

FIGS. 19 through 21 illustrate a ninth embodiment of the camera having the anti-vibration function according to the present invention. In this embodiment, there will be discussed a case where the present invention is applied to the AF still camera having the anti-vibration function that is shown in FIG. 21.

Given herein is a brief explanation of an outline of the construction of an AF still camera 61 defined as a camera having the anti-vibration function with reference to FIG. 21 and FIG. 19. A vibration correction optical system designated by 62 in the FIG. 21 is so disposed as to be shiftable within the plane orthogonal to the optical axis in a lens barrel 61a mounted on the front surface of the body of this camera 61. In this embodiment, the vibration correction optical system 62 is structured to serve as a photographing optical system.

Note that the image blur on the imaging surface for the object is corrected by shift-driving or shift- and tilt-driving the whole photographing optical system in this example. The way of correction is not, however, limited to this. The correction may be done by shift-driving a part of the photographing optical system or deflecting a light beam through a variable apex-angle prism.

A vibration correction drive unit 63 (as seen in FIGS. 19 and 21) corrects the vibration by shift-driving the vibration correction optical system 62. This vibration correction drive unit 63 constitutes a vibration correcting device. The vibration correction drive unit 63 is connected to a camera CPU 64 serving as a control device provided in the camera body and thus drive-controlled by a control signal transmitted from this camera CPU 64.

Note that some methods of constructing this vibration correction drive unit 63 have already been known. The following are the methods suitable for the application to the camera, wherein the vibration correction optical system 62 is shifted with rotations of a motor-driven feed screw, and the vibration correction optical system 62 is shifted with a rectilinear motion of a coil generally called a voice coil or an electromagnetic force acting on a winding coil.

Here, a camera release switch designated by 65 in the Figures and serving as a release device is protrusively provided on the upper portion of the camera body. This release switch 65 is constructed in the form of a two-step push switch constructed of a half-push switch 65a and a full-push switch 65b (see FIG. 19).

Note that the camera CPU 64, upon turning ON the half-push switch 65a (the switch is closed), detects this ON-state, and, at this time, a series of operations for photographing preparations in the respective units of the camera are started. The camera CPU 64, when turning ON the full-push switch 65b (the switch is closed), starts the exposure operation.

Further, a shutter drive unit indicated by 66 in the Figure is driven when effecting the exposure operation of the camera 61. This shutter drive unit 66 is, when a light measuring unit 67 shown in FIG. 19 measures an object luminance (or an illuminance of the object light traveling through the photographing optical system in the case of a TTL light measuring method) for determining an exposure in the photographing, constructed to thereby drive the shutter for regulating a film exposure time when performing the camera exposure operation together with a stop drive unit 68 (see FIG. 19) for driving a stop for regulating an illuminance on the film surface at the time of effecting the camera exposure operation. Note that the above-stated light measuring unit 68 cooperates with the camera CPU 64 to constitute an auto exposure setting device.

Further, a focus detection unit 69 generally designated by 69 in the Figures detects the imaging state given by the photographing optical system of the camera. A focusing drive unit 70 constitutes a focusing device for controlling the imaging state of the photographing optical system of the camera. Note that the focusing operation of the camera 61 in this embodiment is based on the already-known one-shot AF drive method by which the exposure is conducted after being once focalized, or the focusing drive is not again performed till the half-pushed state of the release switch 65 is released.

Connected, as a matter of course, to the camera CPU 64 are the above release switch 65 (65a, 65b), the shutter drive unit 66, the light measuring unit 67, the stop drive unit 68, the focus detection unit 69 and also the focusing drive unit 70, whereby the state discriminations are carried out by detecting, storing and calculating the detection outputs thereof, or there are conducted the control at the drive of each drive unit, the start of the drive, and the drive stop control.

Note the numeral 71 in FIG. 21 represents a finder, and a main mirror 71a is constructed of a half-mirror for guiding the photographing light to the finder 71. A submirror 71b guides the light beam penetrating the main mirror 71a to the focus detection unit 69.

Also, a vibration detection unit generally designated by 72 in the Figures detects the vibration caused by the camera shake applied to this camera 61 and is constructed of, e.g., a known angular speed sensor. This vibration detection unit 72 is also connected to the camera CPU 64. The vibration correction drive unit 63 is drive-controlled in accordance with an output from this vibration detection unit 72. Note that a preferable angular speed sensor constituting this vibration detection unit 72 is generally of a type known as a vibration gyroscope mounted on a small-sized apparatus such as a camera or the like.

A vibration correction stop switch 73 serves as a vibration correction changing device protrusively mounted in a lower position on the front surface of the camera body. The camera CPU 64, when manipulating and turning ON this switch 73 (the switch is closed), detect this ON-state, thereby stopping the vibration correction drive by the vibration correction mechanism unit 63. When turning OFF (the switch is opened), the vibration correction drive stopped state is canceled. Note that the camera CPU 64 monitors an extremely short duration of a switch state, and therefore this vibration correction stop switch 73 may be of a so-called push ON/OFF type.

Further, referring to FIG. 19, the numeral 74 denotes an AE/AF lock changeover switch serving as one of the principal components of the present invention. The camera CPU 64 detects a state of this AE/AF lock changeover switch 74, thereby determining a function for interlocking with the vibration correction stop switch 73.

Incidentally, the function of the lock device for interlocking with the above-described vibration correction stop switch 73 involves an AF lock function (switched ON when closing an AF lock function switch 74a) for causing the camera CPU 64 to stop the drive of the focusing drive unit 70, or an AE lock function (switched ON when closing an AE lock function switch 74b) to stop the updating of an exposure arithmetic value that is effected within the camera CPU 64, or a combined function (switched ON when closing both of the switches 74a and 74b) of both of these functions.

Herein, the usability of the switches 74a, 74b constituting the above-stated AE/AF lock changeover switch 74 are improved by taking such a type that these switches can be held in the closed state thereof.

Further, the camera CPU 64 monitors the extremely short duration of the switch state, and hence the AE/AF lock changeover switch 74 may be of the so-called push ON/OFF type. In this case, preferably there is displayed a state indicating which function to interlock with a proper portion (e.g., a part of the in-finder display unit or a part of the display unit provided on the upper surface of the camera) of the camera 61.

Based on the functional changeover by the above-described AE/AF lock changeover switch 74, when the exposure operation of the camera is started upon turning ON the full-push switch 65b through the release switch 65, the AF lock function applies. In this case, the photographing is conducted in a position of the photographing optical system at the point of time when the focusing drive unit 70 is stopped by switching ON the AF lock function.

Further, when starting the exposure operation of the camera, the AE lock function applies. In this case, upon switching ON the AE lock function, the stop drive unit 68 and the shutter drive unit 66 are drive-controlled at the time of the exposure in accordance with the exposure arithmetic value calculated based on the just-before detection data of the light measuring unit 67.

According to the thus constructed vibration-correctable AF still camera 61, as obvious from FIGS. 19 and 21, the individual units are connected to the camera CPU 64, whereby the state discriminations are effected by detecting, storing and calculating the detection outputs of the vibration detection unit 72 and of the focus detection unit 69 and also the states of the individual switches 65, 73, 74. Then, there are performed the predetermined AE operation, the AF operation and the vibration correcting operation such as drive- and stop-controlling the vibration correction drive unit 63, the light measuring unit 67, the stop drive unit 68, the shutter drive unit 66 and the focusing drive unit 70.

The operating states relative to the vibration detection and the vibration correction in the thus constructed camera 61 will be hereinafter described with reference to flowcharts of FIGS. 20A and 20B.

More specifically, the camera CPU 64, upon detecting that the release half-push switch 65a is in the closed state, performs the following operations starting with step S800.

To begin with, in step S810, the camera CPU 64 detects a state of the release full-push switch 65b. Then, when the switch is opened, the answer is NO, and the processing proceeds to step S820 which will be mentioned below.

Further, when the switch is closed, the answer is YES, and the processing proceeds to the vibration correcting operation and the exposure operation in step S930 and subsequent steps.

Then, in step S820, the camera CPU 64 inputs an item of data about an object luminance detected by the light measuring unit 67.

Also, in step S830, the camera CPU 64 inputs an item of data about an imaging state of the camera that is detected by the focus detection unit 69.

Further, in step S840, the camera CPU 64 inputs an item of data about a vibration (e.g., the angular speed) applied to the camera 61 that is detected by the vibration detection unit 72.

Subsequently, in step S850, the camera CPU 64 detects a state of the vibration correction stop switch 73.

Then, when the switch is closed, the situation is such that the photographer is in the act of stopping the vibration correction drive by manipulating this vibration correction stop switch 73. Therefore, the answer is YES, and the processing goes to step S860. Note that the processing does not pass through step S900 and subsequent steps which will be mentioned later but diverges to the YES-side in this step S850, and, hence, this implies a stop of the vibration correction drive.

Also, when the switch 74a is opened, this does not imply the above-mentioned, and therefore the processing proceeds to step S900 because of the answer being NO.

In step S860, the camera CPU 64 detects a state of the AF lock function switch 74a.

Then, when the switch is closed, the situation is such that the photographer is to make the AF lock function interlock with the manipulation of the vibration correction stop switch 73, and hence the processing proceeds to step S880 because of being YES. Note that the processing jumps over step S870 in this case, and, therefore, the divergence to this YES-side implies a stop of the focusing drive.

Further, when the switch 74a is opened, the situation is such that the photographer is not to make the AF lock function interlock therewith, and therefore the processing proceeds to step S870 because of being NO.

In this step S870, the camera CPU 64 calculates an adjustment quantity of the imaging state on the basis of the detection data of the focus detection unit 69 that is obtained in step S830. The camera CPU 64 then outputs a drive control signal to the focusing drive unit 70, and the processing goes to step S880 after effecting the focusing drive.

As a matter of course, if there is no necessity for the adjustment (when already focused), no driving is carried out.

In step S880, the camera CPU 64 detects a state of the AE lock function switch 74b.

Then, when the switch 74b is closed, the situation is such that the photographer is to make the AE lock function interlock with the manipulation of the vibration correction stop switch 73, and hence the processing returns to step S810 by jumping step S890 because of being YES. This divergence due to YES implies the stop of the calculation of the exposure, and the exposure arithmetic value calculated last time continues to be stored as it is.

Further, when the switch 74b is opened, the situation is that there is no intention to make the AE lock function interlock therewith, and, hence, the processing goes to step S890.

In step S890, the camera CPU 64 calculates an exposure arithmetic value for controlling the shutter drive unit 66 as well as for controlling the stop drive unit 68 for obtaining a proper exposure, and the exposure arithmetic value is stored therein.

Employed in this embodiment for calculating the exposure arithmetic value or adding as constraint conditions are items of data about AE mode settings of a stop priority AE, a shutter priority AE and a program AE, a stop value set in the case of the stop priority AE, a shutter speed set in the case of the shutter priority AE or other items of exposure-related data of a film sensitivity used for the photographing and an exposure correction.

Then, after finishing the above-stated processing, the processing returns to step S810.

Given below is an explanation of a flow of divergence to the NO-side of step S850 when the vibration correction stop switch 73 is in the opened state.

In step S900, the camera CPU 64 calculates a vibration quantity derived from a camera shake on the basis of the detection data of the vibration detection unit 72 that is obtained in step S840. The camera CPU 64 outputs a drive control signal for correcting the vibration to the vibration correction drive unit 63.

When passing through this step S900 for the first time, and when passing through step S900 for the first time after a passage through step S860 and subsequent steps, the drive of the vibration correction drive unit 63 is started. The vibration correction drive is continuously conducted from the first time onwards.

Note that there will be omitted a detailed explanation of the method of controlling the vibration correction drive. However, the following ways may be taken. Some latest items of vibration data obtained in step S840 are stored in the camera CPU 64 or in an external memory device such as a RAM device, etc. Then, the camera CPU 64 separately calculates statistic and analytic data about re-averaged values obtained after eliminating an average value, a rate of variation, an integral value, a differential value and a second-order differential value or an abnormal value of time-series data thereof. Based both on the detection data of the vibration detection unit 72 that is obtained in step S840 and on the above arithmetic values, the camera CPU 64 outputs an optimum drive control signal to the vibration correction drive unit 63 to correct the vibration.

Step S910 is also the focusing drive step as step S870 described above. Further, step S920 is the same exposure calculation step as step S890 stated above. After finishing these steps, the processing returns to step S810.

On the other hand, there will be described a flow of processing in FIG. 20B showing how the processing proceeds when the release full-push switch 65b is closed in step S810 described above. The flow of processing in FIG. 20B indicates a series of exposure operations C performed in continuance from C of FIG. 20A and starting with step S930.

That is, in step S930, the camera CPU 64 inputs an item of data about the vibration (e.g., the angular speed) applied to the camera, which is detected by the vibration detection unit 72. This is the same processing as step S840 described above.

Next, in step S940 subsequent thereto, the camera CPU 64 calculates the vibration quantity derived from the camera shake on the basis of the detection data of the vibration detection unit 72 that is obtained in step S930 and outputs the drive control signal for correcting the vibration to the vibration correction drive unit 62. This is also the same processing as step S900.

Note that this vibration correction drive step S940 is passed even when the vibration correction stop switch 73 is manipulated. Further, when in the exposure of this camera 61, and even if the vibration correction stop switch 73 is in the closed state, it follows that the stopped state of the vibration correction drive is canceled. Then, the vibration correction drive is to be effected at the exposing time irrespective of the state of the switch 73.

Next, in step S950, this camera 61 starts the exposure operation. The camera CPU 64 outputs the drive control signals to the stop drive unit 68, the shutter drive unit 66 and other elements requiring the drive when starting the exposure. The camera CPU 64 then drives the respective units so that the proper exposure can be done. Note that this step S950 is effective only when passed for the first time, and, because of having already entered the exposure operation from the second time onwards, a series of exposure operations continue as they are.

Further, in step S960 subsequent thereto, the camera CPU 64 determines whether or not it is time for finishing the exposure operation. Then, if not at the end of-exposure time, the processing returns to step S930.

Whereas if it is the end-of-exposure time, the processing proceeds to step S970.

In step S970, the camera CPU 64 outputs the drive control signals to the stop drive unit 68, the shutter drive unit 66 and other elements requiring the drive when finishing the exposure, thus finishing the exposure operation in the camera 61.

At this time, a drive stop signal is also outputted to the vibration correction drive unit 63, thus finishing the vibration correction drive, too.

Then, the processing goes to step S980, wherein the series of operations come to an end.

With the series of operations discussed above, in the camera 61 having the anti-vibration function, to which the present invention is applied, when performing the framing operation at a photographing preparatory stage, the start or the stop of the vibration correction function and the AF or AE lock function interlocking therewith are made to automatically work by operating the single piece of vibration correction stop switch 73. It is thus possible to reduce the operating members to be operated by the photographer and also relieve burdens on the camera operations by the photographer.

Further, according t6 the above-described construction, the vibration correcting operation is automatically restarted simultaneously when starting the exposure operation. Hence, there is no possibility of entering the exposure operation while the vibration correction remains stopped.

Moreover, the AE or AF lock function interlocking with the manipulation of the vibration correction stop switch 73 is kept as it is even when exposed, and, therefore, the photographing can be easily performed in accordance with the intention of the photographer.

Further, the following method may be taken as an applied example of the above-mentioned construction. The AF lock function switch 74a and the AE lock function switch 74b are constructed into a single piece of switch, and the camera CPU 64 monitors a state of the switch in an extremely short time. There are switched over four interlocking modes (an AF/AE lock function interlocking mode, an AF lock function interlocking mode, an AE lock function interlocking mode and an AF/AE lock function non-interlocking mode) with respect to the vibration correction stop switch 73.

Moreover, the camera CPU 64 may be prepared with a program for adequately making interchangeable the functions of the vibration correction stop switch 73, the AF lock function switch 74a and the AE lock function switch 74b.

Furthermore, the functions of the respective switches may be changed by supplying a command signal to the camera CPU 64 from outside.

Also, as stated above, in the case of the AF/AE lock function interlocking mode, there is no necessity for detecting the states of both the AF lock function switch 74a and the AE lock function switch 74b. Consequently, the processing diverges from step S860 forward to step S870 or back to step S810 in FIG. 20A, and it is permitted that step S880 be omitted.

Further, the camera CPU 64 may be prepared with a program as follows. According to this program, the function interlocking with the manipulation of the vibration correction stop switch 73 is automatically set to the AE lock function in the case where the AF mode setting effected by, though not illustrated, a camera AF drive mode setting unit is based on the already-known one-shot AF drive method by which the exposure is conducted after being once focused, or the focusing drive is not again performed till the half-pushed state (the half-push switch 65a is closed) of the release switch 65 is canceled. Further, according to this program, the function interlocking with the manipulation of the vibration correction stop switch 73 is automatically set to the AF/AE lock function in the case of an already-known continuance AF drive method by which the focusing drive is always performed in the half-pushed state of the release switch 74.

Also, there is provided an alarm equipment including a display device such as the in-finder LED or LCD or a sound warning device for informing the photographer of a situation while the AE or AF lock function is kept ON during the stop of the vibration correcting operation. The photographer can be thus informed of the individual states described above, thereby providing higher usability.

Then, in the case of properly adopting such a construction, it follows that the easiest-to-use interlocking function can be obtained in the set AF mode.

Figure 22:
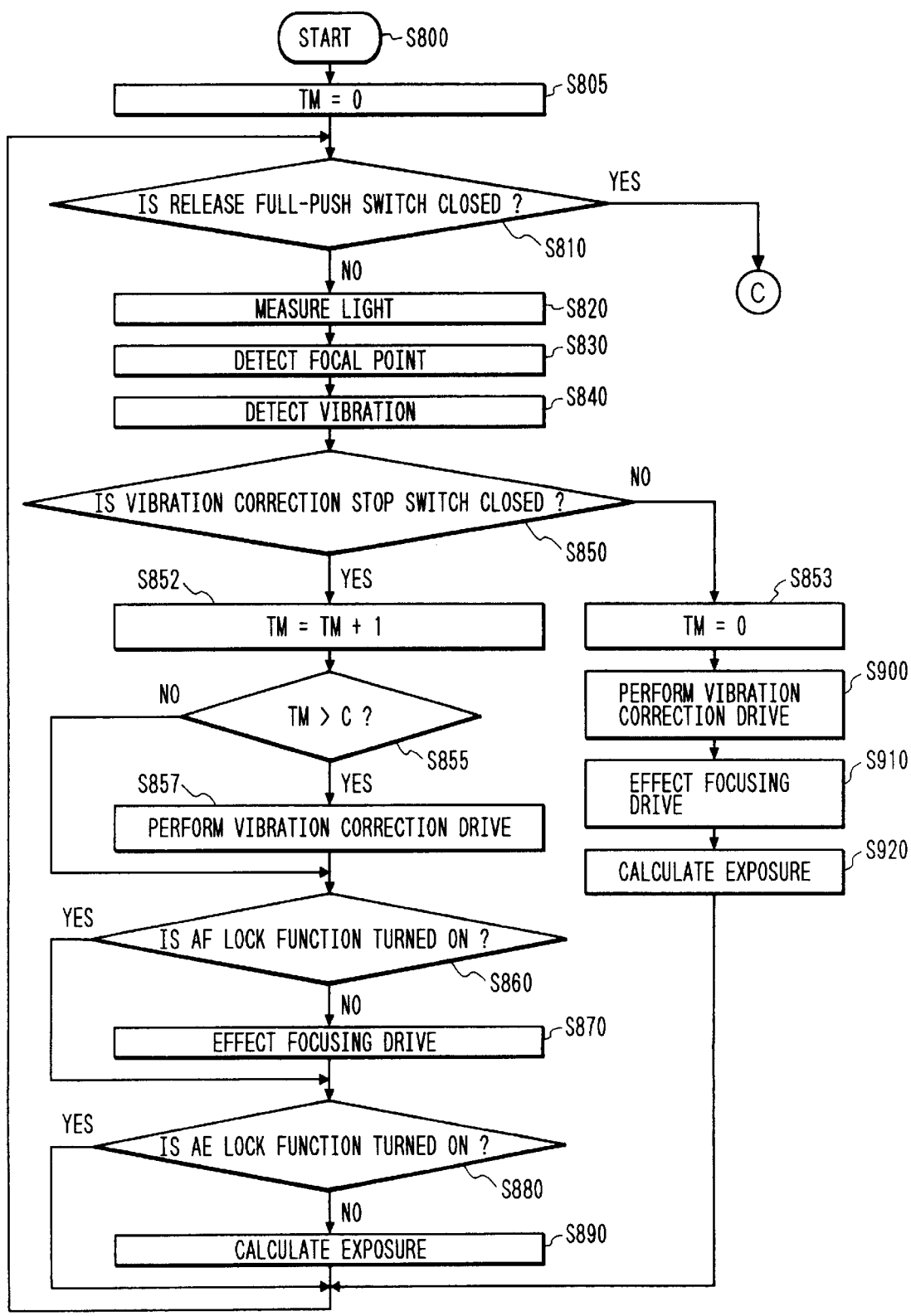
FIG. 22 is a flowchart showing the operation of the camera CPU in a tenth embodiment of the present invention.

FIG. 22 is a flowchart showing the operation of the camera CPU in a tenth embodiment of the present invention.

In this embodiment, the camera CPU 64 incorporates a member having a timer function or a timer device for counting a duration of the closed state of the vibration correction stop switch 73. After a predetermined time has elapsed since a start of the operation of stopping the vibration correction by the photographer, the stopped state of the vibration correction drive is automatically canceled.

Then, such a construction is taken, whereby the vibration correction drive automatically resumes when viewing the object once again after effecting the framing operation before the photographing. The camera 61 having the vibration correcting function comes to have an improved usability.

Herein, in this embodiment also, when the camera CPU 64 detects that the release half-push switch 65a is in the closed state, the processing starts with step S800. Note that the same steps as those explained in FIG. 20A are marked with the like numerals, and their explanations will be omitted. Further, as a matter of course, C in FIG. 20B is continued from C in FIG. 22.

That is, in step S805 subsequent to step S800, at first, the camera CPU 64 resets, to 0, the parameter TM for counting the duration of the closed state of the vibration correction stop switch 73.

This parameter TM may be stored preferably in a RAM unit within the camera CPU 64, but the method is not confined to this. The parameter may be stored in a memory device such as RAM or the like provided otherwise or in a magnetic or magneto-optic storage medium.

Note that steps S810 to S840 are performed as explained in FIG. 20A.

Next, in step S850, as in the same way with step S850 in FIG. 20A, when the vibration correction stop switch 73 is closed, the processing proceeds to step S852 because of being YES.

Further, when the switch 73 is opened, the processing goes to step S853 because of being NO.

Herein, when passing through step S852, the vibration correction stop switch 73 is on via manipulation, and hence the camera CPU 64 newly adds 1 to the parameter TM. Thereafter, the processing proceeds to step S855.

In this step S855, the camera CPU 64 determines whether or not the parameter TM exceeds a predetermined value C.

Then, if the parameter does not exceed the predetermined value C, this implies that the duration of the closed state of the vibration correction stop switch 73 does not exceed the predetermined time. Consequently, the processing jumps over step S857 to step S860.

Note that this divergence due to NO does not reach step S857, and this therefore implies the stop of the vibration correction drive.

Further, in the case of exceeding the predetermined value C, this implies that the duration of the closed state of the vibration correction stop switch 73 exceeds the predetermined time, and the answer is YES, with the result that the processing goes to step S857.

This step S857 is the same vibration correction drive step as step S900 in FIG. 20A.

Further, steps S860 to S890 are operated in the same way as the respective steps in FIG. 20A.

On the other hand, when the processing proceeds to the NO-side from step S850, and if the processing passes through step S853, the vibration correction stop switch 73 is not being manipulated. Accordingly, the camera CPU 64 resets the parameter TM to 0, and thereafter the processing goes to step S900.

Note that steps S900 to S920 are operated in the same manner as the steps in FIG. 20A.

Then, with the above-mentioned operating procedures, the duration of the closed state of the vibration correction stop switch 73 is counted. If the duration thereof exceeds the predetermined time, the stopped state of the vibration correction drive is automatically canceled. The thus constructed camera 61 having the anti-vibration function is attained.

Note that when exceeding the predetermined time while the vibration correction stop switch 73 remains closed, the stopped state of the vibration correction drive is automatically canceled because of the divergence to the NO-side from step S855. Thereafter, the parameter TM also continues to be counted up. When the vibration correction stop switch 73 is brought into the opened state, the parameter TM is reset in step S853.

Further, the setting of the value of the parameter TM is not limited to the above-described example. The parameter in steps S805 and S853 may be set for instance to the predetermined value "C", and the calculation in step S852 may be effected as a substraction, where the parameter is determined by "1". The determination in step S855 may also be made to determine whether the parameter is less than zero.

Note that if the camera CPU 64 is capable of detecting the duration of the closed state of the vibration correction stop switch 73, other operating forms may be also taken.

As in the same way with the above-discussed embodiment, there is provided an alarm equipment (including, for instance, a display device such as the in-finder LED or LCD or a sound warning device) for giving an indication or a sound warning while the AE or AF lock function is kept ON during the stop of the vibration correction in this case. The photographer can be thus informed of the individual states described above, thereby providing higher usability.

Further, according to the above-explained camera 61 having the anti-vibration function, the camera CPU 64 performs in concentration the variety of detection outputs, the detections of the switch states, the storage, the calculations, the state discriminations and the drive control inclusive of the starting and stopping operations. The camera 61 having the anti-vibration function may, however, have a construction different from this.

Figure 23:
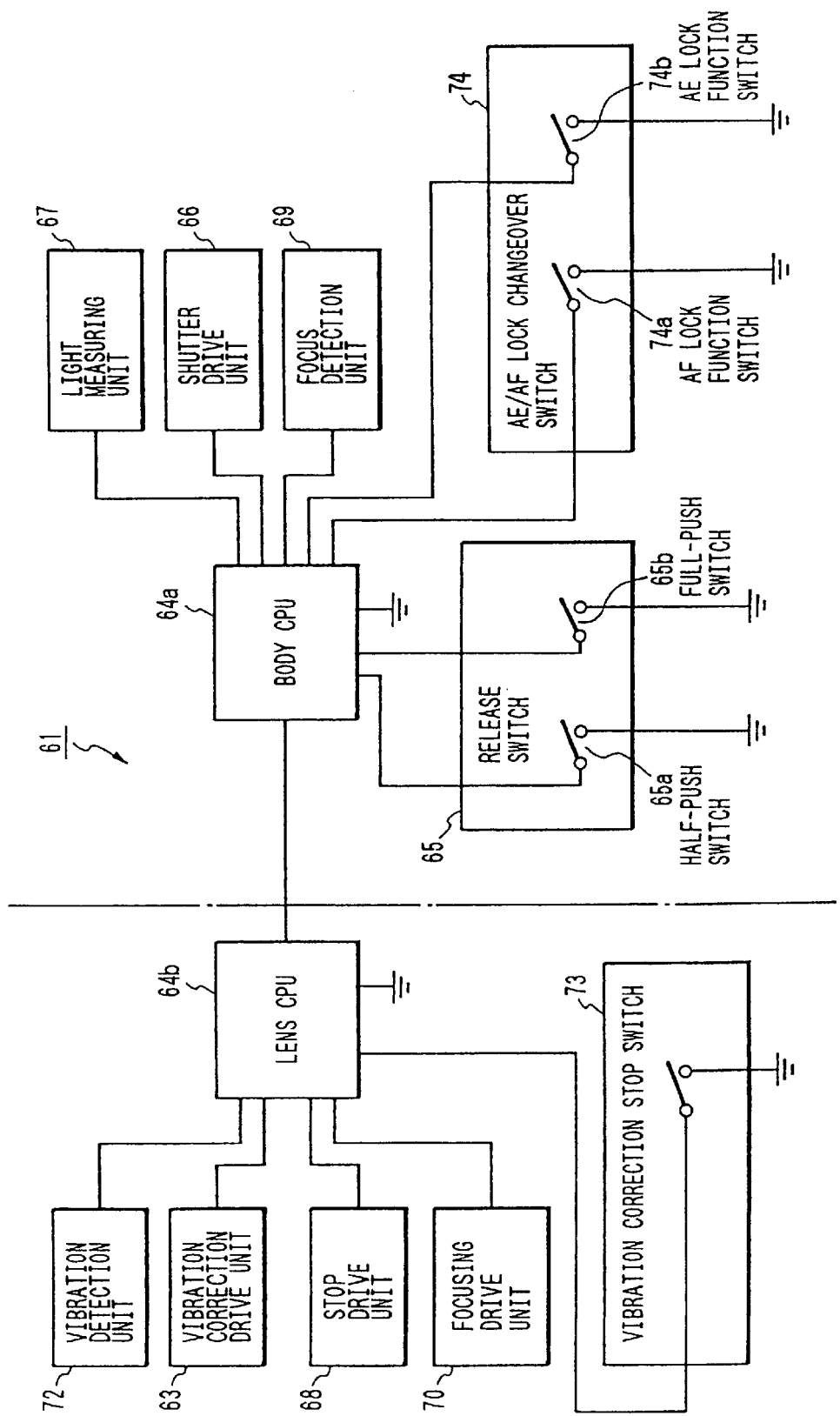
FIG. 23 is a block diagram illustrating the control system in a case where the ninth or tenth embodiment of the present invention is applied to a lens-interchangeable camera.

FIG. 23 illustrates a control system of the lens-interchangeable camera 61 having the anti-vibration function, which is suited to applications of the ninth and tenth embodiments of the present invention.

This example presents a construction in which the function of the camera CPU 64 explained in FIG. 19 is shared with by a body CPU 64a incorporated into the lens-interchangeable camera body and a lens CPU 64b incorporated into an interchangeable lens unit, whereby the processing is executed.

FIG. 23 illustrates the example effective by the camera 61 comprising the interchangeable lens unit incorporating drive elements relative to the conventionally known camera functions exclusive of the vibration correction, such as the stop drive unit 68 and the focusing drive unit 70 and elements associated with the vibration correction drive, such as the vibration detection unit 72, the vibration correction drive unit 63 and the vibration correction stop switch 73. The lens CPU 64b performs the signal processing and the control processing of these elements.

On the other hand, the body CPU 64a effects the signal processing and the control processing of elements such as the light measuring unit 67, the shutter drive unit 66, the focus detection unit 69, the AE/AF lock changeover switch 74 and the release switch 65.

In the operating example discussed with reference to, e.g., FIG. 22, the lens CPU 64b takes charge of the focusing drive control elements in steps S870, S910, the vibration detection/correction drive control elements in steps S840, S857, S900 and the vibration detection/correction drive control elements in steps S930, S940 of the processing flow C explained in FIG. 20B.

Further, the lens CPU 64b discriminates a state of the vibration correction stop switch 73 in step S850, and the body CPU 64a is informed of a result thereof.

Moreover, preferably the lens CPU 64b performs the count function in steps S805, S852, S853 and determines a closing time of the vibration correction stop switch 73 in step S855. Then, the body CPU 64a may be informed of a result of this determination.

For instance, when the lens CPU 64b detects that the vibration correction stop switch 73 changes to the closed state from the opened state, a first signal is transmitted to the body CPU 64a. When the lens CPU 64b makes a time-up determination in step S855, a second signal may be transmitted to the body CPU 64a.

The body CPU 64a may take charge of steps other than the above-mentioned.

Moreover, the body CPU 64a makes a determination in step S860, and, in such a situation that the processing proceeds to step S870, the body CPU 64a may communicate with the lens CPU 64b so as to effect the focusing drive.

In this embodiment, with respect to step S870, the body CPU 64a calculates an adjustment quantity of the imaging state, and a signal pertaining to a drive quantity with which the focusing drive should be effected is transmitted to the lens CPU 64b. The lens CPU 64b may output a drive control signal to the focusing drive unit 70 on the basis of the former signal.

Further, steps S840, S930 may be respectively executed in advance of steps S857 or S900 and S940 in the processing flow by the lens CPU 64b. A before-and-after relationship with the steps conducted by the body CPU 64a is not limited to the relationship shown in FIG. 22.

Given, in addition, from the body CPU 64a to the lens CPU 64b through communications are indications relative to the timings of the starts of the vibration detection/correction drives in step S930, S940, the drive of the stop drive unit 68, etc. when starting the exposure in step S950, and the drive of the stop drive unit 68, etc. when finishing the exposure as well as the stop of the vibration correction drive in step S970.

Further, the following system configuration may be taken. The lens CPU 64b detects only the state of the vibration correction stop switch 73 and transmits a signal corresponding to the state to the body CPU 64a. Then, the body CPU 64a performs the count function in steps S805, S852, S853 and determines the closing time of the vibration correction stop switch 73 in step S855. Subsequently, the lens CPU 64b is again informed of a result thereof, and the lens CPU 64b conforms with an indication of the body CPU 64a.

In this case, the lens CPU 64b functions as a communications device between the vibration correction stop switch 73 and the body CPU 64a.

Then, according to such a construction also, as a matter of course, the same action and effect as those in the ninth or tenth embodiment discussed above can be obtained.

Figure 24:
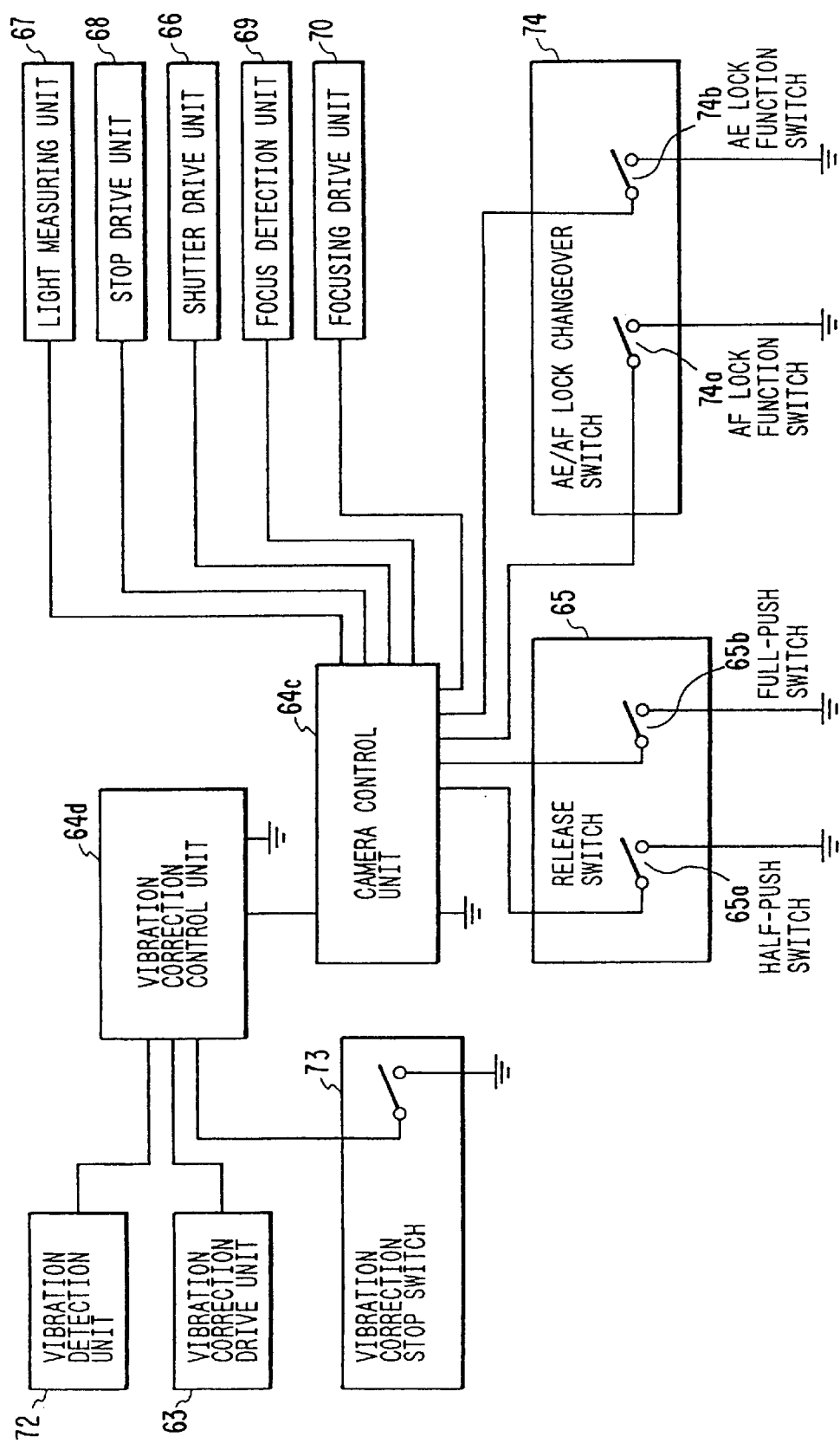
FIG. 24 is a block diagram illustrating another control system in a case where the ninth or tenth embodiment of the present invention is applied to the lens-interchangeable camera.

FIG. 24 further illustrates another control system of the lens-interchangeable camera 61 suited to the application of the ninth or tenth embodiment of the present invention. The example of FIG. 24 is a modified example of FIG. 23 and an effective construction adopted by the camera 61 the body of which incorporates the stop drive function and the focusing drive function.

That is, a camera CPU 64c within the body performs the signal processing and the control processing of elements such as the light measuring unit 67, the stop drive unit 68, the shutter drive unit 66, the focus detection unit 69, the focusing drive unit 70, the AF/AE lock changeover switch 74 and the release switch 65.

Also, a vibration correcting CPU 64d provided in the lens unit effects the signal processing and the control processing of the vibration detection unit 72, the vibration correction drive unit 63 and the vibration correction stop switch 73.

In the operating example explained in, e.g., FIG. 22, the vibration correcting CPU 64d takes charge of-the vibration detection/correction drive control in steps S840, S857, S900, the vibration detection/correction drive control in steps S930, S940 continued from the processing flow C that have been explained in FIG. 20B, the counting in steps S805, S852, S853 and the determination of the closing time of the vibration correction stop switch 73 in step S855. The camera CPU 64c make take charge of the steps other than the above-mentioned.

Moreover, the vibration correcting CPU 64d may transmit, to the camera CPU 64c, a signal relative to a result of the determination of the closing time as well as a signal about the state of the vibration correction stop switch 73.

For instance, when the vibration correcting CPU 64d detects that the vibration correction stop switch 73 changes to the closed state from the opened state, a first signal is transmitted to the camera CPU 64c. When the vibration correcting CPU 64d makes a time-up determination in step S855, a second signal may be transmitted to the camera CPU 64c.

On this occasion, steps S840, S930 may be respectively executed in advance of steps S857 or S900 and S940 in the processing flow by the vibration correcting CPU 64d. A before-and-after relationship with the steps conducted by the camera CPU 64c is not limited to the relationship shown in FIG. 22.

Given, in addition, from the camera CPU 64c to the vibration correcting CPU 64d through communications are indications relative to the timings of the starts of vibration detection/correction drives in steps S930, S940 and the stop of the vibration correction drive in step S970.

Further, the following system configuration may be taken. The vibration correcting CPU 64d detects only the state of the vibration correction stop switch 73 and transmits a signal corresponding to the state to the camera CPU 64c. Then, the camera CPU 64c performs the count function in steps S805, S852, S853 and determines the closing time of the vibration correction stop switch 73 in step S855. Subsequently, the vibration correcting CPU 64d is again informed of a result thereof, and the vibration correcting CPU 64d conforms with an indication of the camera CPU 64c.

In this case, the vibration correcting CPU 64d functions as a communications device between the vibration correction stop switch 73 and the camera CPU 64c.

Further, according to the conditions for stopping the vibration correction drive that has been explained in step S850 of FIG. 20A or step S855 of FIG. 22, there may be effected a drive different from the drive of the vibration correction drive unit 63 that is to be conducted after passing through steps S900, S857 without completely stopping the drive of the vibration correction drive unit 63.

For instance, a drive control signal may be outputted to the vibration correction drive unit 63, this drive control signal serving to correct a vibration quantity equivalent to a value obtained by multiplying the same vibration quantity as the quantity calculated in steps S900, S857 by a multiplying factor of one or smaller (e.g., approximately ¼ to 1/20, and approximately ⅛ to 1/12).

The drive quantity of the vibration correction is thereby apparently reduced, resulting in a decrease in terms of degree of restraining the panning operation.

Then, the thus constructed camera 61 having the anti-vibration function also exhibits an effect to obviate the inconvenience stated as a conventional problem inherent in the previous prior art disclosed in Japanese Patent Application Laid-Open No. 3-237411. More specifically, the following is stated in lines 8 to 19 in the right lower column on page 2 of the above-described Publication. According to the camera having the anti-vibration function, when the vibration correcting operation is started by turning ON the half-push switch of the release switch but stopped by turning OFF this switch. While the half-push switch is kept ON, the vibration correcting operation is always carried out, and even the operation such as the panning operation based on the intention of the photographer is restrained by this vibration correcting operation. There arises an inconvenience in which the framing, in turn, becomes harder to perform. The above-discussed construction, however, exhibits an effect of obviating such an inconvenience.

Further, the drive control may be changed to drive the vibration correction drive unit 63 in only a part (e.g., on the order of ¼ to 1/20, and preferably on the order of ⅛ to 1/12 the driving range) of the central area of the drivable range of the vibration correction drive unit 63.

The vibration correction driving range is thereby narrowed, and the degree of restraining the panning operation is also reduced. In this case also, there is exhibited the effect in terms of obviating the inconvenience stated in the above Publication of the prior art.

Outputted, further, to the vibration correction drive unit 63 is a drive control signal equal to a signal in which there is enhanced a strength (approximately 4 to 20 times, or, preferably, 8 to 12 times) of an already-known centering bias (a drive control quantity for always moving the correcting device toward the center of a correctable range separately from the drive control quantity corresponding to the vibration quantity to be corrected; i.e., a centripetal force) of the vibration correction drive unit 63. The driving range of the vibration correction is, as a matter of fact, thereby narrowed, and the drive quantity apparently becomes small. Hence, the degree of restraining the panning operation is reduced. Then, such a construction yields the effect of solving the inconvenience stated in the above Publication of the prior art.

As a matter of course, there may be no problem if two of the above-discussed three operational characteristic changes are combined, or these three characteristic changes are also performed. Besides, there may be also no problem in the case of such a control characteristic change that the effect of the vibration correction is apparently decreased. Further, the combination thereof may be, of course, permitted.

Note that the present invention is not confined to the structures of the embodiments discussed above. The configurations and the structures, etc. of the respective elements of the camera 61 having the anti-vibration function can be properly modified and changed. Adequate modified examples will be contemplated. In particular, the incorporation of the individual elements into the camera, the placement and the structures thereof, and also the fitting positions of the respective switches are arbitrarily selectable.

Further, the embodiments discussed above have dealt with the case where the present invention is applied to the AF still camera. The present invention is not, however, confined to this but can exhibit the effects when the invention is applied to a proper camera, i.e., the camera having the anti-vibration function. It will be also readily understood that the camera may be the AF or non-AF camera.

Therefore, it is intended that the invention not be limited to the preferred embodiments described herein, but that the invention will include all embodiments falling within the scope of the appended claims.

What is claimed is:

1. A photographing apparatus having an anti-vibration function, comprising:

vibration detecting means for detecting a vibration of said photographing apparatus;

reference value calculating means for calculating a reference value based on output from said vibration detecting means;

focusing means for adjusting a focal position of a photographing image;

focusing operation stopping means for stopping said focusing means; and reference value calculation stopping means for stopping the calculation of the reference value by said reference value calculating means when said focusing operation stopping means is stopping said focusing means.

2. A photographing apparatus according to claim 1, wherein said reference value calculating means calculates the reference value from an average of the vibration detection outputs.

3. A photographing apparatus according to claim 1, wherein said reference value calculating means is capable of resuming the calculation of the reference value after said reference value calculation stopping means has stopped the calculation of the reference value.

4. A photographing apparatus according to claim 3, wherein said reference value calculation stopping means permits said reference value calculating means to resume the calculation of the reference value when said focusing means is not being stopped by said focusing operation stopping means.

5. A photographing apparatus according to claim 1, wherein said focusing operation stopping means is a focus lock device.

6. A photographing apparatus having an anti-vibration function, comprising:
 vibration detecting means for detecting a vibration of said photographing apparatus;
 reference value calculating means for calculating a reference value based on output from said vibration detecting means;
 vibration correcting means for correcting the vibration of said photographing apparatus based on said reference value;
 focusing means for adjusting a focal position of a photographing image;
 focusing operation stopping means for stopping an operation of said focusing means;
 reference value calculation stopping means for stopping the calculation of the reference value by said reference value calculating means when said focusing operation stopping means is stopping said focusing means;
 release means for starting an exposure operation; and
 vibration correction control means for controlling a drive of said vibration correcting means by use of an output of said vibration detecting means and the reference value calculated by said reference value calculating means after said release means has started the exposure operation.

7. A photographing apparatus according to claim 6, wherein said vibration correction control means controls the drive of said vibration correcting means on the basis of an output obtained by subtracting the reference value calculated by said reference value calculating means from the output of said vibration detecting means.

8. A photographing apparatus according to claim 6, wherein said reference value calculating means calculates the reference value from an average value of the vibration detection outputs.

9. A photographing apparatus according to claim 6, wherein said reference value calculating means is capable of resuming the calculation of the reference value after said reference value calculation stopping means has stopped the calculation of the reference value.

10. A photographing apparatus according to claim 9, wherein said reference value calculation stopping means permits said reference value calculating means to resume the calculation of the reference value when said focusing means is not being stopped by said focusing operation stopping means.

11. A photographing apparatus according to claim 6, wherein said focusing operation stopping means is a focus lock device.

12. A photographing apparatus having an anti-vibration function, comprising:
 vibration detecting means for detecting a vibration of said photographing apparatus;
 focusing means for adjusting a focal position of a photographing image;
 focusing operation stopping means for stopping said focusing means;
 vibration correcting means for correcting a vibration of the photographing image;
 vibration correction control means for controlling a drive of said vibration correcting means;
 release means for starting an exposure operation; and
 correction drive stopping means for stopping a drive of said vibration correcting means by said vibration correction control means when said focusing operation stopping means stops said focusing means before said release means starts the exposure operation.

13. A photographing apparatus according to claim 12, wherein said correction drive stopping means cancels the stop of the drive of said vibration correcting means by said correction drive stopping means when said release means starts the exposure operation.

14. A photographing apparatus according to claim 12, wherein said focusing operation stopping means is a focus lock device.

15. A photographing apparatus having an anti-vibration function, comprising:
 vibration detecting means for detecting a vibration applied to said photographing apparatus;
 standard generating means for generating a reference value based on output from said vibration detecting means;
 vibration correcting means for correcting a vibration of a photographing image;
 vibration correction stopping means for stopping said vibration correcting means having operating and non-operating states; and
 standard control means for controlling said standard generating means by detecting the state of said vibration correction stopping means.

16. A photographing apparatus according to claim 15, wherein said standard control means detects operating/non-operating states of said vibration correction stopping means.

17. A photographing apparatus according to claim 15, wherein said standard generating means generates the reference value from a shift average value from the output from said vibration detecting means.

18. A photographing apparatus according to claim 15, wherein said standard control means performs the control to stop updating the reference value generated by said standard generating means.

19. A photographing apparatus according to claim 15, wherein said standard control means performs the control to initialize the reference value generated by said standard generating means.

20. A photographing apparatus according to claim 15, wherein said standard control means has a timer function and controls said standard generating means by detecting the state of said vibration correction stopping means and a state of said timer device.

21. A photographing apparatus according to claim 15, wherein said standard generating means has storage means for storing output from said vibration detecting means within a fixed time irrespective of the stop and the cancellation of said vibration correction stopping means.

22. A photographing apparatus according to claim 15, wherein said vibration correction stopping means is constructed as an independent operating means.

23. A photographing apparatus according to claim 15, wherein said vibration correction stopping means is provided in combination with other function operating means.

24. A photographing apparatus having an anti-vibration function for correcting an image blur of a photographing image due to a vibration, said apparatus comprising:
- a vibration correcting device to correct vibration applied to the photographing image;
- a lock device, operated by a manipulation of a photographer, to temporarily stop a predetermined function of said photographing apparatus; and
- a vibration correction control device to control said vibration correcting device on the basis of the operation of said lock device;
- a timer device to count an operating time of said lock device; and
- a control canceling device to cancel the control of said vibration correcting device by said vibration correction control device on the basis of the count by said timer device.

25. A photographing apparatus having an anti-vibration function for correcting an image blur of a photographing image due to a vibration, said apparatus comprising:
- a vibration correcting device to correct vibration applied to the photographing image;
- a lock device, operated by a manipulation of a photographer, to temporarily stop a predetermined function of said photographing apparatus; and
- a vibration correction control device to control said vibration correcting device on the basis of the operation of said lock device, including:
  - a lens-side control device, mounted in a lens barrel of said photographing apparatus, to control said vibration correcting device, and
  - a main control device to control a series of photographing operations of said photographing apparatus and, at the same time, to transmit a signal for controlling said vibration correcting device to said lens-side control device in accordance with the operation of said lock device;
- a timer device to count an operating time of said lock device,
- wherein said main control device transmits a signal for canceling the control of said vibration correcting device to said lens-side control device on the basis of the count by said timer device.

26. A photographing apparatus having an anti-vibration function for correcting an image blur of a photographing image due to a vibration, said apparatus comprising:
- a vibration correcting device to correct vibration applied to the photographing image;
- a lock device, operated by a manipulation of a photographer, to temporarily stop a predetermined function of said photographing apparatus; and
- a vibration correction control device to control said vibration correcting device on the basis of the operation of said lock device, including:
  - a main control device to control a series of photographing operations of said photographing apparatus and, at the same time, to output a signal corresponding to a state of said lock device; and
  - a lens-side control device, mounted in a lens barrel of said photographing apparatus, to control said vibration correcting device on the basis of the signal from said main control device;
- a timer device to count an operating time of said lock device,
- wherein said main control device transmits a signal corresponding to the count of said timer device to said lens-side control device, and
- said lens-side control device cancels the control of said vibration correcting device on the basis of the signal from said main control device.

27. A method to compensate for vibrations in a photographing apparatus, said method comprising:
- detecting a vibration of the photographing apparatus;
- calculating a reference value based on the vibration detected by said detecting;
- compensating for the vibration based on the reference value;
- adjusting a focal position of a photographing image;
- stopping said adjusting; and
- stopping said calculating when said adjusting is stopped.

28. A photographic apparatus having an anti-vibration function, comprising:
- a vibration detection unit to detect vibration of said photographic apparatus and to provide an output;
- a reference value calculation unit to calculate a reference value based on the output of said vibration detection unit;
- a first switching portion to perform the operation of said vibration detection unit and said reference value calculation unit; and
- a second switching portion, capable of being operated by an operator to skip the operation of said reference value calculation unit without affecting the operating state of said vibration detection unit.

29. A photographic apparatus having an anti-vibration function, comprising:
- a vibration detection unit to detect vibration of said photographic apparatus;
- a reference value calculation unit to calculate a reference value based on outputs from said vibration detection unit, between which there is at least one interrupted time interval;
- a first switching portion to perform the operation of said vibration detection unit and said reference value calculation unit; and
- a second switching portion, capable of being operated by an operator to skip the operation of said reference value calculation unit without affecting the operating state of said vibration detection unit,
- wherein said at least one interrupted time interval corresponds to a duration in which said second switching portion is operated.

* * * * *